(12) United States Patent
Suzuki et al.

(10) Patent No.: US 12,247,627 B2
(45) Date of Patent: Mar. 11, 2025

(54) POWER TRANSMISSION SYSTEM AND METHOD OF ASSEMBLING THE SAME

(71) Applicant: Mazda Motor Corporation, Hiroshima (JP)

(72) Inventors: Kotaro Suzuki, Aki-gun (JP); Koichi Ando, Aki-gun (JP); Nobuyuki Matsubara, Aki-gun (JP); Yuji Tashiro, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 468 days.

(21) Appl. No.: 17/675,314

(22) Filed: Feb. 18, 2022

(65) Prior Publication Data

US 2022/0316534 A1 Oct. 6, 2022

(30) Foreign Application Priority Data

Mar. 30, 2021 (JP) ................. 2021-057974

(51) Int. Cl.
*F16D 3/12* (2006.01)
*F16D 3/06* (2006.01)
*F16F 15/121* (2006.01)

(52) U.S. Cl.
CPC .................. *F16D 3/12* (2013.01); *F16D 3/06* (2013.01); *F16F 15/1218* (2013.01); *F16D 2250/0084* (2013.01); *F16D 2300/12* (2013.01); *F16D 2300/22* (2013.01); *Y10T 403/1624* (2015.01); *Y10T 403/7032* (2015.01)

(58) Field of Classification Search
CPC ...... F16D 3/12; F16D 3/06; F16D 2250/0084; F16D 2300/12; F16D 2300/22; F16F 15/1218; Y10T 403/1624; Y10T 403/7032

USPC .......................................... 403/359.4; 464/98
See application file for complete search history.

(56) References Cited

U.S. PATENT DOCUMENTS

| | | | |
|---|---|---|---|
| 4,624,596 A * | 11/1986 | Eckendorff | ............... F16D 1/12 |
| | | | 403/359.4 |
| 7,980,369 B2 * | 7/2011 | Kneidel | .................. F16F 1/027 |
| 10,247,249 B2 * | 4/2019 | Vogel | ...................... F16D 13/70 |
| 2008/0179157 A1 | 7/2008 | Zhou et al. | |

FOREIGN PATENT DOCUMENTS

JP  2008544193 A  12/2008

* cited by examiner

*Primary Examiner* — Greg Binda
(74) *Attorney, Agent, or Firm* — Alleman Hall & Tuttle LLP

(57) ABSTRACT

A power transmission system is provided, which includes a biasing member configured to bias a second power-transmission member in a rotational direction with respect to a first power-transmission member by a spline part of the biasing member being engaged with a spline part of the second power-transmission member while the biasing member is locked by the first power-transmission member and a spring part thereof is in a first elastically displaced state, and a temporarily fixing member having a temporarily fixing part which temporarily fixes the biasing member to the first power-transmission member in a second elastically displaced state with greater elastic displacement than in the first state. The second power-transmission member is provided, on a first axial side of the spline part, with a canceling part configured to cancel the temporary fixing of the biasing member to the first power-transmission member by the temporarily fixing part.

17 Claims, 34 Drawing Sheets

POWER TRANSMISSION SYSTEM AND METHOD OF ASSEMBLING THE SAME

TECHNICAL FIELD

The present disclosure relates to a power transmission system and a method of assembling the same.

BACKGROUND OF THE DISCLOSURE

In a vehicle provided with an engine as a drive source, and in which a driving force is transmitted from the drive source to drive wheels via a transmission, for example, in order to reduce vibration caused by torque fluctuation of the engine, a flywheel is attached to an output shaft of the engine, and the flywheel and an input shaft of the transmission are coupled to each other.

A first power transmission member and a second power transmission member which are rotatably provided to a power transmission path from the drive source to the drive wheels may be assembled together by spline-engagement (e.g., the flywheel attached to the output shaft of the engine is spline-engaged with the input shaft of the transmission).

In a case where spline parts of the first power transmission member and the second power transmission member are coupled together by spline-engagement, gear teeth rattling noise may be caused when the driving force is not transmitted at the spline-engagement part, and noise may be caused in a vehicle cabin.

In this respect, it is considered that the teeth rattling noise at the spline-engagement part between the first and second power transmission members is reduced by using a spring which biases the second power transmission member with respect to the first power transmission member in a rotational direction to bias the spline part of the second power transmission member with respect to the spline part of the first power transmission member in the rotational direction.

For example, JP2008-544193A discloses engaging and attaching a spring holding member which holds a spring to a spline part of a first power transmission member, and then, spline-engaging a second power transmission member to the first power transmission member, and canceling the engagement of the spring holding member to the spline part of the first power transmission member by a spline part of the second power transmission member so that a biasing force in the rotational direction is acted on between the first power transmission member and the second power transmission member.

According to JP2008-544193A, the teeth rattling noise at a spline-engagement part between the first power transmission member and the second power transmission member can be reduced by the spring which biases the second power transmission member with respect to the first power transmission member in the rotational direction. However, the spring holding member which holds the spring is engaged with the spline parts of the first power transmission member and the second power transmission member.

Therefore, the shapes of the spline parts of the first power transmission member and the second power transmission member need to be changed according to the spring holding member, and changing the shapes of the spline parts may complicate the structure and increase the cost. Thus, it is desired to reduce the teeth rattling noise by a comparatively simple configuration. Moreover, in a power transmission system in which the first power transmission member and the second power transmission member are assembled together by spline-engagement, the assembling of these power transmission members is desired to be comparatively easy.

SUMMARY OF THE DISCLOSURE

Therefore, one purpose of the present disclosure is to provide a power transmission system including a first power transmission member and a second power transmission member which are assembled together by spline-engagement, and capable of reducing the gear teeth rattling noise at the spline-engagement part between the first and second power transmission members with adequate assemblability in a comparatively simple configuration.

According to one aspect of the present disclosure, a power transmission system including a first power transmission member and a second power transmission member configured to be assembled together by spline-engagement, is provided. The power transmission system includes a biasing member and a temporarily fixing member. The biasing member includes a spring part elastically displaceable in a rotational direction, a locked part provided on a first end side of the spring part and configured to be locked by the first power transmission member, and a spline part provided on a second end side of the spring part. The biasing member biases the second power transmission member toward a first rotational-direction side with respect to the first power transmission member by the spline part being engaged with a spline part of the second power transmission member while the biasing member is disposed on a first axial side of the first power transmission member and locked by the first power transmission member, and the spring part is in a first elastically displaced state. The temporarily fixing member is disposed on the first axial side of the biasing member and has a temporarily fixing part configured to temporarily fix the biasing member to the first power transmission member in a second elastically displaced state where the spring part is elastically displaced more than in the first elastically displaced state. The second power transmission member is provided, on the first axial side of the spline part, with a canceling part configured to, when the spline part of the second power transmission member is spline-engaged with a spline part of the first power transmission member through the spline part of the biasing member from the first axial side of the temporarily fixing member, cancel the temporary fixing of the biasing member to the first power transmission member by the temporarily fixing part so that the second power transmission member is biased toward the first rotational-direction side with respect to the first power transmission member while the spline part of the biasing member is engaged with the spline part of the second power transmission member in the first elastically displaced state of the spring part.

According to this configuration, the biasing member and the temporarily fixing member are used for assembling the first and second power transmission members by spline-engagement. The biasing member biases the second power transmission member toward the first rotational-direction side with respect to the first power transmission member by engaging the spline part with the spline part of the second power transmission member while the biasing member is locked by the first power transmission member, and the spring part is in the first elastically displaced state. The temporarily fixing member includes the temporarily fixing part which temporarily fixes the biasing member to the first power transmission member in the second elastically displaced state where the spring part is elastically displaced more than in the first elastically displaced state. Moreover, the canceling part which cancels the temporary fixing of the biasing member to the first power transmission member by the temporarily fixing part is provided to the first axial side of the spline part of the second power transmission member.

According to this configuration, the biasing member is attached to the first power transmission member to be locked, the temporarily fixing member is attached to the first power transmission member and the biasing member so as to temporarily fix the biasing member to the first power transmission member in the second elastically displaced state of the spring part, and the spline part of the second power transmission member is spline-engaged with the spline part of the first power transmission member through the spline part of the biasing member so that the second power transmission member is assembled to the first power transmission member.

Accordingly, the temporary fixing of the biasing member to the first power transmission member by the temporarily fixing part of the temporarily fixing member is canceled, and the second power transmission member is biased toward the first rotational-direction side with respect to the first power transmission member. As a result, the teeth rattling noise at the spline-engagement part between the first and second power transmission members is reduced.

By engaging the biasing member to the first power transmission member, by temporarily fixing the biasing member to the first power transmission member by the temporarily fixing member, and by spline-engaging the second power transmission member to the first power transmission member, the second power transmission member can be biased toward the first rotational-direction side with respect to the first power transmission member, without changing the shapes of the spline parts of the first and second power transmission members, and thus the assembly is comparatively easier. As a result, the teeth rattling noise at the spline-engagement part between the first and second power transmission members can be reduced with suitable assemblability in a comparatively simple configuration The biasing member may include the spring part, the locked part, the spline part, an inner annular part provided at a radial inside, an outer annular part provided at a radial outside, and a temporarily fixed part configured to be temporarily fixed by the temporarily fixing part. The locked part may be connected to the outer annular part and the spline part, and the temporarily fixed part may be connected to the inner annular part. The spring part may be connected at one end to the outer annular part, and at the other end to the inner annular part, and the spring part may be elastically displaced in the rotational direction by the inner annular part being moved toward a second rotational-direction side with respect to the outer annular part.

According to this configuration, since the biasing member having the spring part which is elastically displaced in the rotational direction by the inner annular part being moved toward the second rotational-direction side with respect to the outer annular part is used, unlike a case of using a spring as the biasing member, a spring holding member which holds the spring is unnecessary, and thus the assemblability is improved.

The temporarily fixing member may include a temporarily fixing body part into which the spline part of the second power transmission member is inserted, and the temporarily fixing part extending toward the second axial side from the temporarily fixing body part. The temporarily fixing part may include, at the first rotational-direction side, a regulated part configured to be regulated by the first power transmission member, and at the second rotational-direction side, a contact part configured to contact the temporarily fixed part, and a recess dented toward the first rotational-direction side on the first axial side of the contact part. The recess may be formed such that, when the canceling part cancels the temporary fixing of the biasing member to the first power transmission member, the canceling part moves the temporarily fixing body part and the temporarily fixing part toward the second axial side so that the temporarily fixed part is positioned in the recess.

According to this configuration, since the recess is provided to the second rotational-direction side of the temporarily fixing part of the temporarily fixing member on the first axial side of the contact part, the temporary fixing of the biasing member to the first power transmission member can be canceled by positioning the temporarily fixed part in the recess when canceling the fixing.

The power transmission system may further include an assisting mechanism configured to assist the canceling of the temporary fixing of the biasing member by the canceling part.

According to this configuration, since the assisting mechanism assists the canceling of the temporary fixing of the biasing member by the canceling part, the temporary fixing of the biasing member can be canceled comparatively easily. As a result, the assemblability of the second power transmission member to the first power transmission member is improved.

The contact part may be formed by a sloped part inclining to the first rotational-direction side toward the first axial side, and the assisting mechanism may be comprised of the sloped part.

According to this configuration, the sloped part formed in the contact part of the temporarily fixing part and constituting the assisting mechanism inclines to the first rotational-direction side toward the first axial side. Therefore, the biasing force applied by the spring part to the contact part from the temporarily fixed part toward the first rotational-direction side can be converted into the force in the canceling direction of the temporary fixing of the biasing member from the first power transmission member. As a result, the force required for canceling the temporary fixing of the biasing member can be reduced, which improves the assemblability.

The temporarily fixing member may be fixedly attached to the outer annular part of the biasing member.

According to this configuration, since the temporarily fixing member is fixedly attached to the outer annular part of the biasing member, when the first and second power transmission members are assembled together by spline-engagement, rattling of the temporarily fixing member in the circumferential direction can be reduced.

The temporarily fixing member may be one of a plurality of temporarily fixing members attached to the biasing member in a circumferential direction at an equal interval.

According to this configuration, by the plurality of temporarily fixing members being attached to the biasing member in the circumferential direction at an equal interval, the teeth rattling noise at the spline-engagement part between the first and second power transmission members can be effectively reduced.

The temporarily fixing member may include a fixed part configured to be fixed to the biasing member, the temporarily fixing part, and a connector connecting the fixed part to the temporarily fixing part such that the fixed part is fixed to the biasing member while the temporarily fixing part is elastically displaced toward the second axial side with respect to the fixed part. The temporarily fixing part may temporarily fix the biasing member by being moved toward the first axial side by an elastic force with respect to the fixed part fixed to the biasing member.

According to this configuration, by using the temporarily fixing member configured such that the temporarily fixing part temporarily fixes the biasing member by the elastic force moving the temporarily fixing part toward the first axial side with respect to the fixed part fixed to the biasing member, the teeth rattling noise at the spline-engagement part between the first and second power transmission members can be reduced. Further, the rattling of the temporarily fixing member in the circumferential direction can be suppressed when the first and second power transmission members are assembled together by spline-engagement.

The canceling part may be provided to a case configured to rotatably support the second power transmission member.

According to this configuration, since the canceling part is provided to the case which rotatably supports the second power transmission member, the canceling part, which is provided to the case to be moved toward the second axial side together with the second power transmission member, cancels the temporary fixing of the biasing member, and thus, the temporary fixing can be canceled utilizing an inertial mass of the case.

The power transmission system may further include an assisting mechanism configured to assist the canceling of the temporary fixing of the biasing member by the canceling part.

According to this configuration, since the assisting mechanism assists the canceling of the temporary fixing of the biasing member by the canceling part, the temporary fixing of the biasing member can be canceled comparatively easily. As a result, the assemblability of the second power transmission member to the first power transmission member is improved.

The temporarily fixing part may include, at the second rotational-direction side, a contact part configured to contact the temporarily fixed part. The contact part may be formed by a sloped part inclining to the first rotational-direction side toward the first axial side, and the assisting mechanism may be comprised of the sloped part.

According to this configuration, since the sloped part formed in the contact part of the temporarily fixing part and constituting the assisting mechanism inclines to the first rotational-direction side toward the first axial side, the biasing force applied by the spring part to the contact part from the temporarily fixed part toward the first rotational-direction side can be converted into the force in the canceling direction of the temporary fixing of the biasing member from the first power transmission member. As a result, the force required for canceling the temporary fixing of the biasing member can be reduced, which improves the assemblability.

The first power transmission member may be a flywheel coupled to an output shaft of an engine, and the second power transmission member may be an input shaft of a transmission.

According to this configuration, in the power transmission system including the flywheel and the input shaft of the transmission which are assembled together by spline-engagement, the teeth rattling noise at the spline-engagement part between the flywheel and the input shaft can be reduced with adequate assemblability in the comparatively simple configuration.

According to another aspect of the present disclosure, a method of assembling a power transmission system including a first power transmission member and a second power transmission member configured to be assembled together by spline-engagement, is provided. The method includes the step of locking a locked part of a biasing member to the first power transmission member from a first axial side, the biasing member including a spring part elastically displaceable in a rotational direction, the locked part provided on a first end side of the spring part and configured to be locked by the first power transmission member, and a spline part provided on a second end side of the spring part, and the biasing member being configured to bias the second power transmission member toward a first rotational-direction side with respect to the first power transmission member by engaging the spline part to a spline part of the second power transmission member in a first elastically displaced state of the spring part. The method includes the step of attaching a temporarily fixing member to the first power transmission member and the biasing member from the first axial side of the biasing member, and temporarily fixing the biasing member to the first power transmission member in a second elastically displaced state where the spring part is elastically displaced more than in the first elastically displaced state, the temporarily fixing member including a temporarily fixing part configured to temporarily fix the biasing member to the first power transmission member in the second elastically displaced state of the spring part. The method includes the step of assembling the second power transmission member to the first power transmission member by spline-engaging the spline part of the second power transmission member to a spline part of the first power transmission member through the spline part of the biasing member from the first axial side of the temporarily fixing member. The second power transmission member is provided, on the first axial side of the spline part, with a canceling part configured to, when the spline part of the second power transmission member is spline-engaged with the spline part of the first power transmission member, cancel the temporary fixing of the biasing member to the first power transmission member by the temporarily fixing part so that the second power transmission member is biased toward the first rotational-direction side with respect to the first power transmission member while the spline part of the biasing member is engaged with the spline part of the second power transmission member in the first elastically displaced state of the spring part.

According to this configuration, the biasing member and the temporarily fixing member are used for assembling the first and second power transmission members by spline-engagement. The biasing member biases the second power transmission member toward the first rotational-direction side with respect to the first power transmission member by engaging the spline part with the spline part of the second power transmission member while the biasing member is locked by the first power transmission member, and the spring part is in the first elastically displaced state. The temporarily fixing member includes the temporarily fixing part which temporarily fixes the biasing member to the first power transmission member in the second elastically displaced state where the spring part is elastically displaced more than in the first elastically displaced state. Moreover, the canceling part which cancels the temporary fixing of the biasing member to the first power transmission member by the temporarily fixing part is provided to the first axial side of the spline part of the second power transmission member.

According to this configuration, the biasing member is attached to the first power transmission member to be locked, the temporarily fixing member is attached to the first power transmission member and the biasing member so as to temporarily fix the biasing member to the first power transmission member in the second elastically displaced state of the spring part, and the spline part of the second power transmission member is spline-engaged with the spline part of the first power transmission member through the spline part of the biasing member so that the second power transmission member is assembled to the first power transmission member. Accordingly, the temporary fixing of the biasing member to the first power transmission member by the temporarily fixing part of the temporarily fixing member is canceled, and the second power transmission member is biased toward the first rotational-direction side with respect to the first power transmission member. As a result, the teeth rattling noise at the spline-engagement part between the first and second power transmission members is reduced.

By engaging the biasing member to the first power transmission member, by temporarily fixing the biasing member to the first power transmission member by the temporarily fixing member, and by spline-engaging the second power transmission member to the first power transmission member, the second power transmission member can be biased toward the first rotational-direction side with respect to the first power transmission member, without changing the shapes of the spline parts of the first and second power transmission members, and thus the assembly is comparatively easier. As a result, the teeth rattling noise at the spline-engagement part between the first and second power transmission members can be reduced with adequate assemblability in a comparatively simple configuration.

DETAILED DESCRIPTION OF THE DISCLOSURE

Hereinafter, embodiments of the present disclosure are described with reference to the accompanying drawings.

Figure 1:
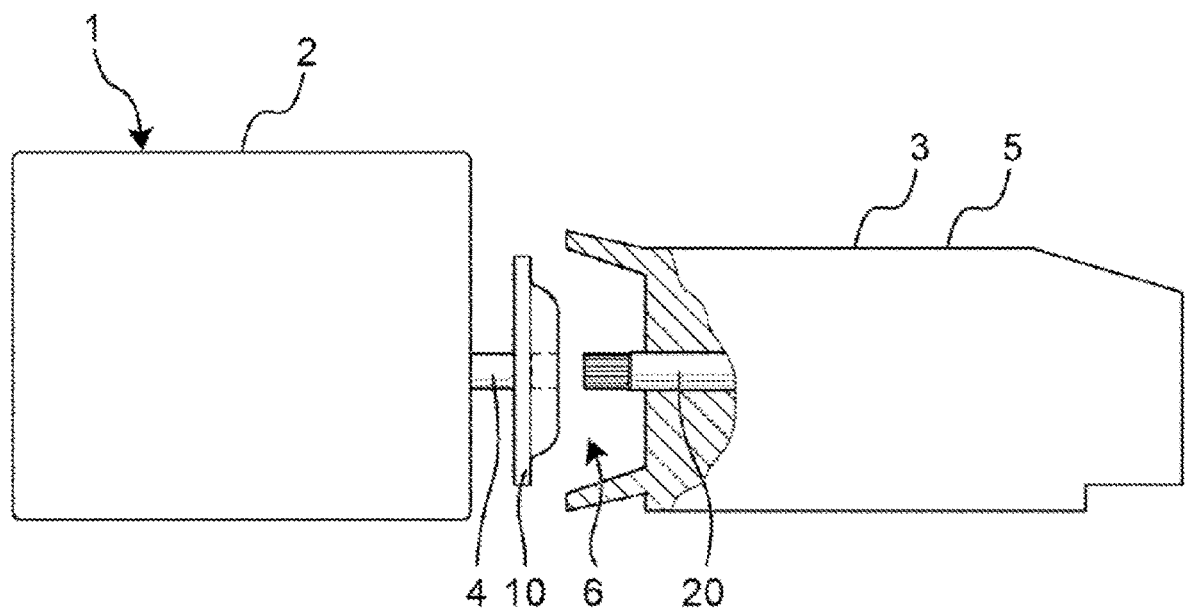
FIG. 1 is a schematic diagram illustrating a power unit including a power transmission system according to Embodiment 1 of the present disclosure.

FIG. 1 is a schematic diagram illustrating a power unit including a power transmission system according to Embodiment 1 of the present disclosure. As illustrated in FIG. 1, a power unit 1 including the power transmission system according to Embodiment 1 is mounted on a vehicle (e.g., a front-engine and rear-drive vehicle), and is disposed such that its axis extends in a front-and-rear direction of the vehicle. The power unit 1 includes an engine 2 as a drive source, and an automatic transmission 3 as a transmission coupled to the engine 2. The engine 2 is, but not limited to, a straight-four engine in which four cylinders are lined up in a row.

The automatic transmission 3 is disposed to be coaxial with an output shaft 4 of the engine 2, and coupled, without intervention of a torque converter, to a flywheel 10 attached fixedly to the output shaft 4 of the engine 2. The automatic transmission 3 is provided with an input shaft 20 which is accommodated in and rotatably supported by a transmission case 5.

Further, although not illustrated, the automatic transmission 3 is provided with a transmission mechanism including a plurality of planetary gear sets (planetary gear mechanism) and a plurality of friction engagement elements (e.g., clutches and brakes), and an output shaft. The transmission mechanism selectively engages the plurality of friction engagement elements to switch a power transmission path via each planetary gear set, thus achieving a given gear stage corresponding to an operation state of the vehicle.

The automatic transmission 3 is attached to the engine 2 by the input shaft 20 being spline-engaged with and assembled to the flywheel 10 attached to the output shaft 4 of the engine 2. The automatic transmission 3 receives, through the input shaft 20 from the flywheel 10, a driving force transmitted from the engine 2, and the driving force from the engine 2 is then transmitted from the output shaft to drive wheels through the transmission mechanism.

A power transmission system 6 according to this embodiment includes the flywheel 10 as a first power transmission member and the input shaft 20 as a second power transmission member, which are assembled together by spline-engagement. The power transmission system 6 uses a biasing member which biases the input shaft 20 with respect to the flywheel 10 in a rotational direction, and a temporarily fixing member which temporarily fixes (temporarily stops) the biasing member to the flywheel 10 in order to reduce teeth rattling noise at a spline-engagement part between the flywheel 10 and the input shaft 20 with an adequate assemblability.

Figure 2:
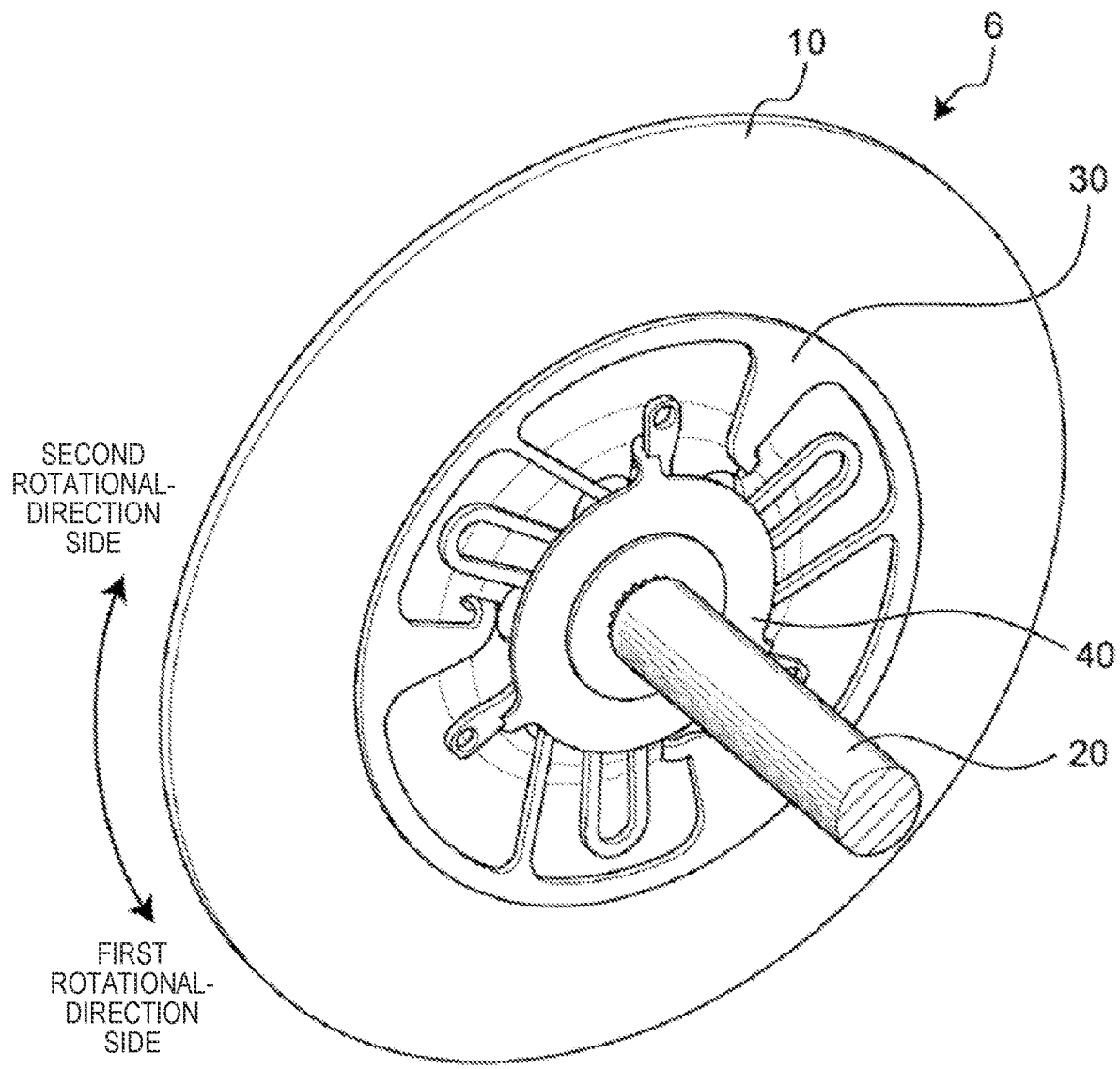
FIG. 2 is a perspective view of the power transmission system.
Figure 3:
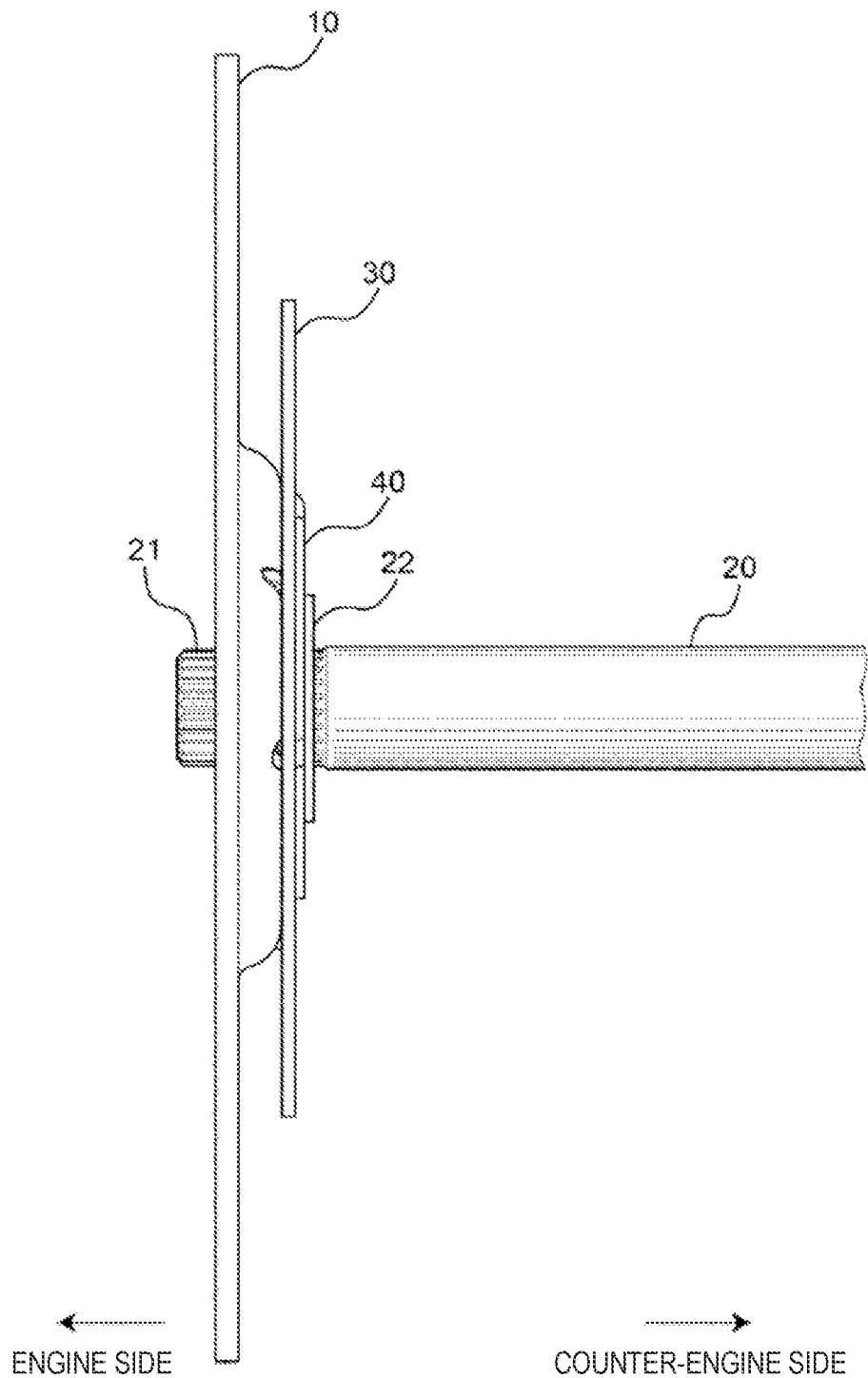
FIG. 3 is a side view of the power transmission system.
Figure 4:
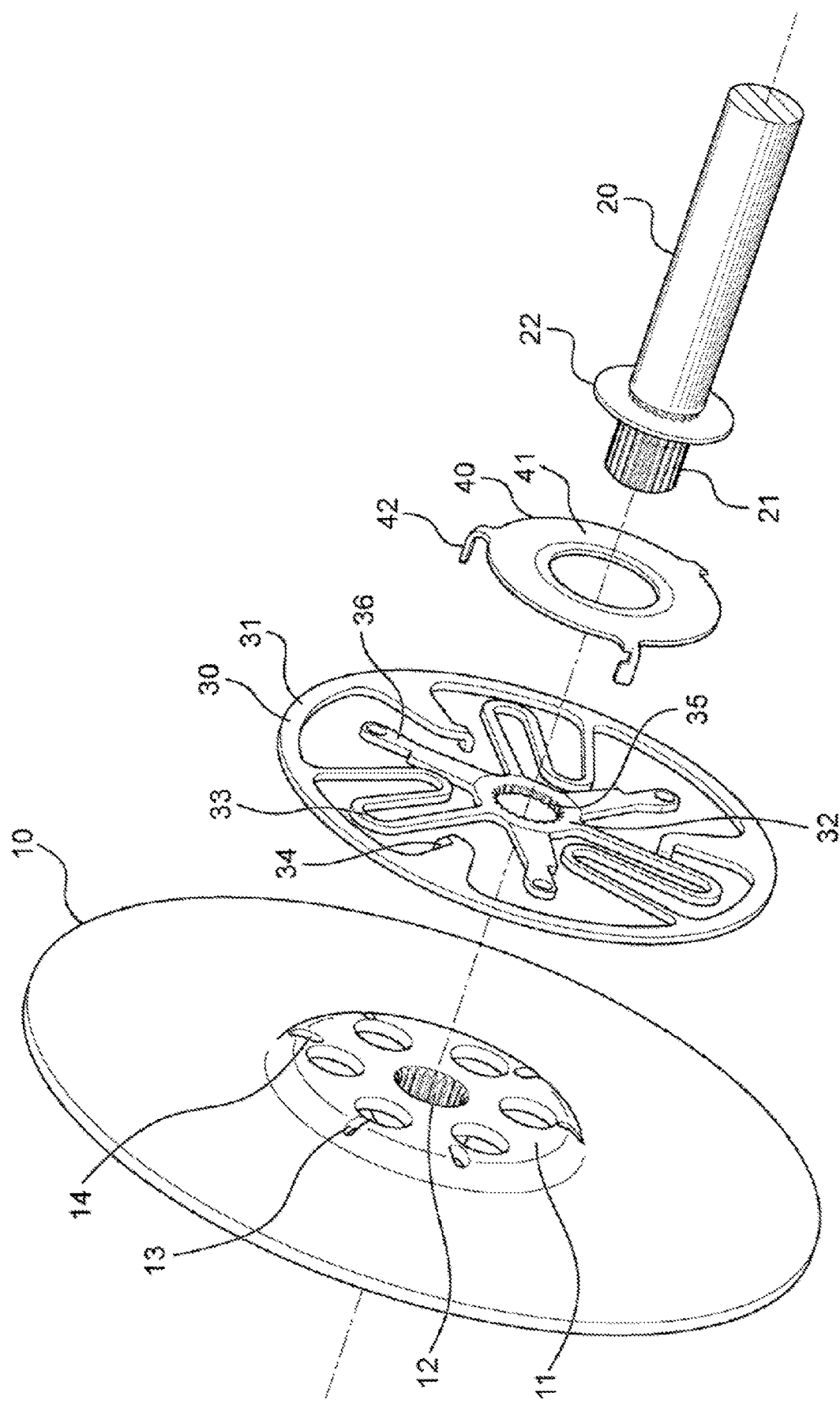
FIG. 4 is an exploded perspective view of the power transmission system.
Figure 5:
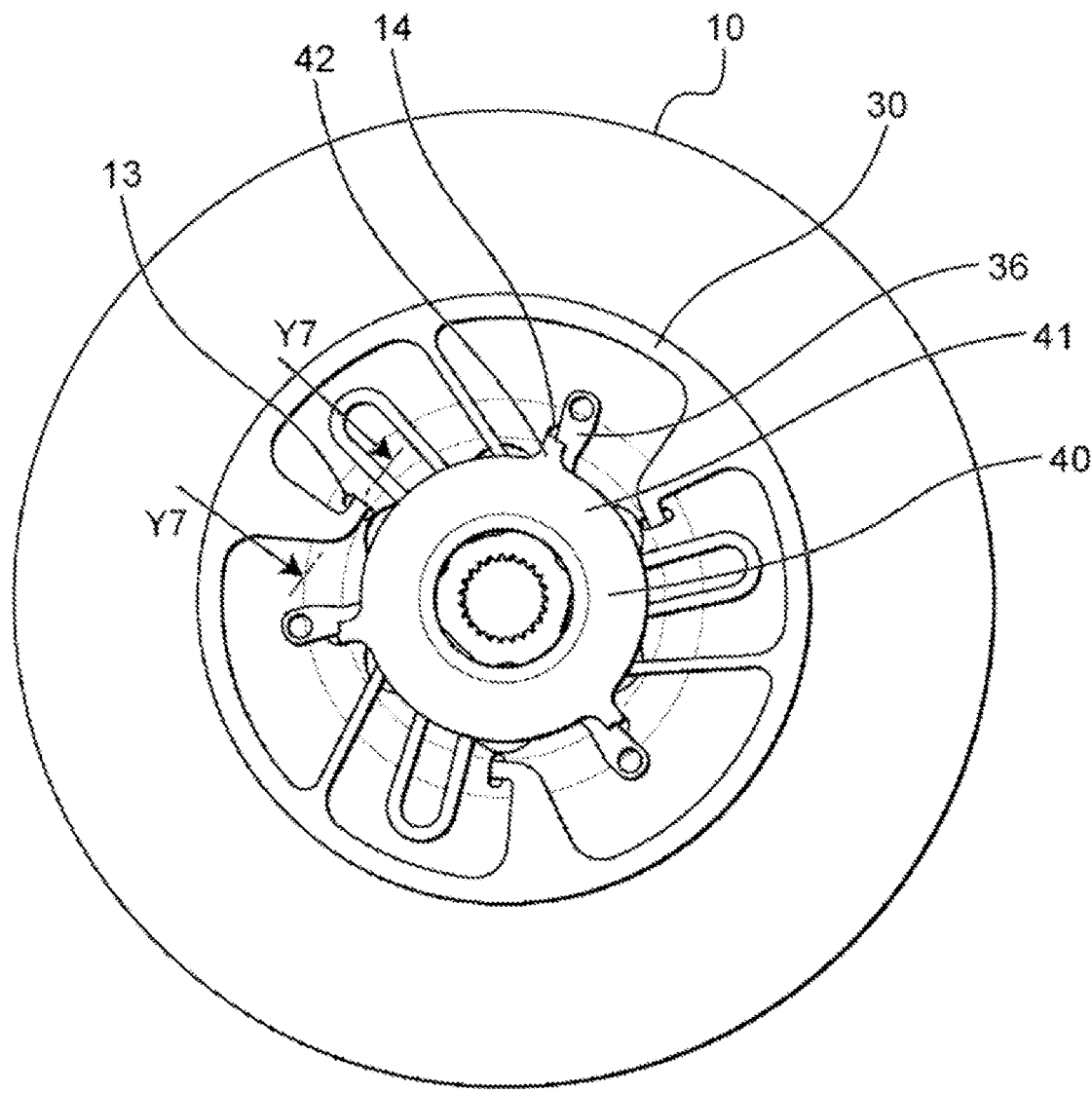
FIG. 5 is a front view of a flywheel, a biasing member, and a temporarily fixing member.
Figure 6:
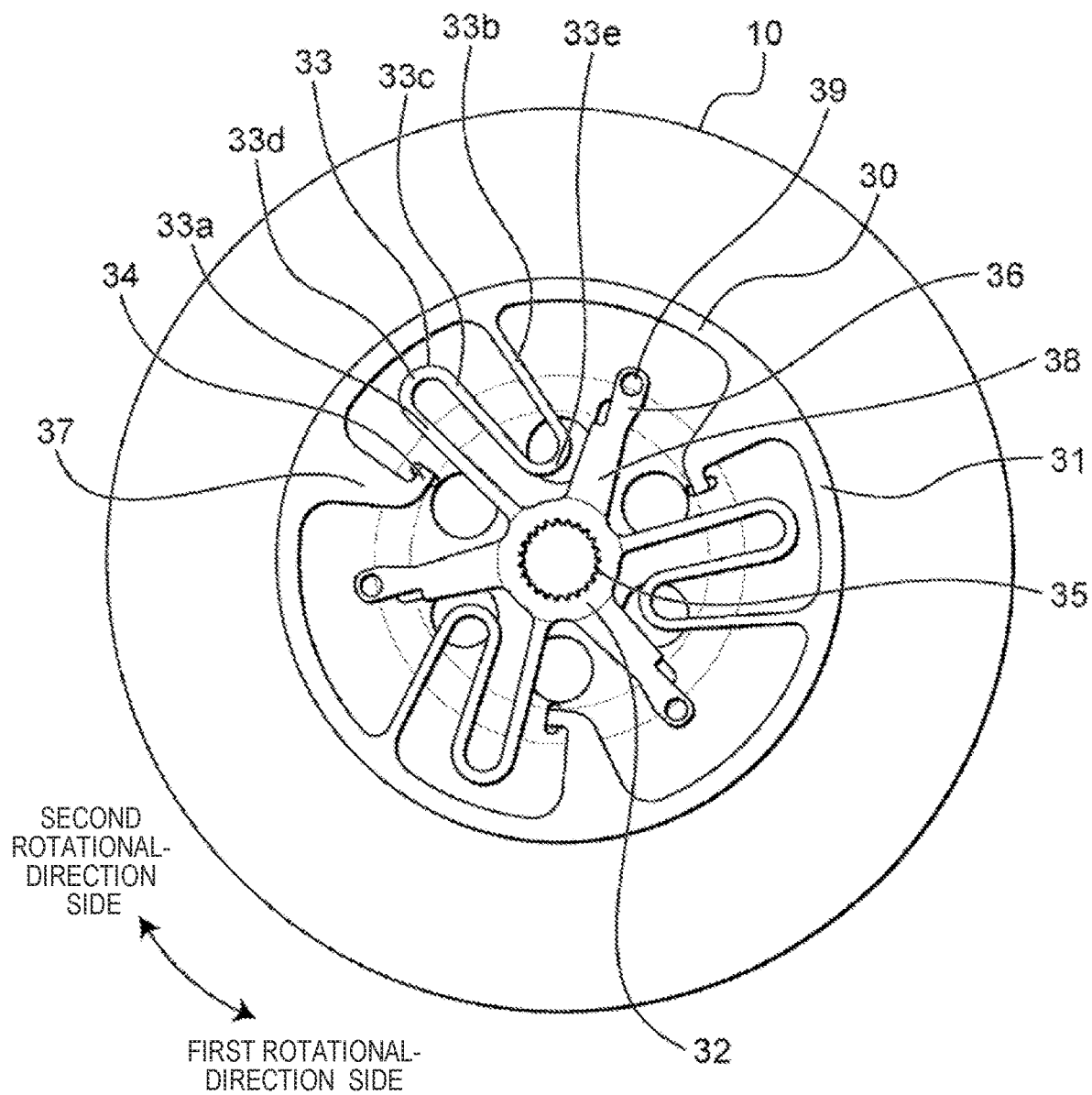
FIG. 6 is a front view of the flywheel and the biasing member.
Figure 7:
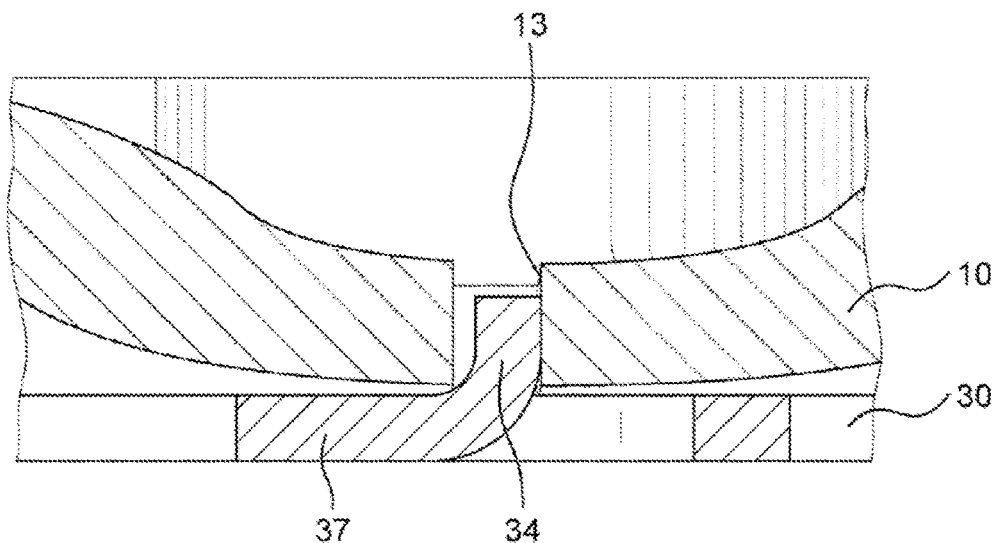
FIG. 7 is a cross-sectional view of the flywheel and the biasing member taken along a line Y7-Y7 in FIG. 5.

FIG. 2 is a perspective view of the power transmission system, FIG. 3 is a side view of the power transmission system, FIG. 4 is an exploded perspective view of the power transmission system, FIG. 5 is a front view of the flywheel, the biasing member, and the temporarily fixing member, FIG. 6 is a front view of the flywheel and the biasing member, and FIG. 7 is a cross-sectional view of the flywheel and the biasing member taken along a line Y7-Y7 in FIG. 5.

As illustrated in FIGS. 2 to 7, a biasing member 30 and a temporarily fixing member 40 which are disposed between the flywheel 10 and the input shaft 20 are provided to the power transmission system 6 in which the flywheel 10 and the input shaft 20, which are rotatably provided to a power transmission path from the engine 2 to the drive wheels, are assembled together by spline-engagement.

As illustrated in FIG. 3, the biasing member 30 is disposed on a first axial side (counter-engine side) of the flywheel 10, the temporarily fixing member 40 is disposed on the first axial side of the biasing member 30, and the input shaft 20 is disposed on the first axial side of the temporarily fixing member 40. The biasing member 30 and the temporarily fixing member 40 are each formed in a substantially plate-like shape in a radial direction to be substantially orthogonal to the axial direction of the flywheel 10 and the input shaft 20.

Although not illustrated, the flywheel 10 is fixed to the output shaft 4 of the engine 2 by a fastening bolt (screw), and is formed annularly to extend in a plate-like shape in the radial direction to be substantially orthogonal to the axial direction. As illustrated in FIG. 4, the flywheel 10 is provided with a bulging part 11 bulging toward the first axial side at a radially inward, and a bulging surface of the bulging part 11 is formed in a planar shape substantially orthogonal to the axial direction. The flywheel 10 is formed, at its radial center, with a spline part 12 to be spline-engaged with the input shaft 20. The spline part 12 has a spline of which a tooth trace extends in the axial direction, and is formed in an inner circumferential surface of the flywheel 10.

The flywheel 10 is formed with a first opening part 13 as a locking part which retains the biasing member 30, and a second opening part 14 as a regulating part which regulates the temporarily fixing member 40 to move toward one side in the rotational direction (first rotational-direction side). Each of the first opening part 13 and the second opening part 14 includes a plurality of (e.g., three of) them which are formed radially outward of the spline part 12 in a circumferential direction (rotational direction) of the flywheel 10 at an equal interval. The first opening parts 13 and the second opening parts 14 are formed to be overlapped with each other in the radial direction of the flywheel 10, and to be alternate in the circumferential direction of the flywheel 10.

Figure 11:
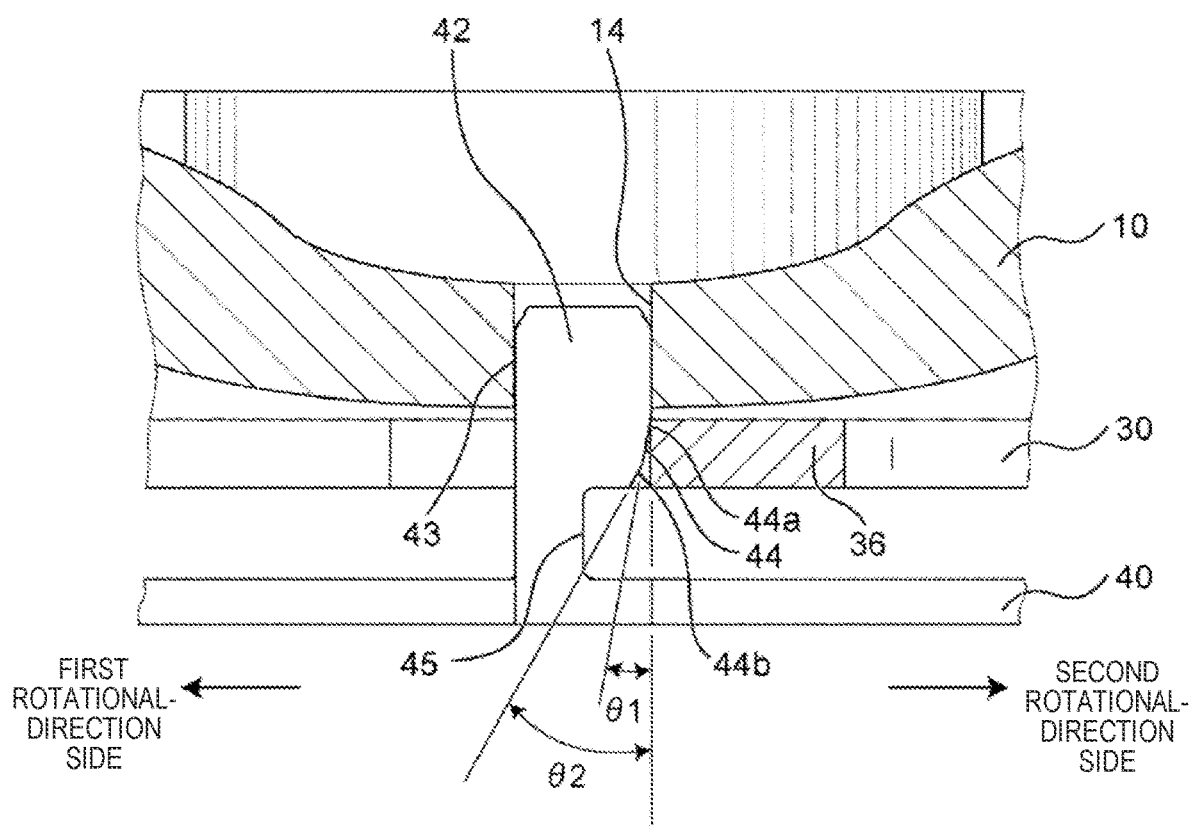
FIG. 11 is a cross-sectional view of the flywheel, the biasing member, and the temporarily fixing member taken along a line Y11-Y11 in FIG. 10.

As illustrated in FIGS. 5 and 7, the first opening part 13 of the flywheel 10 penetrates the flywheel 10 in the axial direction, and is formed in a slot-like shape extending linearly in the radial direction. As illustrated in FIGS. 5 and 11 (described later), the second opening part 14 of the flywheel 10 penetrates the flywheel 10 in the axial direction, and is formed in a slot-like shape extending linearly in the radial direction.

As illustrated in FIGS. 4 and 6, the biasing member 30 is formed annularly so as to extend in a plate-like shape orthogonally to the axial direction. The biasing member 30 includes, at a radially inward, an inner annular part 32 formed annularly in a circular shape, and, at a radially outward, an outer annular part 31 formed annularly in a circular shape, and the outer annular part 31 is located radially outward of the inner annular part 32 to be concentric therewith.

The biasing member 30 is provided with a spring part 33 which is compressible in the rotational direction, a locked part 34 which is provided on one end side of the spring part 33 and caught by the flywheel 10, a spline part 35 which is provided on the other end side of the spring part 33 and spline-engaged with the input shaft 20, and a temporarily fixed part 36 which is temporarily fixed by the temporarily fixing member 40. The spline part 35 of the biasing member 30 has a spline of which a tooth trace extends in the axial direction, and is formed in an inner circumferential surface of the inner annular part 32. The spline part 35 of the biasing member 30 engages with and biases a spline part 21 of the input shaft 20, and the spline part 21 may be formed at a lower machining accuracy compared to the flywheel 10 and the input shaft 20.

The spring part 33 of the biasing member 30 includes a first radially extending part 33a, a second radially extending part 33b, a third radially extending part 33c, an outer coupling part 33*d*, and an inner coupling part 33*e*. The first radially extending part 33*a* extends linearly outward in the radial direction from the inner annular part 32. The second radially extending part 33*b* extends linearly inward in the radial direction from the outer annular part 31 in substantially parallel with the first radially extending part 33*a*. The third radially extending part 33*c* extends linearly in the radial direction between the first radially extending part 33*a* and the second radially extending part 33*b* in substantially parallel with the first radially extending part 33*a* and the second radially extending part 33*b*. The outer coupling part 33*d* extends in an arc shape while coupling the radially outward of the first radially extending part 33*a* and the third radially extending part 33*c*. The inner coupling part 33*e* extends in an arc shape while coupling the radial inside of the third radially extending part 33*c* and the second radially extending part 33*b*.

The spring part 33 is connected at one end to the outer annular part 31, and, at the other end to the inner annular part 32, and is formed in a substantially S-shape when seen from a second axial side. The spring part 33 is configured such that the first radially extending part 33*a* is moved toward the other side in the rotational direction (second rotational-direction side) with respect to the second radially extending part 33*b* and compressed in the rotational direction, by the inner annular part 32 being moved toward the rotational-direction second side with respect to the outer annular part 31.

The locked part 34 of the biasing member 30 is provided on the first rotational-direction side of the spring part 33 so as to extend toward the second axial side from a tip-end part of a first arm part 37 which extends radially inward from the outer annular part 31 (see FIG. 7). The locked part 34 is formed in a substantially rectangular shape in a cross section orthogonal to the axial direction, and is inserted into the first opening part 13 of the flywheel 10 to be locked.

The temporarily fixed part 36 of the biasing member 30 is provided to a tip-end part of a second arm part 38 which extends substantially linearly outward in the radial direction from the inner annular part 32 on the second rotational-direction side of the spring part 33. The temporarily fixed part 36 is formed to dent toward the second rotational-direction side on an end surface of the second arm part 38 at the first rotational-direction side, and is provided at a position corresponding to the second opening part 14 of the flywheel 10.

Each of the spring part 33, the locked part 34, and the temporarily fixed part 36 includes a plurality of (e.g., three of) them which are formed in the biasing member 30 at an equal interval in a circumferential direction. Each spring part 33 is located between the locked part 34 on the first rotational-direction side and the temporarily fixed part 36 on the second rotational-direction side.

The biasing member 30 biases the input shaft 20 toward the first rotational-direction side with respect to the flywheel 10, by engaging the spline part 35 with the spline part 21 of the input shaft 20 while the biasing member 30 is retained by the flywheel 10 and the spring part 33 is in a first compression state where the inner annular part 32 is moved toward the second rotational-direction side with respect to the outer annular part 31.

The second arm part 38 of the biasing member 30 is formed at its tip-end part with a pin insertion hole 39. The pin insertion hole 39 is formed such that a pin provided to a rotary tool (not illustrated) is inserted therein. The inner annular part 32 of the biasing member 30 is moved toward the second rotational-direction side by the rotary tool being moved toward the second rotational-direction side while the pin of the rotary tool is inserted into the pin insertion hole 39.

As illustrated in FIG. 4, the temporarily fixing member 40 is provided with a temporarily fixing body part 41 which is formed annularly so as to extend in a plate-like shape orthogonally to the axial direction, and a temporarily fixing part 42 extending toward the second axial side from the temporarily fixing body part 41. The spline part 21 of the input shaft 20 is inserted through the temporarily fixing body part 41.

The temporarily fixing part 42 extends toward the second axial side from the temporarily fixing body part 41 to have a substantially rectangular shape in the cross section, and temporarily fixes the biasing member 30 to the flywheel 10 in a second compression state where the spring part 33 of the biasing member 30 is compressed more than in the first compression state. The temporarily fixing part 42 is a plurality of (e.g., three) temporarily fixing parts 42 formed in a circumferential direction of the temporarily fixing member 40 at an equal interval. The temporarily fixing parts 42 are formed corresponding to the second opening parts 14 of the flywheel 10 to be inserted into the second opening parts 14.

As illustrated in FIG. 11 (described later), the temporarily fixing part 42 includes, at the first rotational-direction side, a regulated part 43 which is regulated by the second opening part 14 of the flywheel 10, and at the second rotational-direction side, a contact part 44 which contacts the temporarily fixed part 36 of the biasing member 30, and a recess 45 dented toward the first rotational-direction side on the first axial side of the contact part 44.

The regulated part 43 is formed by an end surface of the temporarily fixing part 42 at the first rotational-direction side, which extends linearly in the axial direction of the temporarily fixing member 40. The contact part 44 is formed by an end surface of the temporarily fixing part 42 at the second rotational-direction side, which extends linearly having a given angle with respect to the axial direction of the temporarily fixing member 40.

The contact part 44 is formed by a sloped part which inclines to the rotational-direction first side toward the first axial side. The contact part 44 is provided with a first sloped part as a first contact part 44*a*, and a second sloped part as a second contact part 44*b*. The first contact part 44*a* is provided at the second axial side so as to extend linearly at a given angle $\theta 1$ with respect to the axial direction. The second contact part 44*b* is provided at the first axial side so as to extend linearly at a given angle $\theta 2$ with respect to the axial direction. The given angle $\theta 2$ is larger than the given angle $\theta 1$. For example, the given angle $\theta 1$ is an angle between 5° and 15°, and the given angle $\theta 2$ is an angle between 30° and 45°.

The recess 45 of the temporarily fixing part 42 is formed by the end surface of the temporarily fixing part 42 at the second rotational-direction side, and dented toward the first rotational-direction side in a substantially rectangular shape. The recess 45 is formed such that, when the input shaft 20 is spline-engaged with the flywheel 10, the temporarily fixed part 36 of the biasing member 30 is positioned in the recess 45 without contacting therewith.

As illustrated in FIG. 4, the input shaft 20 has the spline part 21 on an outer circumferential surface at the second axial side (engine side). The spline part 21 has a spline of which a tooth trace extends in the axial direction, and is formed to be spline-engaged with the spline part 12 of the flywheel 10 and the spline part 35 of the biasing member 30.

The input shaft 20 also includes, on the first axial side of the spline part 21, a canceling part 22 which cancels the temporary fixing of the biasing member 30 to the flywheel 10 by the temporarily fixing part 42 of the temporarily fixing member 40. The canceling part 22 extends radially outward from the outer circumferential surface of the input shaft 20 in a circular plate-like shape orthogonally to the axial direction. The canceling part 22 is formed to have an outer diameter larger than an inner diameter of the temporarily fixing body part 41 of the temporarily fixing member 40.

The canceling part 22 is formed such that, when the spline part 21 of the input shaft 20 is inserted through the temporarily fixing member 40 from the first axial side, and is spline-engaged with the spline part 12 of the flywheel 10 through the spline part 35 of the biasing member 30, the input shaft 20 is biased toward the first rotational-direction side with respect to the flywheel 10 while the spline part 35 is engaged with the spline part 21 in the first compression state of the spring part 33.

In the power transmission system 6, after the biasing member 30 is attached to the flywheel 10 from the first axial side to be locked, the temporarily fixing member 40 is attached to the flywheel 10 and the biasing member 30 from the first axial side so that the biasing member 30 is temporarily fixed to the flywheel 10 in the second compression state of the spring part 33. Then, the spline part 21 of the input shaft 20 is spline-engaged with the spline part 12 of the flywheel 10 through the spline part 35 of the biasing member 30 from the first axial side, and thus the input shaft 20 is assembled to the flywheel 10 by spline-engagement.

Figure 8:
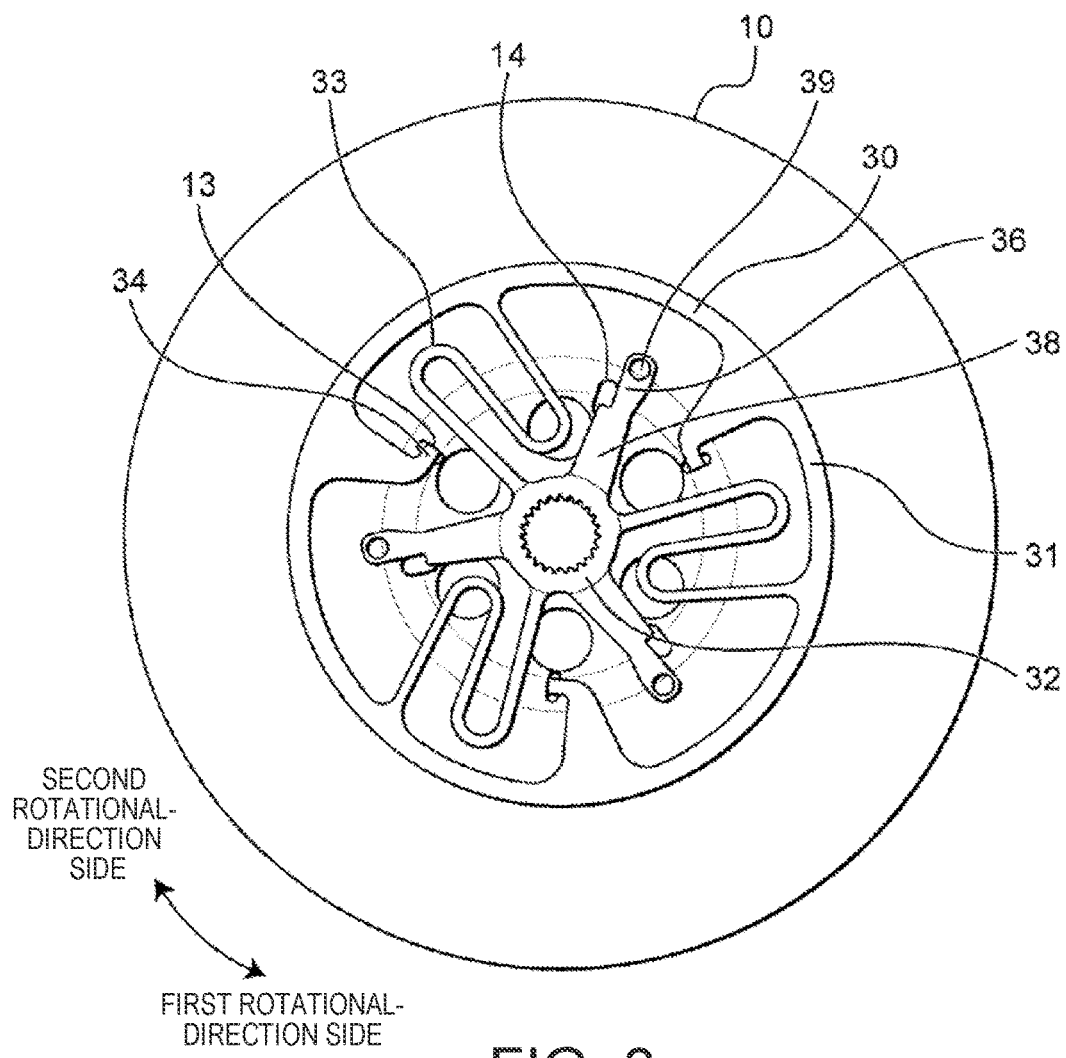
FIG. 8 is a front view of the biasing member and the flywheel when an inner annular part is moved with respect to an outer annular part to the second rotational-direction side.

FIG. 8 is a front view of the biasing member and the flywheel when the inner annular part is moved toward the second rotational-direction side with respect to the outer annular part. Upon assembling of the input shaft 20 to the flywheel 10 by spline-engagement, first, as illustrated in FIG. 6, the locked part 34 of the biasing member 30 is engaged with the locking part 13 of the flywheel 10 so that the biasing member 30 is attached to the flywheel 10.

Then, as illustrated in FIG. 8, the second arm part 38 of the biasing member 30 is moved toward the second rotational-direction side while the locked part 34 is caught by the locking part 13 of the flywheel 10. The inner annular part 32 of the biasing member 30 is moved toward the second rotational-direction side with respect to the outer annular part 31 so that the spring part 33 becomes the second compression state to be compressed more than in the first compression state where the spring part 33 biases the input shaft 20 toward the first rotational-direction side with respect to the flywheel 10.

Figure 9:
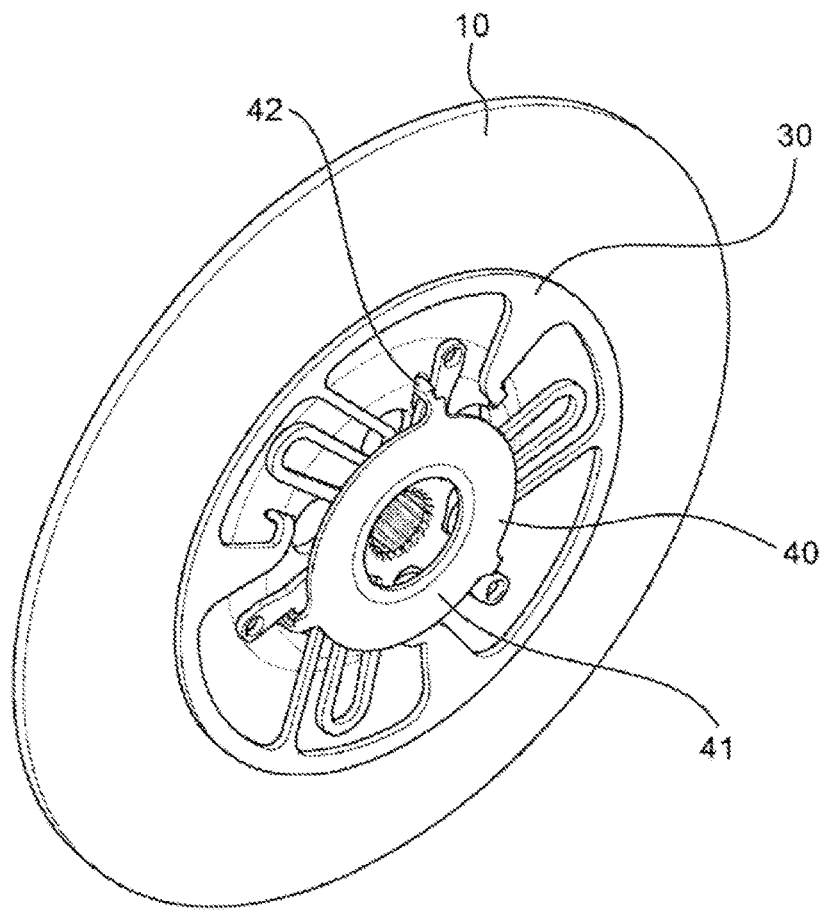
FIG. 9 is a perspective view illustrating a state where the biasing member is temporarily fixed to the flywheel by the temporarily fixing member.
Figure 10:
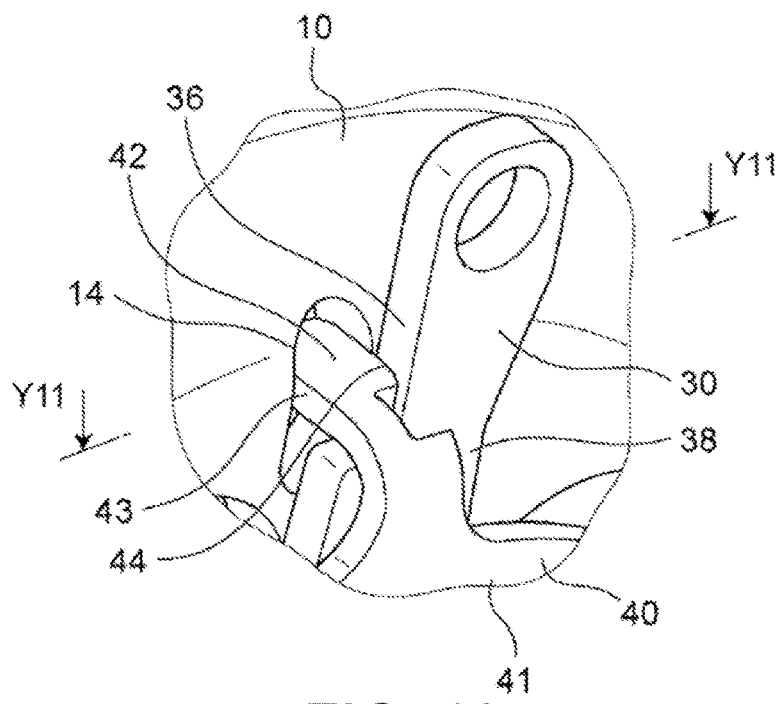
FIG. 10 is an enlarged view of a temporarily fixing part of the temporarily fixing member and therearound illustrated in FIG. 9.

FIG. 9 is a perspective view illustrating a state where the biasing member is temporarily fixed to the flywheel by the temporarily fixing member, FIG. 10 is an enlarged view of the temporarily fixing part of the temporarily fixing member and thereabout illustrated in FIG. 9, and FIG. 11 is a cross-sectional view of the flywheel, the biasing member, and the temporarily fixing member taken along a line Y11-Y11 in FIG. 10. As illustrated in FIG. 9, the biasing member 30 is temporarily fixed to the flywheel 10 by the temporarily fixing member 40 being attached to the flywheel 10 and the biasing member 30 while the spring part 33 of the biasing member 33 is compressed in the second compression state.

As illustrated in FIGS. 10 and 11, the temporarily fixing member 40 temporarily fixes the biasing member 30 to the flywheel 10 by inserting the temporarily fixing part 42 to the second opening part 14 of the flywheel 10 so that the contact part 44 of the temporarily fixing part 42 contacts the temporarily fixed part 36 of the biasing member 30 and the regulated part 43 of the temporarily fixing part 42 is regulated by the regulating part 14. When the temporarily fixing member 40 temporarily fixes the biasing member 30 to the flywheel 10, the spline part 35 of the biasing member 30 and the spline part 12 of the flywheel 10 are positioned such that their splines are substantially in agreement with each other.

Figure 12:
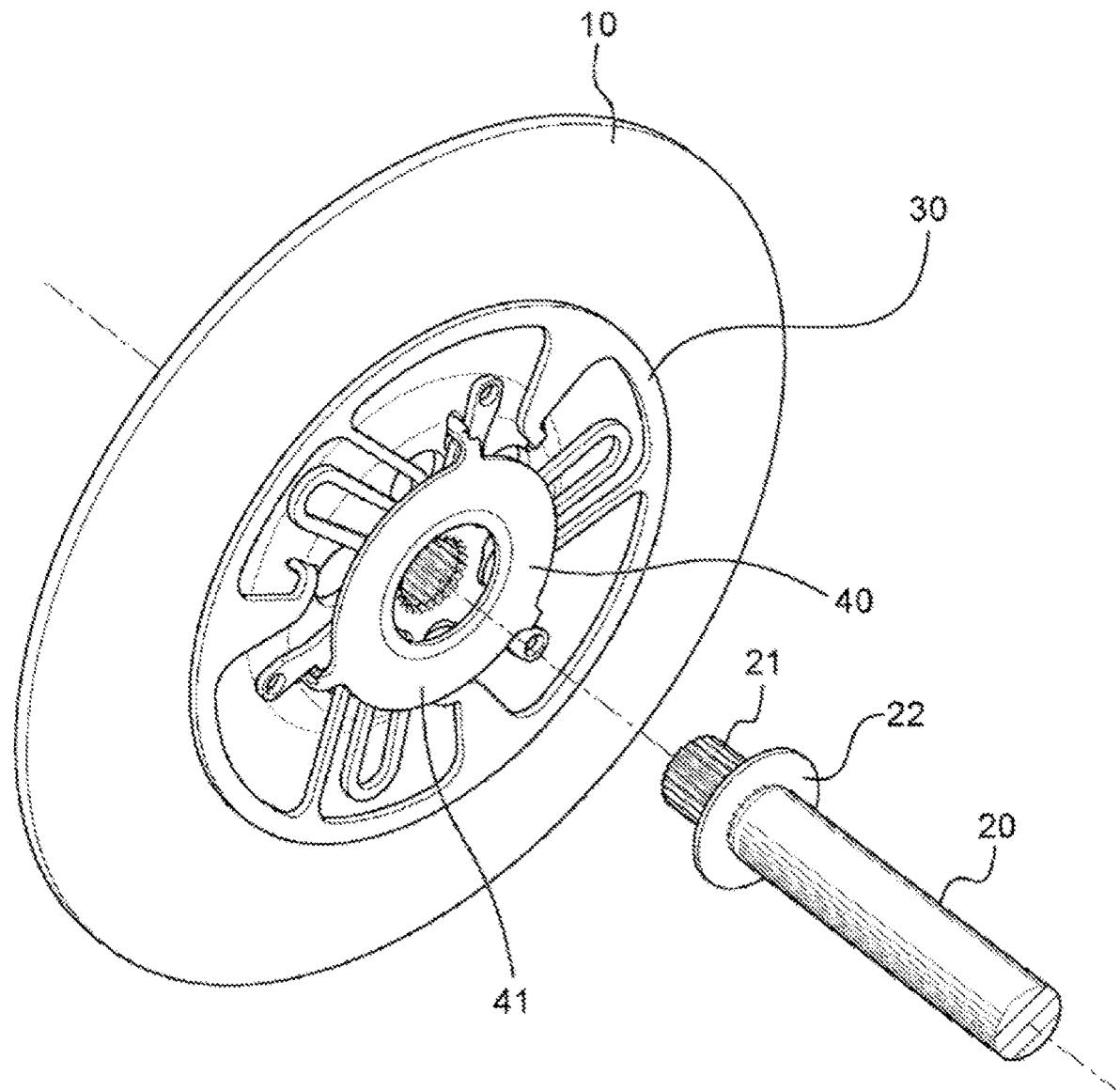
FIG. 12 is an explanatory diagram illustrating assembly of an input shaft to the flywheel.

FIG. 12 is an explanatory diagram illustrating assembly of the input shaft to the flywheel. Next, as illustrated in FIG. 12, the spline part 21 is inserted into the temporarily fixing member 40 and spline-engaged with the spline part 12 of the flywheel 10 through the spline part 35 of the biasing member 30 so that the input shaft 20 is assembled from the first axial side.

Figure 13:
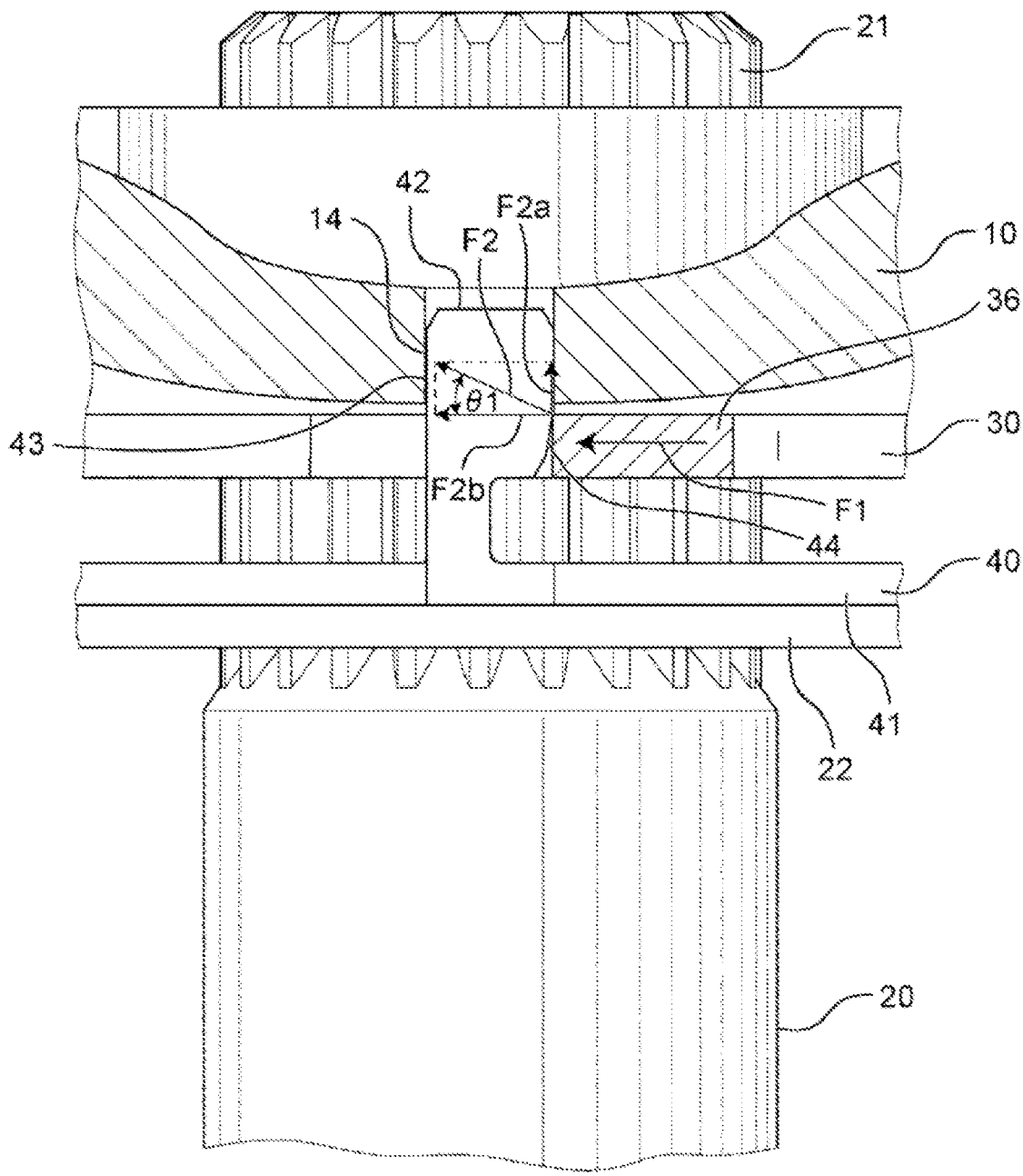
FIG. 13 is an explanatory diagram illustrating canceling of the temporary fixing of the biasing member from the flywheel.

FIG. 13 is an explanatory diagram illustrating a canceling of the temporary fixing of the biasing member from the flywheel. When assembling the input shaft 20 to the flywheel 10, as illustrated in FIG. 13, the spline part 21 of the input shaft 20 is inserted into the temporarily fixing member 40 and spline-engaged with the spline part 12 of the flywheel 10 through the spline part 35 of the biasing member 30, and thus the input shaft 20 is spline-engaged with the flywheel 10.

When the input shaft 20 is spline-engaged with the flywheel 10, the canceling part 22 of the input shaft 20 contacts the temporarily fixing body part 41 of the temporarily fixing member 40, and accompanying with the motion of the input shaft 20 toward the second axial side, the canceling part 22 moves the temporarily fixing member 40 toward the second axial side, and thus the temporarily fixing part 42 is moved toward the second axial side.

When the temporarily fixing part 42 is moved toward the second axial side, a biasing force F1 from the temporarily fixed part 36 of the biasing member 30 to the first rotational-direction side is acted on the contact part 44 of the temporarily fixing part 42 by the spring part 33 of the biasing member 30 in the compressed state. The biasing force F1 is applied to the temporarily fixing part 42 so as to be pressed at a pressing force F2 orthogonal to the sloped part of the contact part 44, at the contacting part between the temporarily fixed part 36 and the contact part 44.

The pressing force F2 is decomposed into a pressing force F2a in the axial direction and a pressing force F2b in a rotational direction, and the temporarily fixing part 42 is pressed in the axial direction at the axial pressing force F2a. The pressing force F2a is expressed by "F1·tan θ1" at the first contact part 44a, and "F1·tan θ2" at the second contact part 44b.

The sloped part formed in the contact part 44 converts the biasing force F1 by the spring part 33 of the biasing member 30 into the force F2a in the direction for canceling the temporary fixing of the biasing member 30 from the flywheel 10. The sloped part formed in the contact part 44 inclines to the first rotational-direction side toward the first axial side, and constitutes an assisting mechanism which assists the canceling of the temporary fixing of the biasing member 30 by the canceling part 22 of the input shaft 20.

Figure 14:
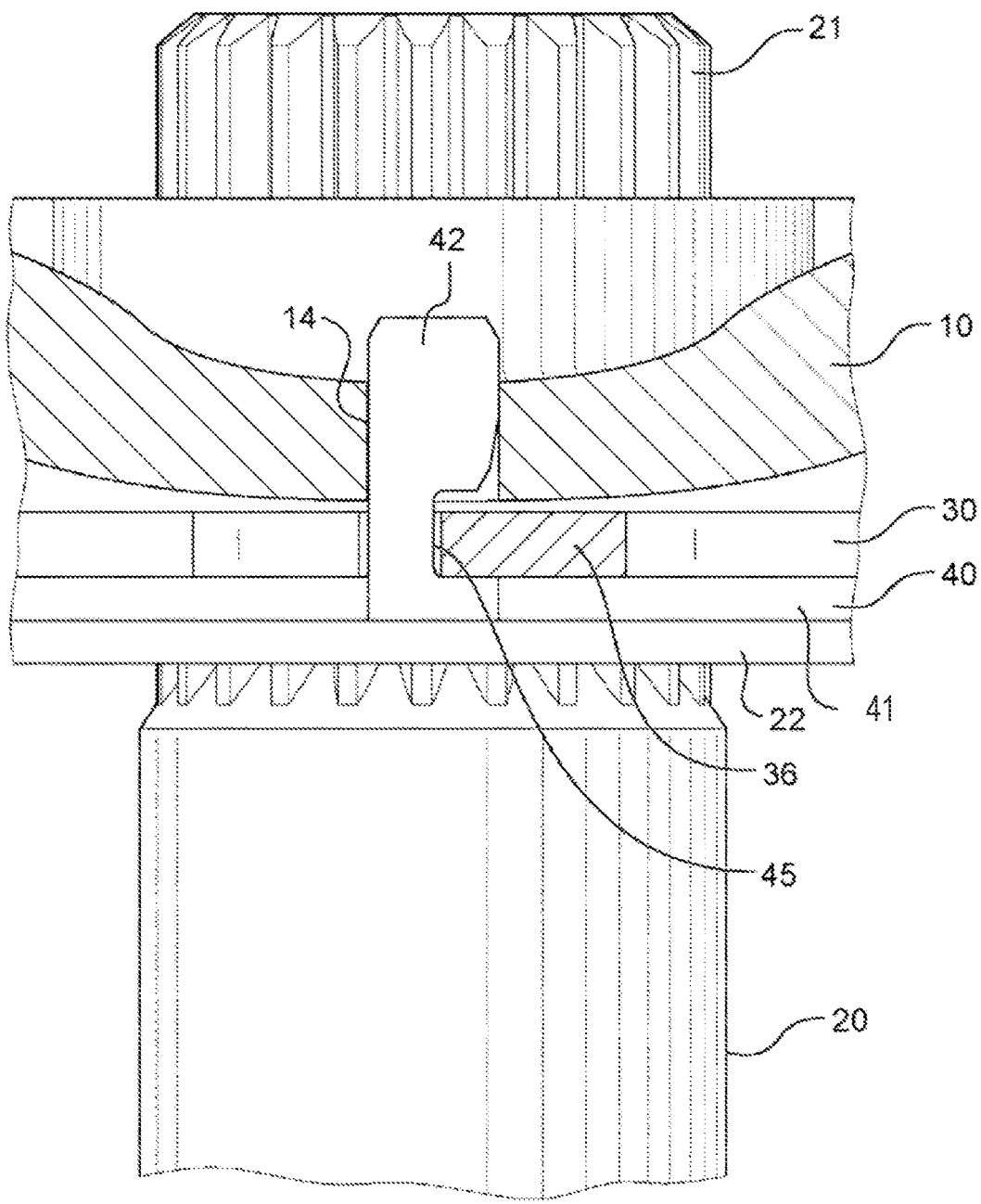
FIG. 14 is another explanatory diagram illustrating the canceling of the temporary fixing of the biasing member from the flywheel.

FIG. 14 is another explanatory diagram illustrating the canceling of the temporary fixing of the biasing member from the flywheel. As illustrated in FIG. 14, when the input shaft 20 is moved toward the second axial side until the canceling part 22 moves the temporarily fixing body part 41 and the temporarily fixing part 42 to the second axial side and the temporarily fixed part 36 is positioned in the recess 45 without contacting therewith, the temporary fixing of the biasing member 30 to the flywheel 10 is canceled by the canceling part 22, and the input shaft 20 is assembled to the flywheel 10 by spline-engagement.

When the input shaft 20 is moved toward the second axial side until the temporarily fixed part 36 is positioned in the recess 45, the spring part 33 moves the inner annular part 32 of the biasing member 30 toward the first rotational-direction side with respect to the outer annular part 31. Accordingly, while the biasing member 30 is locked by the flywheel 10 and the spline part 35 is engaged with the spline part 21 of the input shaft 20 in the first compression state of the spring part 33, the biasing member 30 biases the input shaft 20 toward the first rotational-direction side with respect to the flywheel 10.

Figure 15:
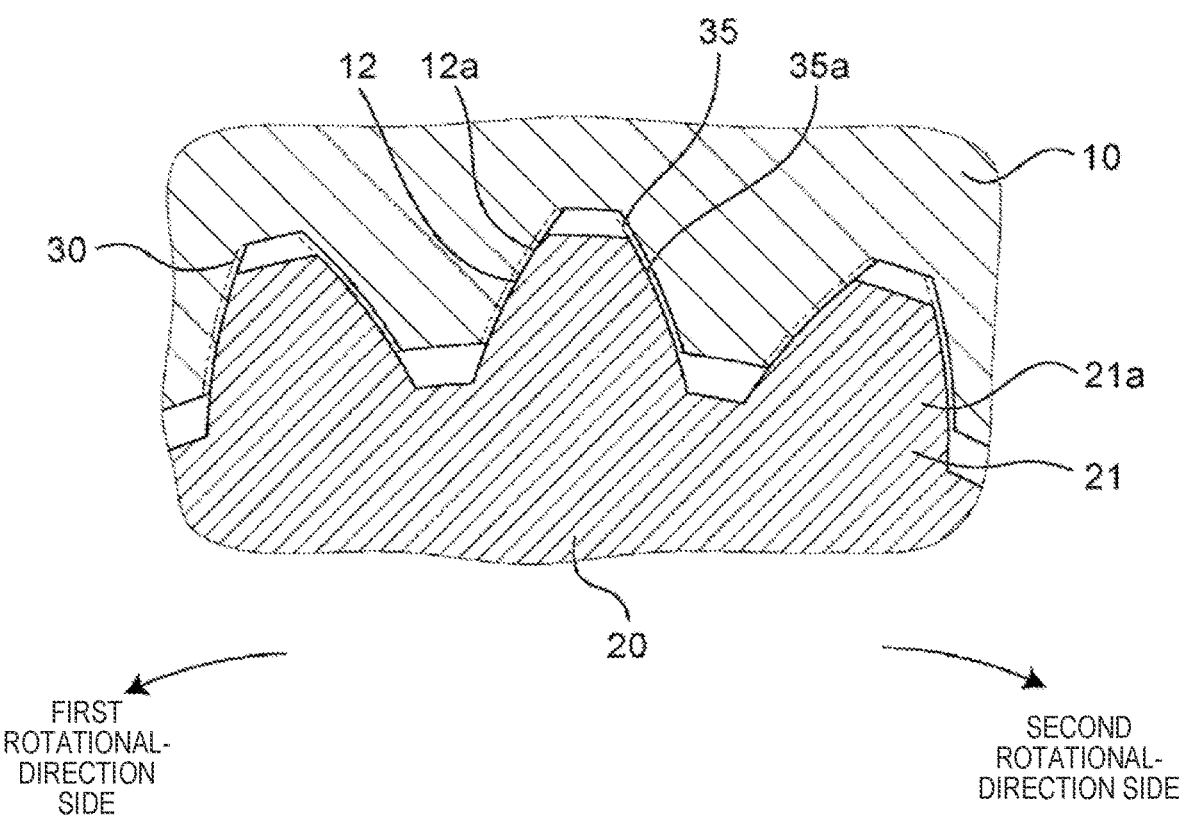
FIG. 15 is a diagram illustrating a spline-engagement part in which the input shaft is biased with respect to the flywheel by the biasing member.

FIG. 15 is a diagram illustrating the spline-engagement part where the input shaft is biased with respect to the flywheel by the biasing member. As illustrated in FIG. 15, at the spline-engagement part where the spline part 12 of the flywheel 10 and the spline part 21 of the input shaft 20 are spline-engaged with each other, the input shaft 20 is biased toward the first rotational-direction side by the biasing member 30, a second rotational-direction side of a tooth part 21a of the spline part 21 of the input shaft 20 is engaged with a first rotational-direction side of a tooth part 35a of the spline part 35 of the biasing member 30, and a first rotational-direction side of the tooth part 21a is engaged with a second rotational-direction side of a tooth part 12a of the spline part 12 of the flywheel 10.

In this manner, the power transmission system 6 uses the biasing member 30 which biases the input shaft 20 in the rotational direction with respect to the flywheel 10, and the temporarily fixing member 40 which temporarily fixes the biasing member 30 to the flywheel 10 so as to bias the input shaft 20 by the biasing member 30 toward the first rotational-direction side with respect to the flywheel 10. As a result, the teeth rattling noise at the spline-engagement part between the flywheel 10 and the input shaft 20 can be reduced.

In the power transmission system 6, the biasing member 30 is attached to the flywheel 10 to be locked, the temporarily fixing member 40 is attached to the flywheel 10 and the biasing member 30 so as to temporarily fix the biasing member 30 to the flywheel 10 in the compressed state of the spring part 33, and the input shaft 20 is assembled to the flywheel 10 by spline-engagement. Therefore, the input shaft 20 can be assembled to the flywheel 10 by spline-engagement with suitable assemblability. When the input shaft 20 attached to the automatic transmission 3 is assembled to the flywheel 10 attached to the output shaft 4 of the engine 2, they can be assembled together by spline-engagement with adequate assemblability.

Although in this embodiment the biasing member 30 biases the input shaft 20 to the first rotational-direction side with respect to the flywheel 10, the biasing member 30 may bias the input shaft 20 toward the second rotational-direction side. Although the locking part 13 and the regulating part 14 formed in the flywheel 10 are formed to penetrate the flywheel 10, they may be formed as openings dented toward the second axial side from one side without penetrating the flywheel 10. Although the contact part 44 of the temporarily fixing part 42 has the first contact part 44a and the second contact part 44b, the contact part 44 may include only the first contact part 44a.

Although each of the locked part 34, the spring part 33, and the temporarily fixed part 36 of the biasing member 30 includes three parts provided in the circumferential direction of the biasing member 30 at a substantially equal interval, each of them may include two or four parts provided in the circumferential direction of the biasing member 30 at a substantially equal interval. Also in such a case, the locking parts 13 and the regulating parts 14 of the flywheel 10, and the temporarily fixing parts 42 of the temporarily fixing member 40 are provided corresponding to the locked parts 34 and the temporarily fixed parts 36 of the biasing member 30.

In this embodiment, the biasing member 30 includes the spring part 33 which is compressible in the rotational direction, and is formed to bias the input shaft 20 toward the first rotational-direction side with respect to the flywheel 10 in the first compression state of the spring part 33. The temporarily fixing member 40 temporarily fixes the biasing member 30 to the flywheel 10 in the second compression state where the spring part 33 is compressed more than in the first compression state, and the spring part 33 is elastically displaceable to be compressed in the rotational direction. However, the spring part 33 may be elastically displaceable to be stretched in the rotational direction.

The biasing member 30 may include a spring part which is stretchable (tensible) in the rotational direction, and may be formed to bias the input shaft 20 to the first rotational-direction side with respect to the flywheel 10 in a first stretched state of the spring part. The temporarily fixing member 40 may temporarily fix the biasing member 30 to the flywheel 10 in a second stretched state where the spring part is stretched more than in the first stretched state.

In such a case, the spring part is stretched in the rotational direction by the inner annular part 32 being moved toward the second rotational-direction side with respect to the outer annular part 31. When the spline part 21 of the input shaft 20 is spline-engaged with the spline part 12 of the flywheel 10 through the spline part 35 of the biasing member 30, the canceling part 22, which is provided to the first axial side of the spline part 21, cancels the temporary fixing of the biasing member 30 to the flywheel 10 by the temporarily fixing part of the temporarily fixing member 40 so that the spline part 35 is engaged with the spline part 21 in the first stretched state of the spring part, and the input shaft 20 is biased toward the first rotational-direction side with respect to the flywheel 10.

As described above, in the power transmission system 6 according to this embodiment, the biasing member 30 and the temporarily fixing member 40 are used for assembling the first and second power transmission members 10 and 20 by spline-engagement. The biasing member 30 biases the second power transmission member 20 toward the first rotational-direction side with respect to the first power transmission member 10 by engaging the spline part 35 with the spline part 21 of the second power transmission member 20 while the biasing member 30 is locked by the first power transmission member 10 and the spring part 33 is in a first elastically displaced state. The temporarily fixing member 40 includes the temporarily fixing part 42 which temporarily fixes the biasing member 30 to the first power transmission member 10 in a second elastically displaced state where the spring part 33 is elastically displaced more than in the first elastically displaced state. Moreover, the canceling part 22 which cancels the temporary fixing of the biasing member 30 to the first power transmission member 10 by the temporarily fixing part 42 is provided to the first axial side of the spline part 21 of the second power transmission member 20.

According to this configuration, the biasing member 30 is attached to the first power transmission member 10 to be locked, the temporarily fixing member 40 is attached to the first power transmission member 10 and the biasing member 30 so as to temporarily fix the biasing member 30 to the first power transmission member 10 in the second elastically displaced state of the spring part 33, and the spline part 21 of the second power transmission member 20 is spline-engaged with the spline part 12 of the first power transmission member 10 through the spline part 35 of the biasing member 30 so that the second power transmission member 20 is assembled to the first power transmission member 10. Accordingly, the temporary fixing of the biasing member 30 to the first power transmission member 10 by the temporarily fixing part 42 of the temporarily fixing member 40 is canceled, and the second power transmission member 20 is biased toward the first rotational-direction side with respect to the first power transmission member 10. As a result, the teeth rattling noise at the spline-engagement part between the first and second power transmission members 10 and 20 is reduced.

By engaging the biasing member 30 to the first power transmission member 10, temporarily fixing the biasing member 30 to the first power transmission member 10 by the temporarily fixing member 40, and spline-engaging the second power transmission member 20 to the first power transmission member 10, the second power transmission member 20 can be biased toward the first rotational-direction side with respect to the first power transmission member 10, without changing the shapes of the spline parts 12 and 21 of the first and second power transmission members 10 and 20, and thus the assembly is comparatively easier. As a result, the teeth rattling noise at the spline-engagement part between the first and second power transmission members 10 and 20 can be reduced with adequate assemblability in a comparatively simple configuration.

Further, the biasing member 30 includes the spring part 33, the locked part 34, the spline part 35, the inner annular part 32, the outer annular part 31, and the temporarily fixed part 36 which is temporarily fixed by the temporarily fixing part 42. The locked part 34 is connected to the outer annular part 31, and the spline part 35 and the temporarily fixed part 36 are connected to the inner annular part 32. The spring part 33 is connected at one end to the outer annular part 31, and, at the other end, to the inner annular part 32, and is elastically displaced in the rotational direction by the inner annular part 32 being moved toward the second rotational-direction side with respect to the outer annular part 31.

According to this configuration, since the biasing member 30 having the spring part 33 which is elastically displaced in the rotational direction by the inner annular part 32 being moved toward the second rotational-direction side with respect to the outer annular part 31 is used, unlikely to a case of using a spring as the biasing member 30, a spring holding member which holds the spring is unnecessary, and thus the assemblability is improved.

Further, the temporarily fixing member 40 is provided with the temporarily fixing body part 41 into which the spline part 21 of the second power transmission member 20 is inserted, and the temporarily fixing part 42 which extends toward the second axial side from the temporarily fixing body part 41. The temporarily fixing part 42 includes, at the first rotational-direction side, the regulated part 43 which is regulated by the first power transmission member 10. The temporarily fixing part 42 also includes, at the second rotational-direction side, the contact part 44 which contacts the temporarily fixed part 36, and on the first axial side of the contact part 44, the recess 45 which is dented toward the rotational-direction first side. The recess 45 is formed such that, when the canceling part 22 cancels the temporary fixing of the biasing member 30 from the first power transmission member 10, the temporarily fixing body part 41 and the temporarily fixing part 42 are moved toward the second axial side by the canceling part 22, and the temporarily fixed part 36 is positioned inside the recess 45.

According to this configuration, since the recess 45 is provided to the second rotational-direction side of the temporarily fixing part 42 of the temporarily fixing member 40 on the first axial side of the contact part 44, the temporary fixing of the biasing member 30 to the first power transmission member 10 can be canceled by positioning the temporarily fixed part 36 in the recess 45 when canceling the fixing.

Further, an assisting mechanism (contact part 44) which assists the canceling of the temporary fixing of the biasing member 30 by the canceling part 22 is provided.

According to this configuration, since the assisting mechanism assists the canceling of the temporary fixing of the biasing member 30 by the canceling part 22, the temporary fixing of the biasing member 30 can be canceled comparatively easily. As a result, the assemblability of the second power transmission member 20 to the first power transmission member 10 is improved.

Further, the biasing member 30 includes the temporarily fixed part 36 which is temporarily fixed by the temporarily fixing part 42, and the temporarily fixing part 42 includes, at the first rotational-direction side, the regulated part 43 which is regulated by the first power transmission member 10, and at the second rotational-direction side, the contact part 44 which contacts the temporarily fixed part 36. The contact part 44 is formed by a sloped part which inclines to the first rotational-direction side toward the first axial side, and the assisting mechanism is comprised of the sloped part.

According to this configuration, the sloped part formed in the contact part 44 of the temporarily fixing part 42 and constituting the assisting mechanism inclines to the first rotational-direction side toward the first axial side. Therefore, the biasing force F1 applied by the spring part 33 to the contact part 44 from the temporarily fixed part 36 toward the first rotational-direction side can be converted into the force F2$a$ in the canceling direction of the temporary fixing of the biasing member 30 from the first power transmission member 10. As a result, the force required for canceling the temporary fixing of the biasing member 30 can be reduced, which improves the assemblability.

Further, the first power transmission member 10 is the flywheel 10 coupled to the output shaft 4 of the engine 2, and the second power transmission member 20 is the input shaft 20 of the transmission 3.

According to this configuration, the power transmission system 6 including the flywheel 10 and the input shaft 20 of the transmission 3 which are assembled together by spline-engagement can reduce the teeth rattling noise at the spline-engagement part between the flywheel 10 and the input shaft 20 with adequate assemblability in the comparatively simple configuration.

Figure 16:
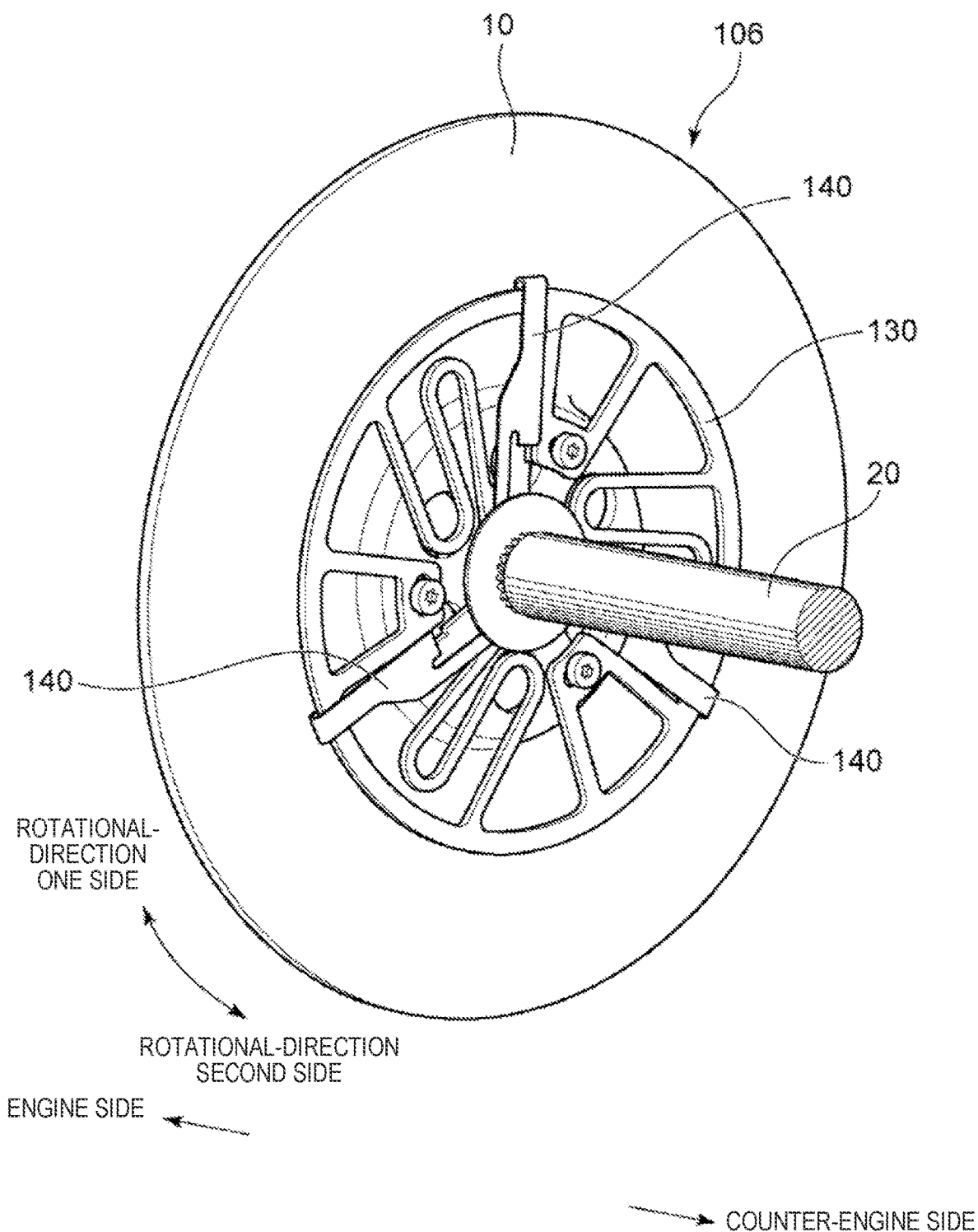
FIG. 16 is a perspective view of a power transmission system according to Embodiment 2 of the present disclosure.
Figure 17:
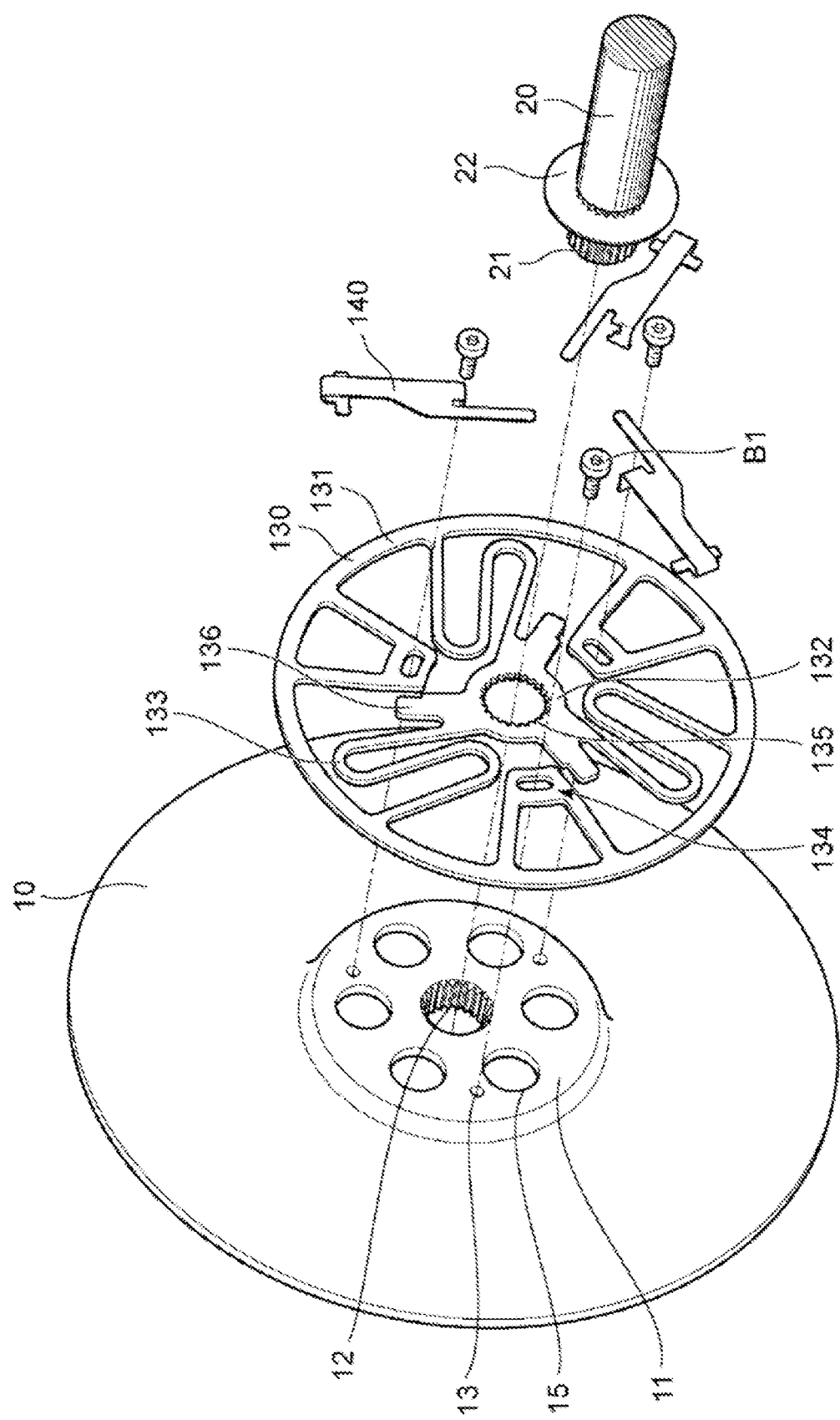
FIG. 17 is an exploded perspective view of the power transmission system.
Figure 18:
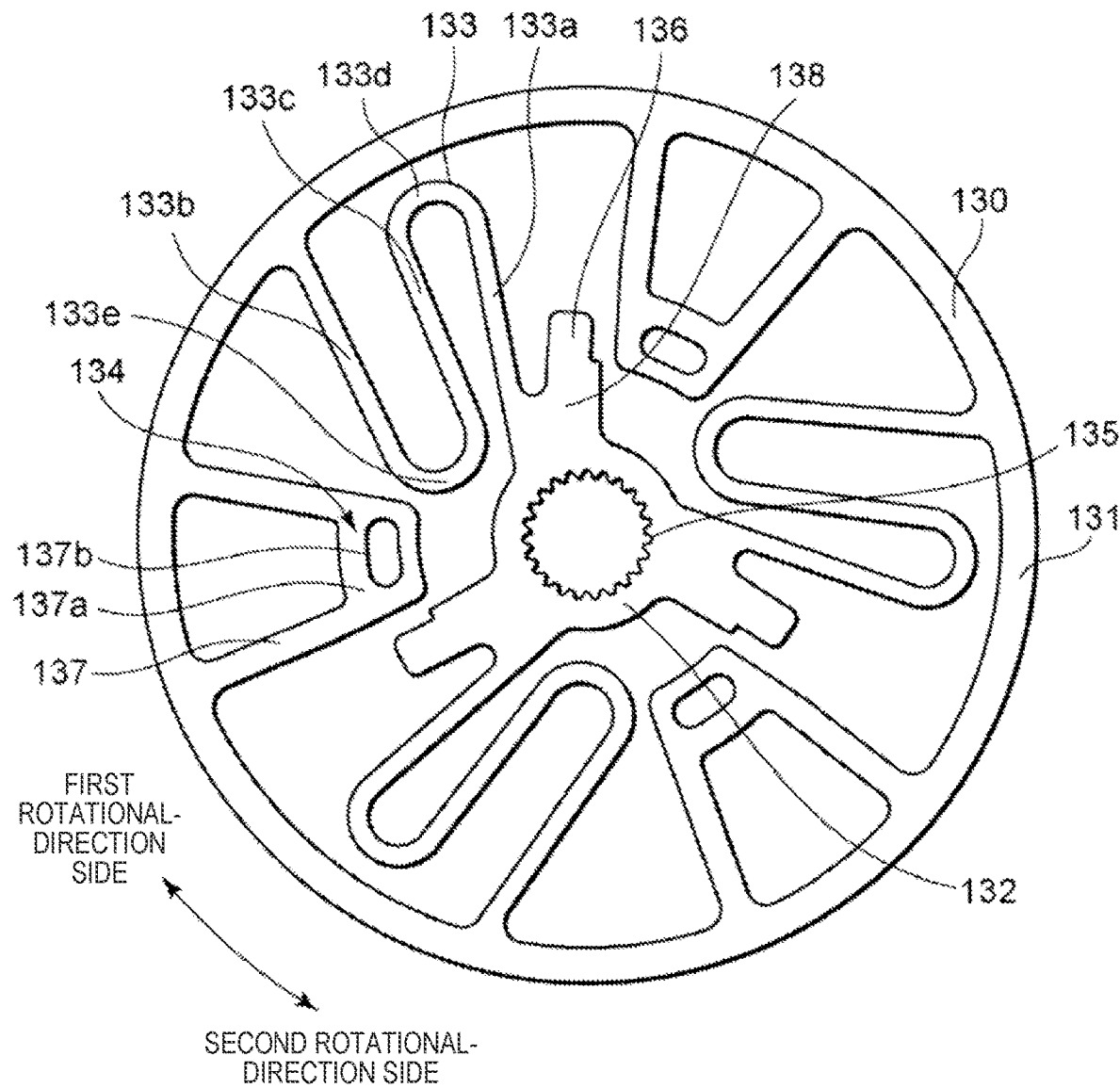
FIG. 18 is a front view of a biasing member.
Figure 19:
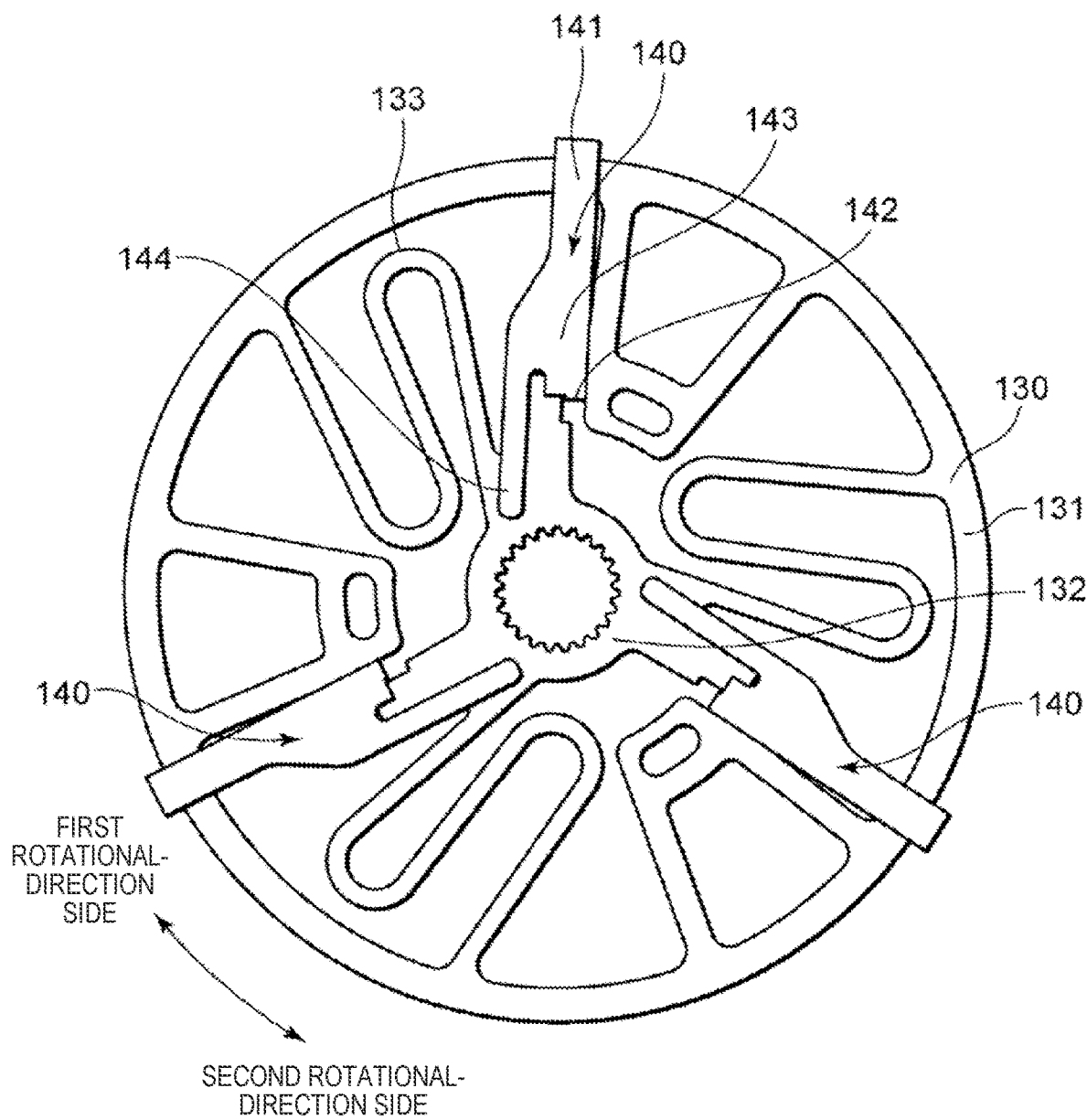
FIG. 19 is a front view of the biasing member and a temporarily fixing member.
Figure 20:
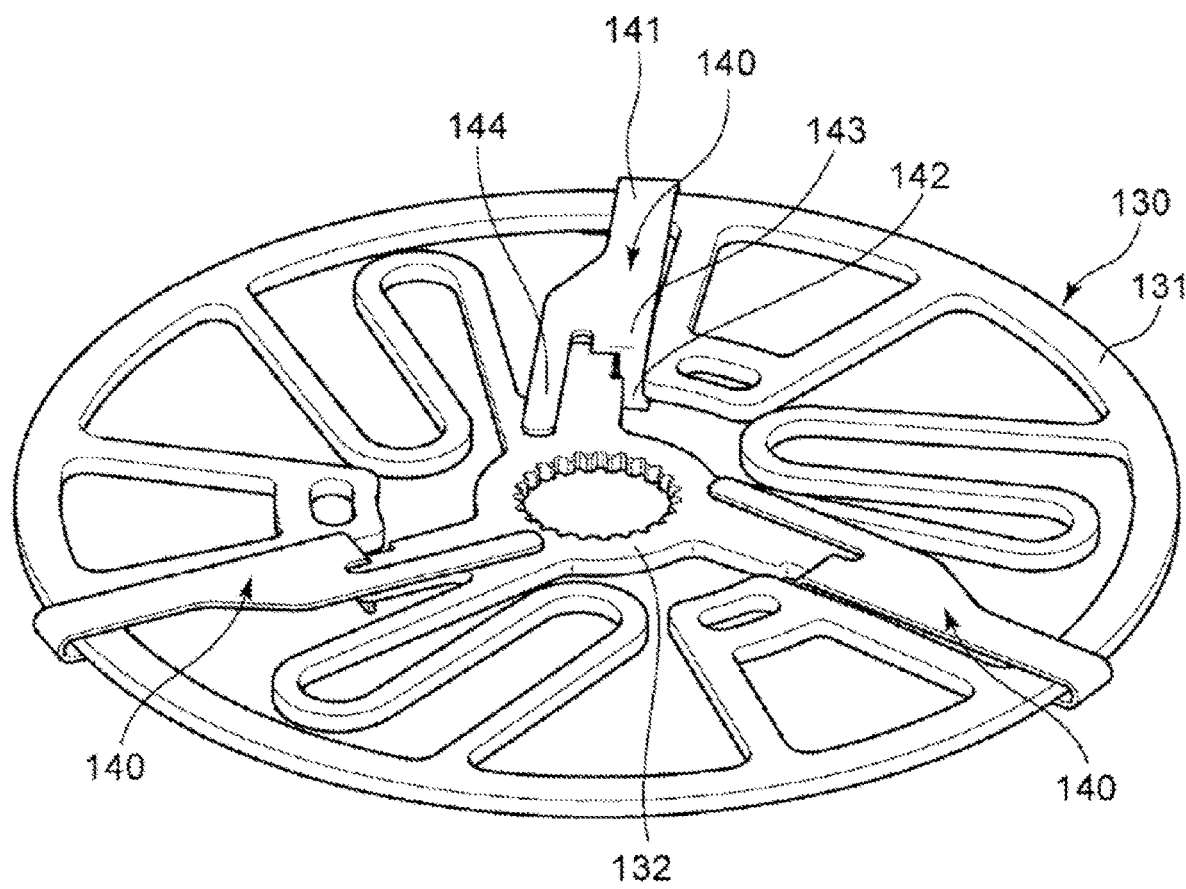
FIG. 20 is a perspective view of the biasing member and the temporarily fixing member.

FIG. 16 is a perspective view of a power transmission system according to Embodiment 2 of the present disclosure, FIG. 17 is an exploded perspective view of the power transmission system, FIG. 18 is a front view of a biasing member, FIG. 19 is a front view of the biasing member and a temporarily fixing member, and FIG. 20 is a perspective view of the biasing member and the temporarily fixing member. As illustrated in FIGS. 16 to 20, similarly to the power transmission system 6 according to Embodiment 1, a power transmission system 106 according to Embodiment 2 includes a biasing member 130 and a temporarily fixing member 140 disposed between the flywheel 10 and the input shaft 20.

The biasing member 130 is disposed on the first axial side (counter-engine side) of the flywheel 10, the temporarily fixing member 140 is disposed on the first axial side of the biasing member 130, and the input shaft 20 is disposed on the first axial side of the temporarily fixing member 140. The biasing member 130 and the temporarily fixing member 140 are each formed in a substantially plate-like shape in a radial direction to be substantially orthogonal to the axial direction of the flywheel 10 and the input shaft 20. In this embodiment, the temporarily fixing member 140 is formed dividedly into a plurality of (e.g., three) parts in the circumferential direction at an equal interval.

As illustrated in FIG. 17, the flywheel 10 is provided with the bulging part 11 at the radial inside, and is formed with the spline part 12 at the radial center. The flywheel 10 is formed with the first opening part 13 as the locking part 13 which locks the biasing member 130, and in this embodiment, the first opening part 13 is formed as a threaded hole. The first opening part 13 is one of a plurality of (e.g., three) first opening parts 13 formed in the circumferential direction (rotational direction) of the flywheel 10 at an equal interval. The flywheel 10 is also formed with a second opening part 15 so as to avoid interference with the temporarily fixing member 140. The second opening part 15 is one of a plurality of (e.g., six) second opening parts 15 formed in the circumferential direction of the flywheel 10 at an equal interval, and each second opening part 15 is formed in a circular shape.

As illustrated in FIGS. 17 and 18, the biasing member 130 is formed annularly so as to extend in a plate-like shape orthogonally to the axial direction. The biasing member 130 includes, at a radial inside, an inner annular part 132 formed annularly in a circular shape, and, at a radial outside, an outer annular part 131 formed annularly in a circular shape, and the outer annular part 131 is located radially outward of the inner annular part 132 to be concentric therewith.

The biasing member 130 is also provided with a spring part 133 which is compressible in the rotational direction, a locked part 134 which is locked by the flywheel 10, a spline part 135 which is spline-engaged with the input shaft 20, and a temporarily fixed part 136 which is temporarily fixed by the temporarily fixing member 140. The spline part 135 is formed in an inner circumferential surface of the inner annular part 132.

The spring part 133 of the biasing member 130 includes a first radially extending part 133a, a second radially extending part 133b, a third radially extending part 133c, an outer coupling part 133d, and an inner coupling part 133e. The first radially extending part 133a extends linearly outward in the radial direction from the inner annular part 132. The second radially extending part 133b extends linearly inward in the radial direction from the outer annular part 131 in substantially parallel with the first radially extending part 133a. The third radially extending part 133c extends linearly in the radial direction between the first radially extending part 133a and the second radially extending part 133b in substantially parallel with the first radially extending part 133a and the second radially extending part 133b. The outer coupling part 133d extends in an arc shape while coupling the radially outward of the first radially extending part 133a and the third radially extending part 133c. The inner coupling part 133e extends in an arc shape while coupling the radial inside of the third radially extending part 133c and the second radially extending part 133b.

The spring part 133 is connected at one end to the outer annular part 131, and, at the other end to the inner annular part 132, and is formed in a substantially S-shape when seen from the first axial side. The spring part 133 is configured such that the first radially extending part 133a is moved toward the second rotational-direction side with respect to the second radially extending part 133b, by the inner annular part 132 being moved toward the second rotational-direction side with respect to the outer annular part 131.

The locked part 134 of the biasing member 130 is comprised of a tip-end part 137a of a first arm part 137 which extends radially inward from the outer annular part 131 on the second rotational-direction side of the spring part 133, and a fastening bolt (screw) B1 (see FIG. 17) which is inserted from the first axial side into a bolt insertion hole 137b formed in the tip-end part 137a. The biasing member 130 is locked by the flywheel 10 by the fastening bolt B1 being threadedly engaged with the first opening part 13 of the flywheel 10.

The temporarily fixed part 136 of the biasing member 130 is provided to a tip-end part of a second arm part 138 which extends substantially linearly outward in the radial direction from the inner annular part 132 on the first rotational-direction side of the spring part 133. The temporarily fixed part 136 of the biasing member 130 is formed to dent toward the second rotational-direction side on an end surface of the second arm part 138 at the first rotational-direction side.

Each of the spring part 133, the locked part 134, and the temporarily fixed part 136 includes a plurality of (e.g., three of) them which are formed in the biasing member 130 at an equal interval in a circumferential direction. Each spring part 133 is located between the locked part 134 on the second rotational-direction side and the temporarily fixed part 136 on the first rotational-direction side.

The biasing member 130 biases the input shaft 20 toward the first rotational-direction side with respect to the flywheel 10 by engaging the spline part 135 with the spline part 21 of the input shaft 20 while the biasing member 130 is retained by the flywheel 10 and the spring part 133 is in a first compression state where the inner annular part 132 is moved toward the second rotational-direction side with respect to the outer annular part 131.

In this embodiment, as illustrated in FIG. 17, the temporarily fixing member 140 is comprised of the three temporarily fixing members 140 disposed in the circumferential direction at an equal interval. Each temporarily fixing member 140 is made of a plate-like member, and includes, as illustrated in FIGS. 19 and 20, a fixed part 141, a temporarily fixing part 142, a temporarily fixing body part 143, and a radially extending part 144. The fixed part 141 is fixed to the biasing member 130, and the temporarily fixing part 142 temporarily fixes the biasing member 130 to the flywheel 10. The temporarily fixing body part 143 extends in the radial direction to be substantially orthogonal toward the axial direction while connecting the fixed part 141 to the temporarily fixing part 142. The radially extending part 144 extends toward radially inward of the temporarily fixing part 142 from a circumferentially one side of the temporarily fixing body part 143. The temporarily fixing body part 143 functions as a connector which connects the fixed part 141 to the temporarily fixing part 142.

The fixed part 141 is provided radially outward of the temporarily fixing body part 143, and is fixed to the outer annular part 131 of the biasing member 130 by welding, etc., along the first axial side of the outer annular part 131. The fixed part 141 also includes a hook part 141a (see FIG. 22) which is folded radially inwardly in an inverted U-shape passing through the radially outward of the outer annular part 131 from the first axial side of the outer annular part 131. The hook part 141a is fixed to the outer annular part 131 while being fitted on the radially outward of the outer annular part 131. Note that the hook part 141a may not be provided to the fixed part 141.

The temporarily fixing member 140 is configured such that, by the fixed part 141 being fixed to the biasing member 130, the radial inside of the temporarily fixing body part 143 is elastically displaceable toward the first axial side with respect to the fixed part 141, and the temporarily fixing part 142 and the radially extending part 144 are elastically displaceable toward the first axial side.

The temporarily fixing part 142 is provided radially inward of the temporarily fixing body part 143 so as to extend toward the second axial side, and temporarily fixes the biasing member 130 to the flywheel 10 in a second compression state where the spring part 133 of the biasing member 130 is compressed more than in the first compression state. In this embodiment, the temporarily fixing part 142 temporarily fixes the biasing member 130 to the flywheel 10 by the temporarily fixing member 140 being fixed to the biasing member 130 which is locked by the flywheel 10. The temporarily fixing part 142 is provided corresponding to the second opening part 15 so as to avoid interference with the flywheel 10.

Figure 21:
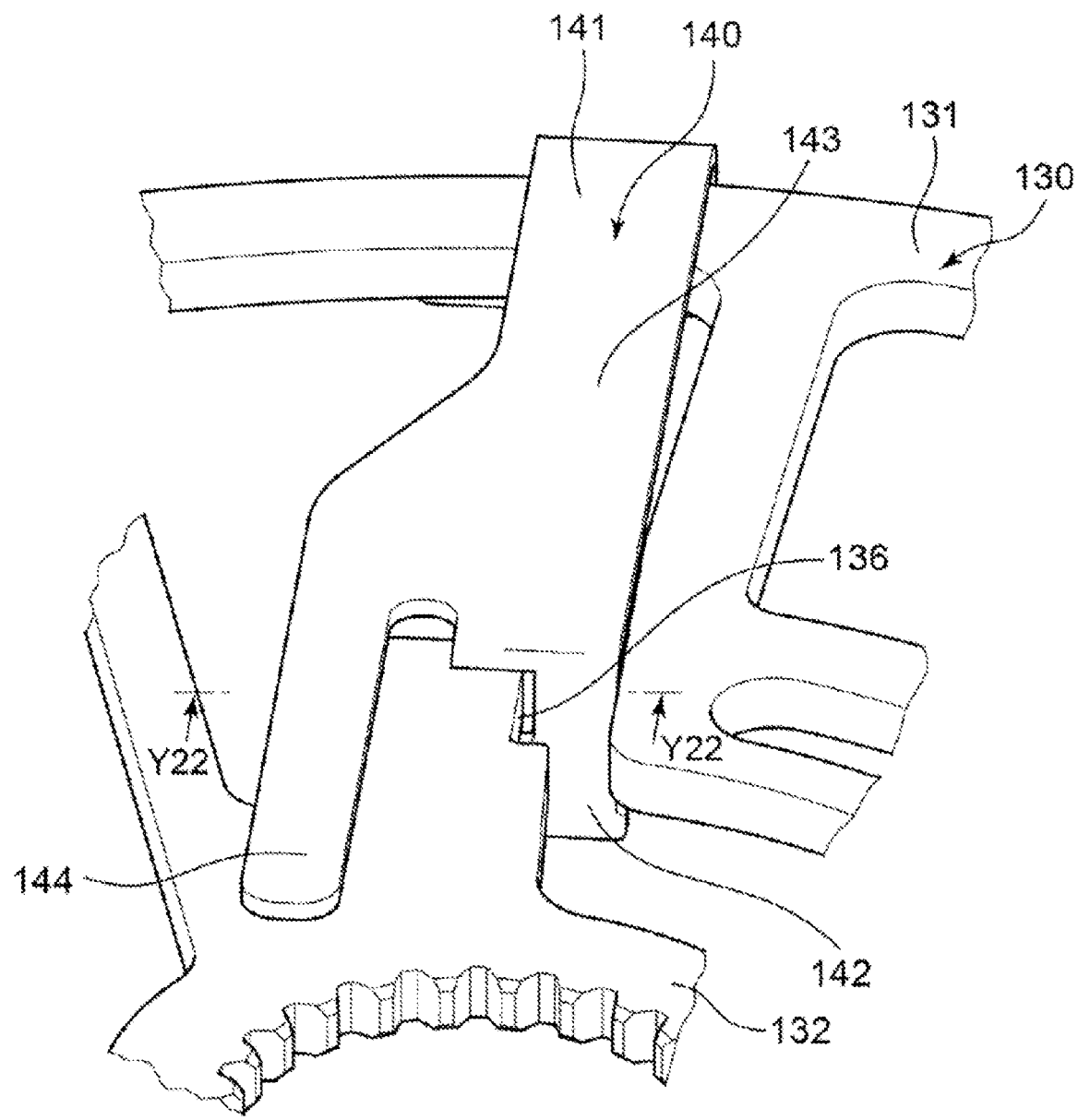
FIG. 21 is an enlarged view of a temporarily fixing part of the temporarily fixing member and therearound illustrated in FIG. 20.
Figure 22:
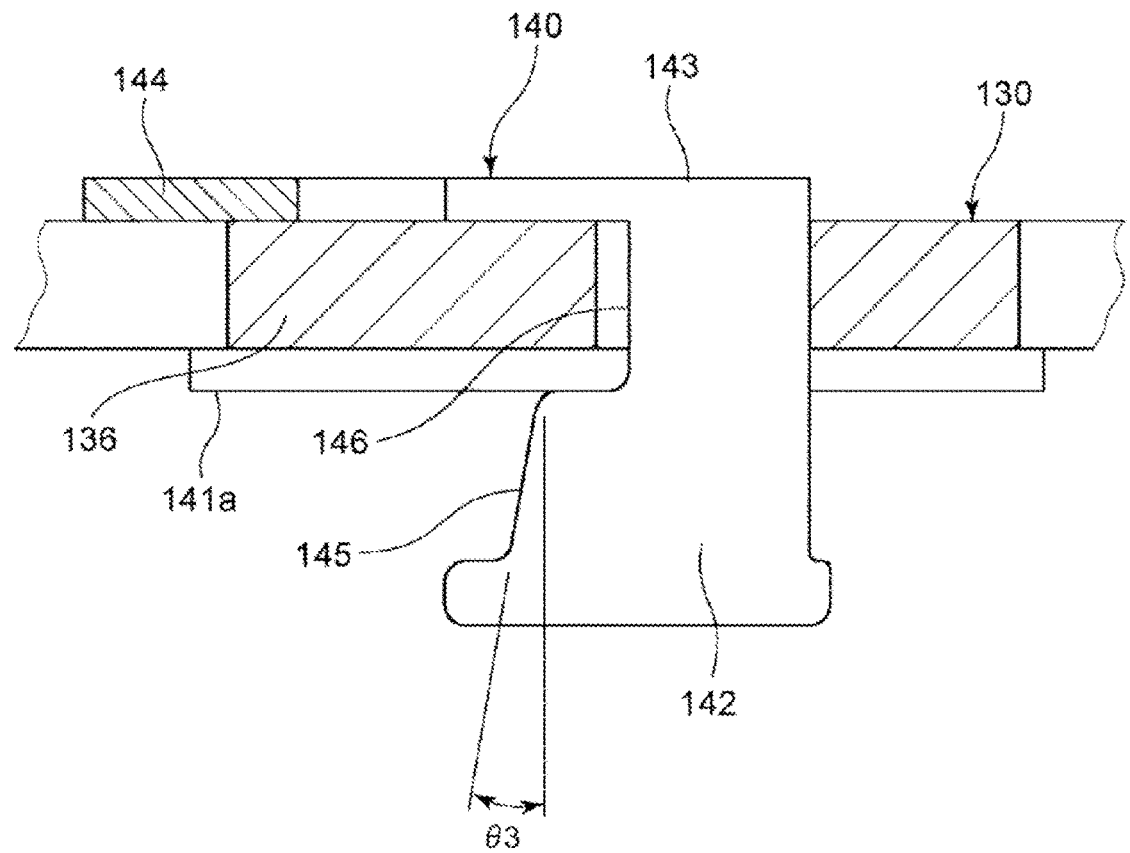
FIG. 22 is a cross-sectional view of the biasing member and the temporarily fixing member taken along a line Y22-Y22 in FIG. 21.

FIG. 21 is an enlarged view of the temporarily fixing part of the temporarily fixing member and therearound illustrated in FIG. 20. FIG. 22 is a cross-sectional view of the biasing member and the temporarily fixing member taken along a line Y22-Y22 in FIG. 21. As illustrated in FIGS. 21 and 22, the temporarily fixing part 142 includes, at the rotational-direction second side, a contact part 145 which contacts the temporarily fixed part 136 of the biasing member 130, and a recess 146 dented toward the first rotational-direction side on the first axial side of the contact part 145.

The contact part 145 is formed by an end surface of the temporarily fixing part 142 at the second rotational-direction side, which extends linearly having a given angle with respect to the axial direction. The contact part 145 is formed by a sloped part which inclines at a given angle θ3 to the first rotational-direction side toward the first axial side. The given angle θ3 is set to, for example, an angle between 5° and 15°.

The recess 146 of the temporarily fixing part 142 is formed by the end surface of the temporarily fixing part 142 at the second rotational-direction side, and dented toward the first rotational-direction side in a substantially rectangular shape. The recess 146 is formed such that, when the input shaft 20 is spline-engaged with the flywheel 10, the temporarily fixed part 136 of the biasing member 130 is positioned in the recess 146 without contacting therewith.

The radially extending part 144 of the temporarily fixing member 140 extends to the radial inside of the temporarily fixing part 142 from the second rotational-direction side of the temporarily fixing body part 143. The radially extending part 144 is elastically displaceable toward the first axial side of the temporarily fixing body part 143 with respect to the fixed part 141, when the radial inside of the temporarily fixing body part 143 is elastically displaced toward the first axial side with respect to the fixed part 141.

When the radially extending part 144 is elastically displaced toward the first axial side, the radial inside of the temporarily fixing body part 143 is displaced toward the first axial side, and the contact part 145 contacts the temporarily fixed part 136 of the biasing member 130 so as to temporarily fix the biasing member 130 in the second compression state where the spring part 133 of the biasing member 130 is compressed more than in the first compression state.

Figure 23:
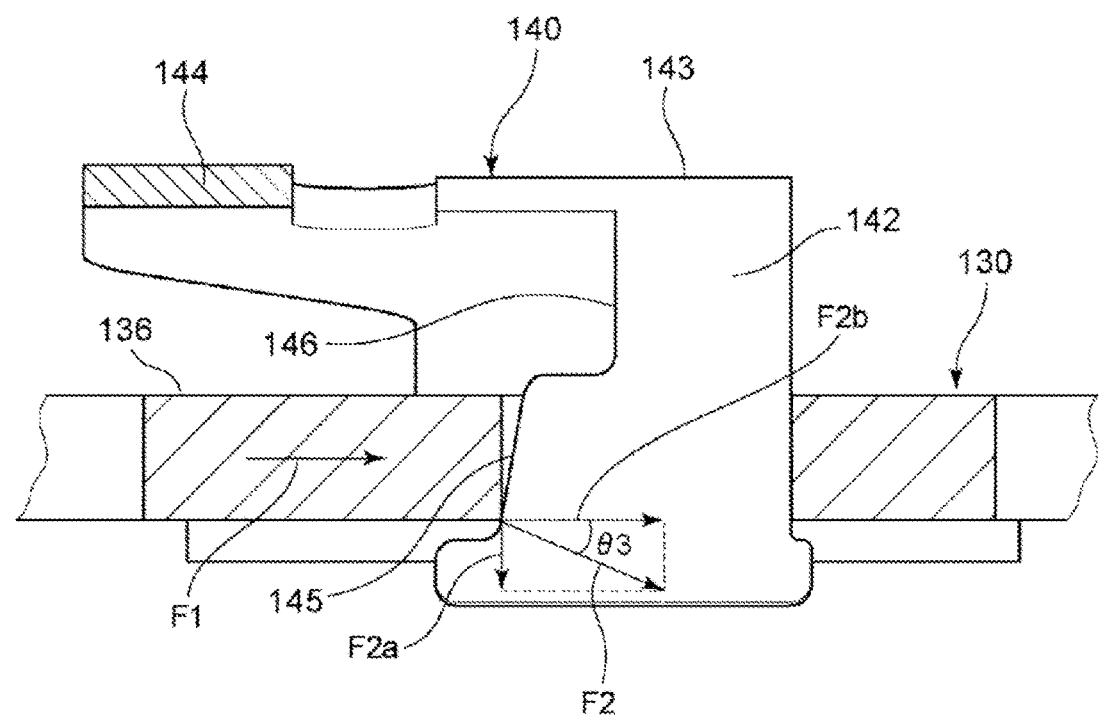
FIG. 23 is a diagram illustrating a state where the biasing member is temporarily fixed by the temporarily fixing member.

FIG. 23 is a diagram illustrating a state where the biasing member is temporarily fixed by the temporarily fixing member. As illustrated in FIG. 23, when the radial inside of the temporarily fixing body part 143 is elastically displaced toward the first axial side by a worker, etc., in the fixed state of the fixed part 141 to the biasing member 130, the temporarily fixing part 142 is moved toward the first axial side, and the contact part 145 of the temporarily fixing part 142 contacts the temporarily fixed part 136 of the biasing member 130 so as to temporarily fix the biasing member 130 in the second compression state where the spring part 133 of the biasing member 130 is compressed more than in the first compression state.

Note that, similarly to Embodiment 1, the contact part 145 may be provided with a first sloped part as a first contact part, and a second sloped part as a second contact part. The first contact part is provided at the second axial side so as to extend linearly at a given first angle with respect to the axial direction, and the second contact part is provided at the first axial side so as to extend linearly at a given second angle larger than the given first angle with respect to the axial direction. For example, the given first angle is set to an angle between 5° and 15°, and the given second angle is set to an angle between 30° and 45°.

As illustrated in FIG. 17, the input shaft 20 has the spline part 21 on the outer circumferential surface at the second axial side. The spline part 21 has the spline of which the tooth trace extends in the axial direction, and is formed to be spline-engaged with the spline part 12 of the flywheel 10 and the spline part 135 of the biasing member 130.

The input shaft 20 also includes, on the first axial side of the spline part 21, the canceling part 22 which cancels the temporary fixing of the biasing member 130 to the flywheel 10 by the temporarily fixing part 142 of the temporarily fixing member 140. The canceling part 22 is formed in a circular shape having an outer circumference to be located outward of an inner end part of the radially extending part 144 in the radial direction.

The canceling part 22 is formed such that, when the spline part 21 of the input shaft 20 is inserted into the radial inside of the temporarily fixing member 140 from the first axial side, and is spline-engaged with the spline part 12 of the flywheel 10 through the spline part 135 of the biasing member 130, the input shaft 20 is biased to the first rotational-direction side with respect to the flywheel 10 while the spline part 135 is engaged with the spline part 21 in the first compression state of the spring part 133.

In the power transmission system 106, the biasing member 130 is attached to the flywheel 10 from the first axial side to be locked, and the temporarily fixing member 140 is attached to the biasing member 130 from the first axial side so that the biasing member 130 is temporarily fixed to the flywheel 10 in the second compression state of the spring part 133. Then, the spline part 21 of the input shaft 20 is spline-engaged with the spline part 12 of the flywheel 10 through the spline part 135 of the biasing member 130 from the first axial side, and thus the input shaft 20 is assembled to the flywheel 10 by spline-engagement.

Figure 24:
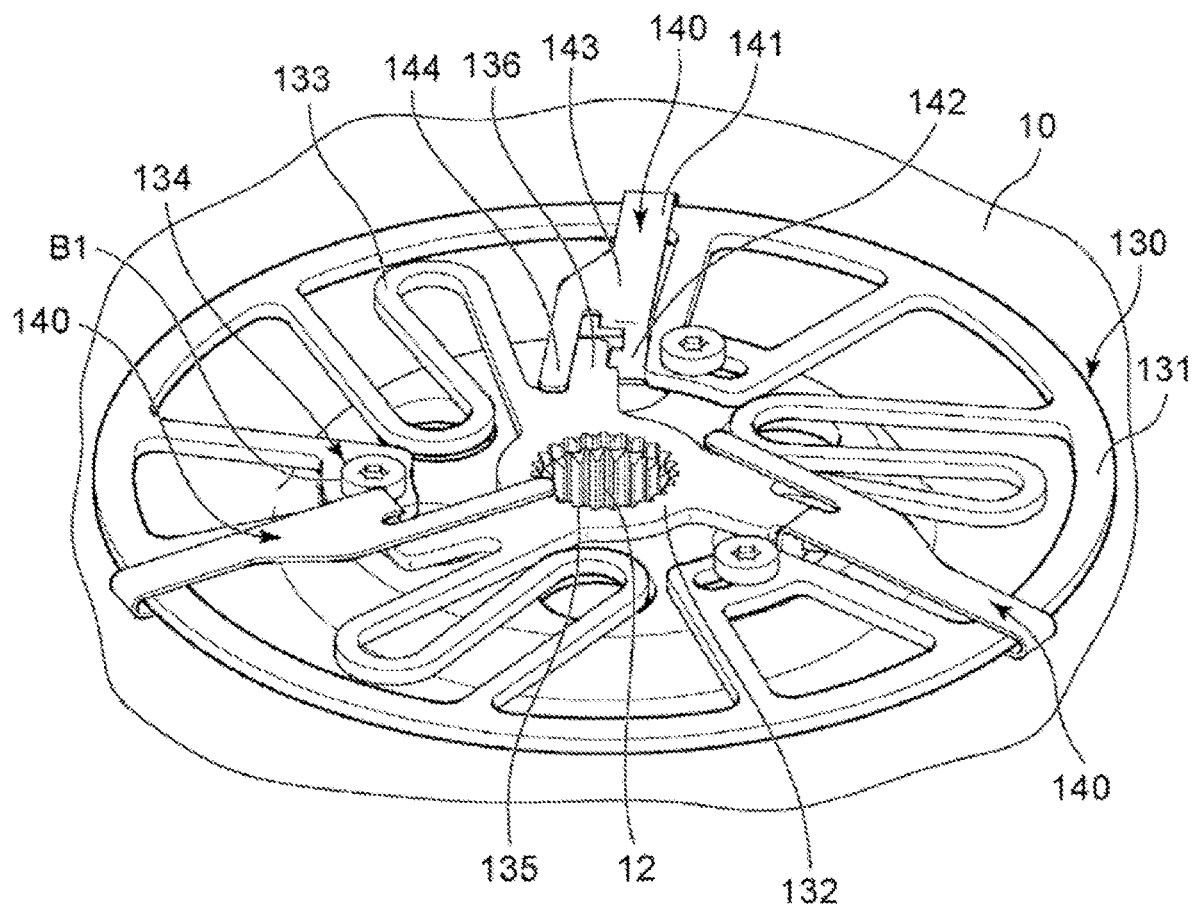
FIG. 24 is a diagram illustrating a state where the biasing member and the temporarily fixing member are attached to the flywheel.

FIG. 24 is a diagram illustrating a state where the biasing member and the temporarily fixing member are attached to the flywheel. Upon assembling of the input shaft 20 to the flywheel 10 by spline-engagement, as illustrated in FIG. 24, the locked part 134 of the biasing member 130 is locked by the flywheel 10 using the fastening bolt B1 so that the biasing member 130 is attached to the flywheel 10. The biasing member 130 is attached such that the spline part 135 becomes substantially in agreement with the spline part 12 of the flywheel 10.

The temporarily fixing member 140 is attached to the biasing member 130 by the fixed part 141 of the temporarily fixing member 140 being fixed to the outer annular part 131 of the biasing member 130 by welding, etc., in the state where the temporarily fixing member 140 is disposed on the first axial side of the biasing member 130, the hook part 141a of the temporarily fixing member 140 is fitted on the outer annular part 131 of the biasing member 130, and the temporarily fixed part 136 is disposed in the recess 146 of the temporarily fixing member 140.

The temporarily fixing member 140 attached to the biasing member 130 temporarily fixes the biasing member 130 by contacting the temporarily fixed part 136 of the biasing member 130 to the contact part 145 of the temporarily fixing part 142 in the second compression state of the spring part 133 where the radially extending part 144 is elastically displaced toward the first axial side while the spring part 133 is compressed by the temporarily fixed part 136 being moved toward the second rotational-direction side.

Figure 25:
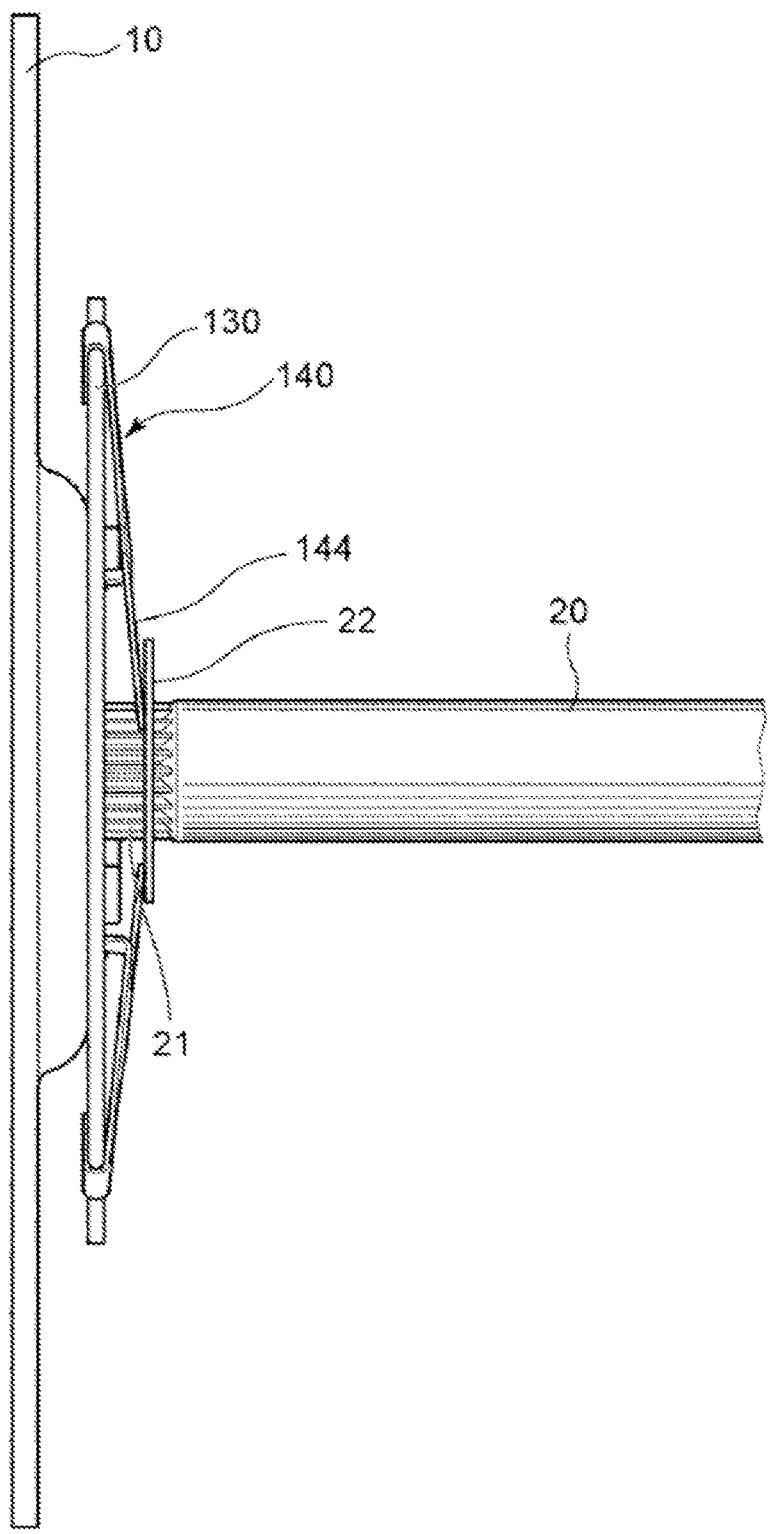
FIG. 25 is an explanatory diagram illustrating assembly of the input shaft to the flywheel.

FIG. 25 is an explanatory diagram illustrating assembly of the input shaft to the flywheel. Next, as illustrated in FIG. 25, the input shaft 20 is assembled from the first axial side so that the spline part 21 is spline-engaged with the spline part 12 of the flywheel 10 through the spline part 135 of the biasing member 130.

When the input shaft 20 is spline-engaged with the flywheel 10, the canceling part 22 of the input shaft 20 contacts the radially extending part 144 of the temporarily fixing member 140, and accompanying with the motion of the input shaft 20 toward the second axial side, the canceling part 22 moves the radial inside of the temporarily fixing body part 143 of the temporarily fixing member 140 toward the second axial side, and thus the temporarily fixing part 142 being moved toward the second axial side.

As illustrated in FIG. 23, when the temporarily fixing part 142 is moved toward the second axial side, the biasing force F1 from the temporarily fixed part 136 of the biasing member 130 toward the first rotational-direction side is acted on the contact part 145 of the temporarily fixing part 142 by the spring part 133 of the biasing member 130 in the compressed state. The biasing force F1 is applied to the temporarily fixing part 142 to be pressed at the pressing force F2 orthogonal to the sloped part of the contact part 145, at the contacting part between the temporarily fixed part 136 and the contact part 145.

The biasing force F1 applied by the spring part 133 of the biasing member 130 is converted, by the sloped part formed in the contact part 145, into the force F2a in the canceling direction of the temporary fixing of the biasing member 30 from the first power transmission member 10. The sloped part inclines to the first rotational-direction side toward the first axial side, and constitutes the assisting mechanism which assists the canceling of the temporary fixing of the biasing member 130 by the canceling part 22 of the input shaft 20.

When the input shaft 20 is moved toward the second axial side until the canceling part 22 moves the temporarily fixing part 142 toward the second axial side and the temporarily fixed part 136 is positioned in the recess 146 without contacting therewith, the temporary fixing of the biasing member 130 to the flywheel 10 is canceled by the canceling part 22, and the input shaft 20 is assembled to the flywheel 10 by spline-engagement.

When the input shaft 20 is moved toward the second axial side until the temporarily fixed part 136 is positioned in the recess 146, the spring part 133 moves the inner annular part 132 toward the first rotational-direction side with respect to the outer annular part 131. Accordingly, while the biasing member 130 is locked by the flywheel 10 and the spline part 135 is engaged with the spline part 21 of the input shaft 20 in the first compression state of the spring part 133, the biasing member 130 biases the input shaft 20 toward the first rotational-direction side with respect to the flywheel 10.

Also in the power transmission system 106, at the spline-engagement part where the spline part 12 of the flywheel 10 and the spline part 21 of the input shaft 20 are spline-engaged with each other, the input shaft 20 is biased toward the first rotational-direction side by the biasing member 130, the second rotational-direction side of the tooth part of the spline part 21 of the input shaft 20 is engaged with a first rotational-direction side of a tooth part of the spline part 135 of the biasing member 130, and the first rotational-direction side of the tooth part of the spline part 21 is engaged with the second rotational-direction side of the tooth part of the spline part 12 of the flywheel 10.

In this manner, also the power transmission system 106 uses the biasing member 130 which biases the input shaft 20 in the rotational direction with respect to the flywheel 10, and the temporarily fixing member 140 which temporarily fixes the biasing member 130 to the flywheel 10 so as to bias the input shaft 20 by the biasing member 130 toward the first rotational-direction side with respect to the flywheel 10. As a result, the teeth rattling noise at the spline-engagement part between the flywheel 10 and the input shaft 20 can be reduced.

Also in the power transmission system 106, the biasing member 130 is attached to the flywheel 10 to be locked, the temporarily fixing member 140 is attached to the flywheel 10 and the biasing member 130 so as to temporarily fix the biasing member 130 to the flywheel 10 in the compressed state of the spring part 133, and the input shaft 20 is assembled to the flywheel 10 by spline-engagement. Therefore, the input shaft 20 can be assembled to the flywheel 10 by spline-engagement with adequate assemblability.

In the power transmission system 106, the temporarily fixing member 140 may be fixedly attached to the biasing member 130 before the biasing member 130 is attached to the flywheel 10 to be locked, or may be fixedly attached to the biasing member 130 after the biasing member 130 is attached to the flywheel 10 to be locked.

Although in this embodiment the biasing member 130 biases the input shaft 20 toward the first rotational-direction side with respect to the flywheel 10, the biasing member 130 may bias the input shaft 20 toward the second rotational-direction side.

In this embodiment, the biasing member 130 includes the spring part 133 which is compressible in the rotational direction, and is formed to bias the input shaft 20 toward the first rotational-direction side with respect to the flywheel 10 in the first compression state of the spring part 133. The temporarily fixing member 140 temporarily fixes the biasing member 130 to the flywheel 10 in the second compression state where the spring part 133 is compressed more than in the first compression state, and the spring part 133 is elastically displaceable to be compressed in the rotational direction. However, the spring part 133 may be elastically displaceable to be stretched in the rotational direction.

As described above, in the power transmission system 106 according to this embodiment, the biasing member 130 and the temporarily fixing member 140 are used for assembling the first and second power transmission members 10 and 20 by spline-engagement. The biasing member 130 biases the second power transmission member 20 toward the first rotational-direction side with respect to the first power transmission member 10 by engaging the spline part 135 with the spline part 21 of the second power transmission member 20 while the biasing member 130 is locked by the first power transmission member 10 and the spring part 133 is in the first elastically displaced state. The temporarily fixing member 140 includes the temporarily fixing part 142 which temporarily fixes the biasing member 130 to the first power transmission member 10 in the second elastically displaced state where the spring part 133 is elastically displaced more than in the first elastically displaced state. Moreover, the canceling part 22 which cancels the temporary fixing of the biasing member 130 to the first power transmission member 10 by the temporarily fixing part 142 is provided to the first axial side of the spline part 21 of the second power transmission member 20.

According to this configuration, the biasing member 130 is attached to the first power transmission member 10 to be locked, the temporarily fixing member 140 is attached to the first power transmission member 10 and the biasing member 130 so as to temporarily fix the biasing member 130 to the first power transmission member 10 in the second elastically displaced state of the spring part 133, and the spline part 21 of the second power transmission member 20 is spline-engaged with the spline part 12 of the first power transmission member 10 through the spline part 135 of the biasing member 130 so that the second power transmission member 20 is assembled to the first power transmission member 10. Accordingly, the temporary fixing of the biasing member 130 to the first power transmission member 10 by the temporarily fixing part 142 of the temporarily fixing member 140 is canceled, and the second power transmission member 20 is biased toward the first rotational-direction side with respect to the first power transmission member 10. As a result, the teeth rattling noise at the spline-engagement part between the first and second power transmission members 10 and 20 is reduced.

By engaging the biasing member 130 to the first power transmission member 10, temporarily fixing the biasing member 130 to the first power transmission member 10 by the temporarily fixing member 140, and spline-engaging the second power transmission member 20 to the first power transmission member 10, the second power transmission member 20 can be biased toward the first rotational-direction side with respect to the first power transmission member 10, without changing the shapes of the spline parts 12 and 21 of the first and second power transmission members 10 and 20, and thus the assembly is comparatively easier. As a result, the teeth rattling noise at the spline-engagement part between the first and second power transmission members 10 and 20 can be reduced with adequate assemblability in a comparatively simple configuration.

Further, the biasing member 130 includes the spring part 133, the locked part 134, the spline part 135, the inner annular part 132, the outer annular part 131, and the temporarily fixed part 136 which is temporarily fixed by the temporarily fixing part 142. The locked part 134 is connected to the outer annular part 131, and the spline part 135 and the temporarily fixed part 136 are connected to the inner annular part 132. The spring part 133 is connected at one end to the outer annular part 131, and, at the other end, to the inner annular part 132, and is elastically displaced in the rotational direction by the inner annular part 132 being moved toward the second rotational-direction side with respect to the outer annular part 131.

According to this configuration, since the biasing member 130 having the spring part 133 which is elastically displaced in the rotational direction by the inner annular part 132 being moved toward the second rotational-direction side with respect to the outer annular part 131 is used, unlikely to a case of using a spring as the biasing member 130, a spring holding member which holds the spring is unnecessary, and thus the assemblability is improved.

Further, the temporarily fixing member 140 is fixedly attached to the outer annular part 131 of the biasing member 130. Therefore, when the first and second power transmission members 10 and 20 are assembled together by spline-engagement, rattling of the temporarily fixing member 140 in the circumferential direction can be reduced.

Further, a plurality of temporarily fixing members 140 are attached to the biasing member 130 in the circumferential direction at an equal interval, which effectively reduces the teeth rattling noise at the spline-engagement part between the first and second power transmission members 10 and 20.

Further, the assisting mechanism (contact part 145) which assists the canceling of the temporary fixing of the biasing member 130 by the canceling part 22 is provided. According to this configuration, since the assisting mechanism assists the canceling of the temporary fixing of the biasing member 130, the temporary fixing can be canceled comparatively easily. As a result, the assemblability of the second power transmission member 20 to the first power transmission member 10 is improved.

Further, the biasing member 130 includes the temporarily fixed part 136 which is temporarily fixed by the temporarily fixing part 142, and the temporarily fixing part 142 includes, at the second rotational-direction side, the contact part 145 which contacts the temporarily fixed part 136. The contact part 145 is formed by the sloped part which inclines to the first rotational-direction side toward the first axial side, and the assisting mechanism is comprised of the sloped part.

According to this configuration, the sloped part formed in the contact part 145 of the temporarily fixing part 142 and constituting the assisting mechanism inclines to the first rotational-direction side toward the first axial side. Therefore, the biasing force applied by the spring part 133 to the contact part 145 from the temporarily fixed part 136 toward the first rotational-direction side can be converted into the force in the canceling direction of the temporary fixing of the biasing member 130 from the first power transmission member 10. As a result, the force required for canceling the temporary fixing of the biasing member 130 can be reduced, which improves the assemblability.

Figure 26:
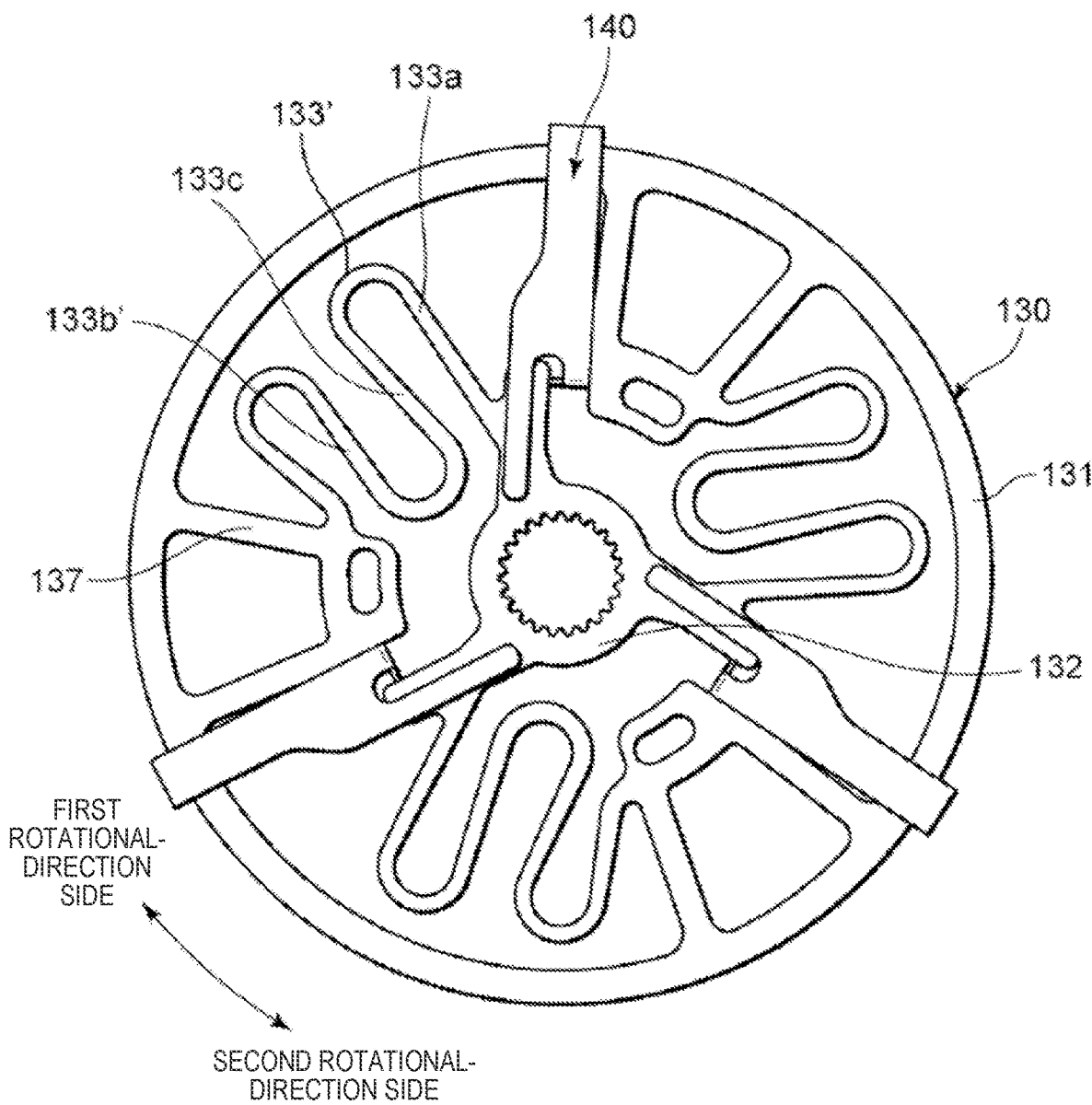
FIG. 26 is a diagram illustrating a modification of the biasing member according to Embodiment 2.

FIG. 26 is a diagram illustrating a modification of the biasing member according to Embodiment 2. As illustrated in FIG. 26, a spring part 133' may be used as the spring part of the biasing member 130, which is connected at one end to the outer annular part 131 by a second radially extending part 133b' of the spring part 133' being connected to the first arm part 137 extending radially inward from the outer annular part 131.

Figure 27:
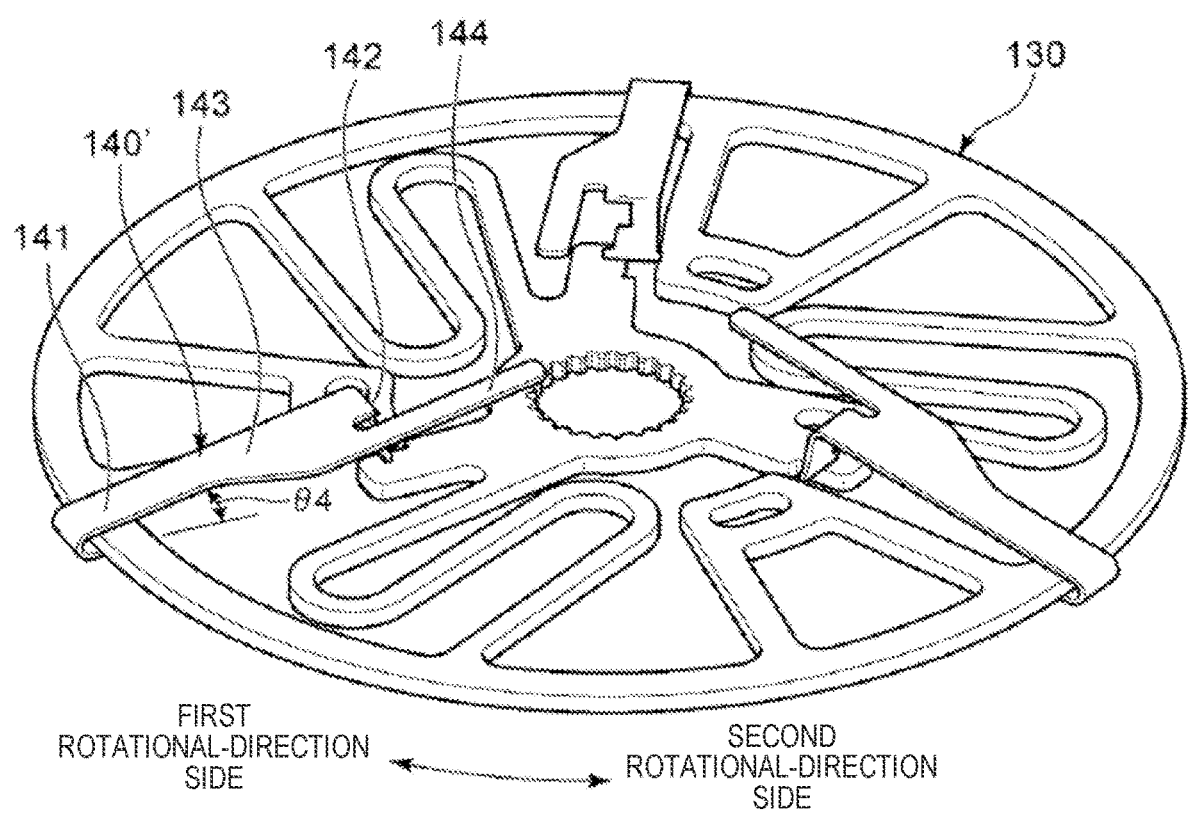
FIG. 27 is a diagram illustrating a modification of the temporarily fixing member according to Embodiment 2.

FIG. 27 is a diagram illustrating a modification of the temporarily fixing member according to Embodiment 2. A temporarily fixing member 140' illustrated in FIG. 27 includes, similarly to the temporarily fixing member 140, the fixed part 141 fixed to the biasing member 130, the temporarily fixing part 142 which temporarily fixes the biasing member 130 to the flywheel 10, the temporarily fixing body part 143 which extends in the radial direction to be substantially orthogonal toward the axial direction while connecting the fixed part 141 to the temporarily fixing part 142, and the radially extending part 144 which extends toward the radial inside of the temporarily fixing part 142 from the circumferentially one side of the temporarily fixing body part 143.

The fixed part 141 also includes the hook part 141a (see FIG. 28A) which is provided radially outward of the temporarily fixing body part 143 while being fixed to the outer annular part 131 by welding, etc., and is folded radially inwardly in an inverted U-shape passing through the radially outward of the outer annular part 131 from the first axial side of the outer annular part 131. The hook part 141a is fixed to the outer annular part 131 while being fitted on the radially outward of the outer annular part 131.

Although in the temporarily fixing member 140 the folded part of the hook part 141a and the temporarily fixing body part 143 extend parallelly in the radial direction, in the temporarily fixing member 140', the folded part of the hook part 141a and the temporarily fixing body part 143 are formed to have a given angle θ4 therebetween. The given angle θ4 is set to an angle, for example, between 5° and 10°.

Figure 28B:
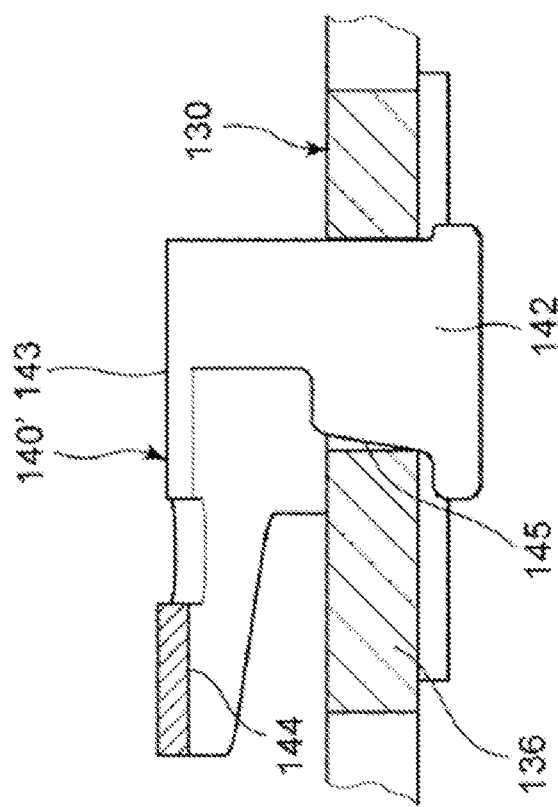
FIGS. 28A and 28B are explanatory diagrams illustrating temporary fixing of the biasing member by the temporarily fixing member.
Figure 28A:
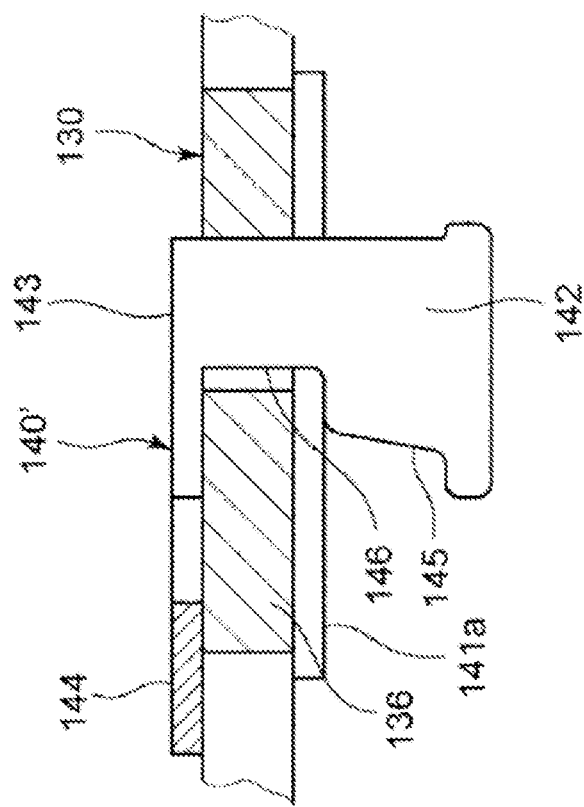

FIGS. 28A and 28B are explanatory diagrams illustrating temporary fixing of the biasing member by the temporarily fixing member. As illustrated in FIG. 28A, in the temporarily fixing member 140', the fixed part 141 is fixed to the biasing member 130 by welding, etc., in a state where the temporarily fixing body part 143 is elastically displaced toward the second axial side so as to be in parallel with the folded part of the hook part 141a. Accordingly, the temporarily fixing member 140' is configured such that the radial inside of the temporarily fixing body part 143 is movable by the elastic force to the first axial side with respect to the fixed part 141, and thus the temporarily fixing part 142 and the radially extending part 144 being movable toward the first axial side.

Although the temporarily fixing part 142 and the radially extending part 144 are movable by the elastic force of the temporarily fixing member 140' to the first axial side with respect to the fixed part 141, the temporarily fixed part 136 of the biasing member 130 is regulated to be moved toward the first axial side by the axially other-side surface of the recess 146 of the temporarily fixing member 140'.

Then, as illustrated in FIG. 28B, when the temporarily fixed part 136 of the biasing member 130 is moved toward the second rotational-direction side by the worker, etc., and the spring part 133 of the biasing member 130 is compressed, the temporarily fixing part 142 and the radially extending part 144 are moved toward the first axial side with respect to the fixed part 141 by the elastic force of the temporarily fixing member 140'. Accordingly, the temporarily fixing part 142 temporarily fixes the biasing member 130 in the second compression state where the spring part 133 is compressed more than in the first compression state.

As described above, the temporarily fixing member 140' may include the fixed part 141 fixed to the biasing member 130, the temporarily fixing part 142, and the connector 143 connecting the temporarily fixing part 142 to the fixed part 141 such that the fixed part 141 is fixed to the biasing member 130 in the state where the temporarily fixing part 142 is elastically displaced toward the second axial side with respect to the fixed part 141. The temporarily fixing part 142 may temporarily fix the biasing member 130 by the temporarily fixing part 142 being moved toward the first axial side by the elastic force with respect to the fixed part 141 which is fixed to the biasing member 130.

Also in this case, by using the temporarily fixing member 140' configured such that the temporarily fixing part 142 temporarily fixes the biasing member 130 by the elastic force moving the temporarily fixing part 142 toward the first axial side with respect to the fixed part 141 fixed to the biasing member 130, the teeth rattling noise at the spline-engagement part between the first and second power transmission members 10 and 20 can be reduced. Further, the rattling of the temporarily fixing member 140' in the circumferential direction can be suppressed when the first and second power transmission members 10 and 20 are assembled together by spline-engagement.

Figure 29:
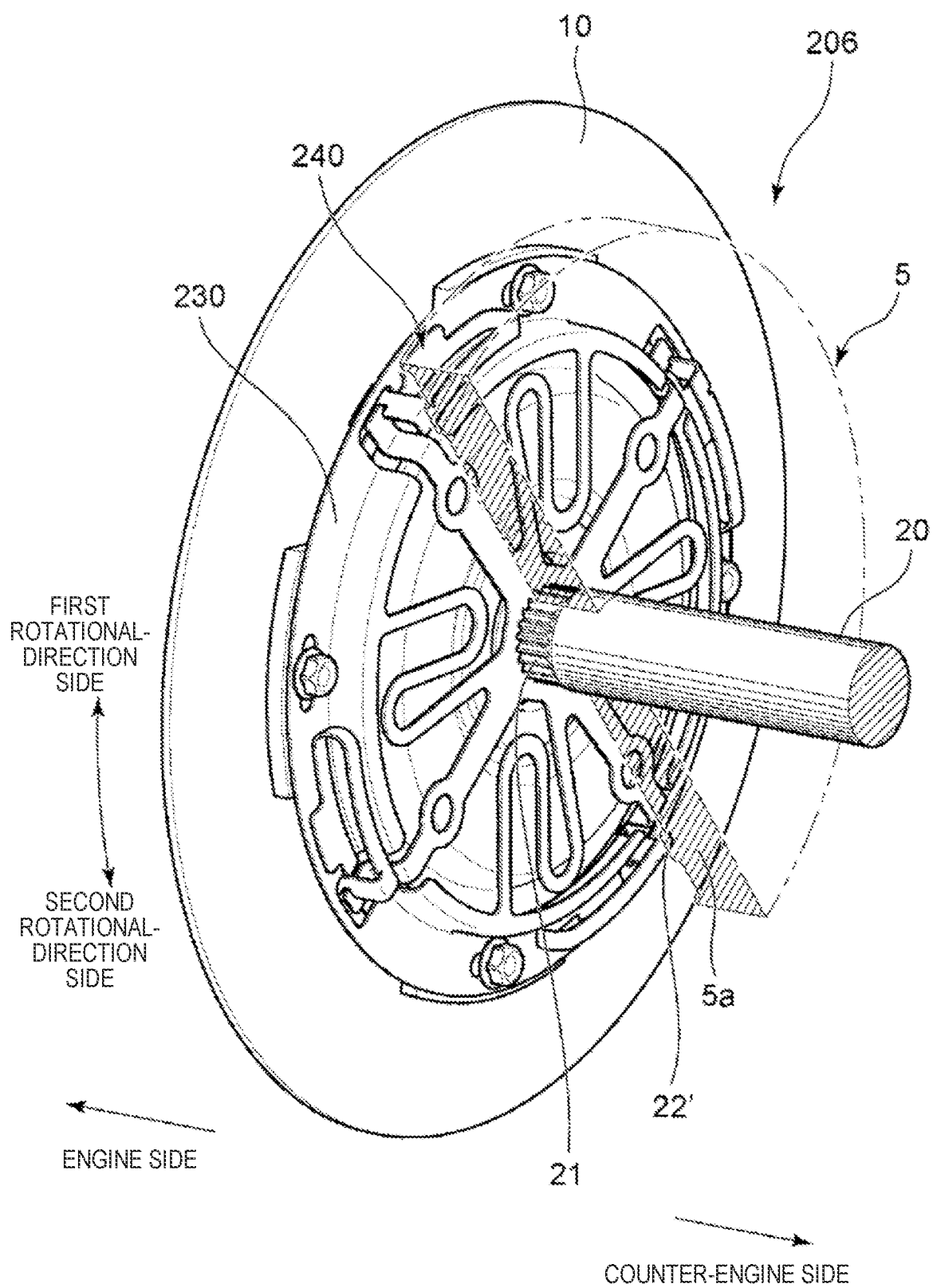
FIG. 29 is a perspective view of a power transmission system according to Embodiment 3 of the present disclosure.
Figure 30:
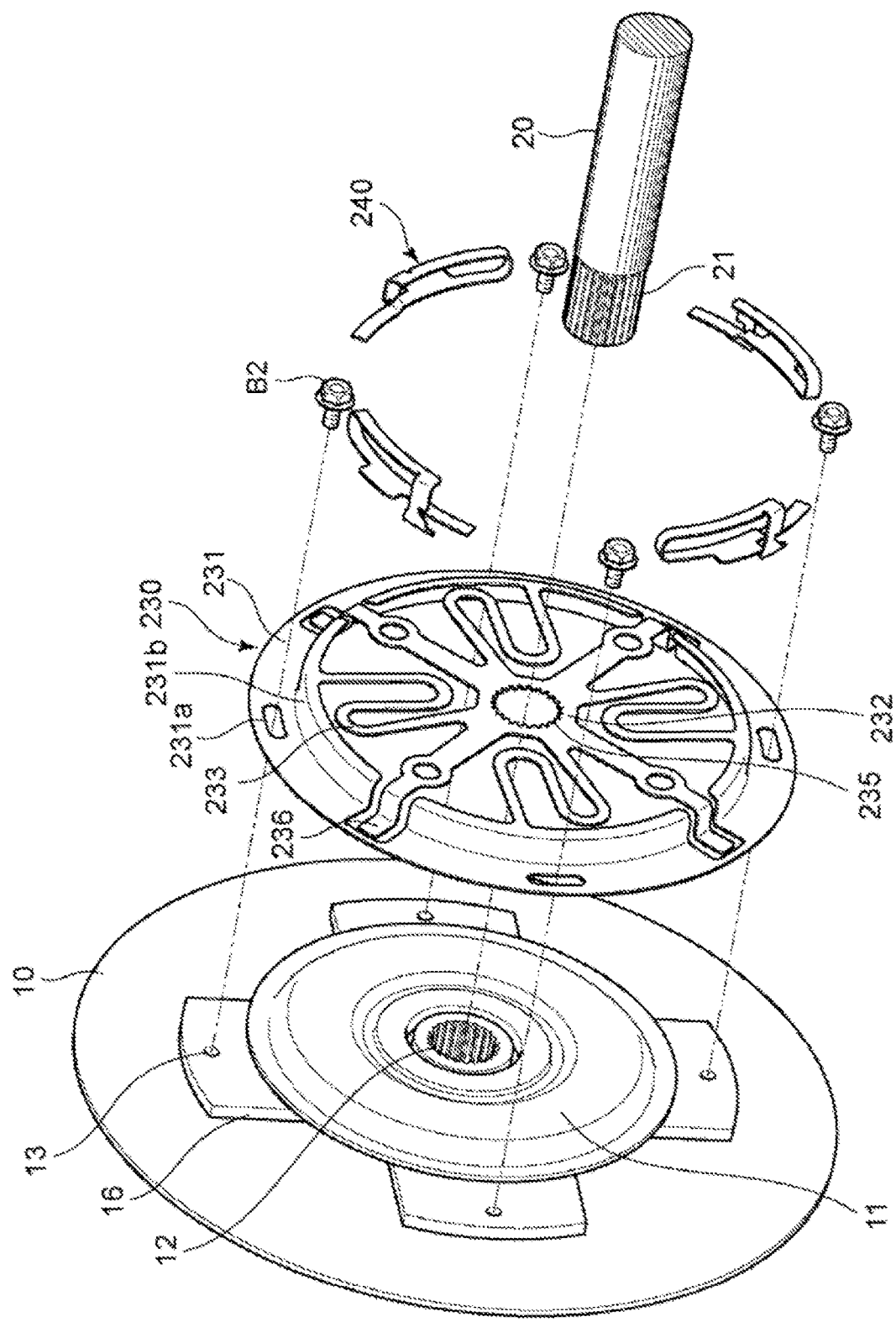
FIG. 30 is an exploded perspective view of the power transmission system.
Figure 31:
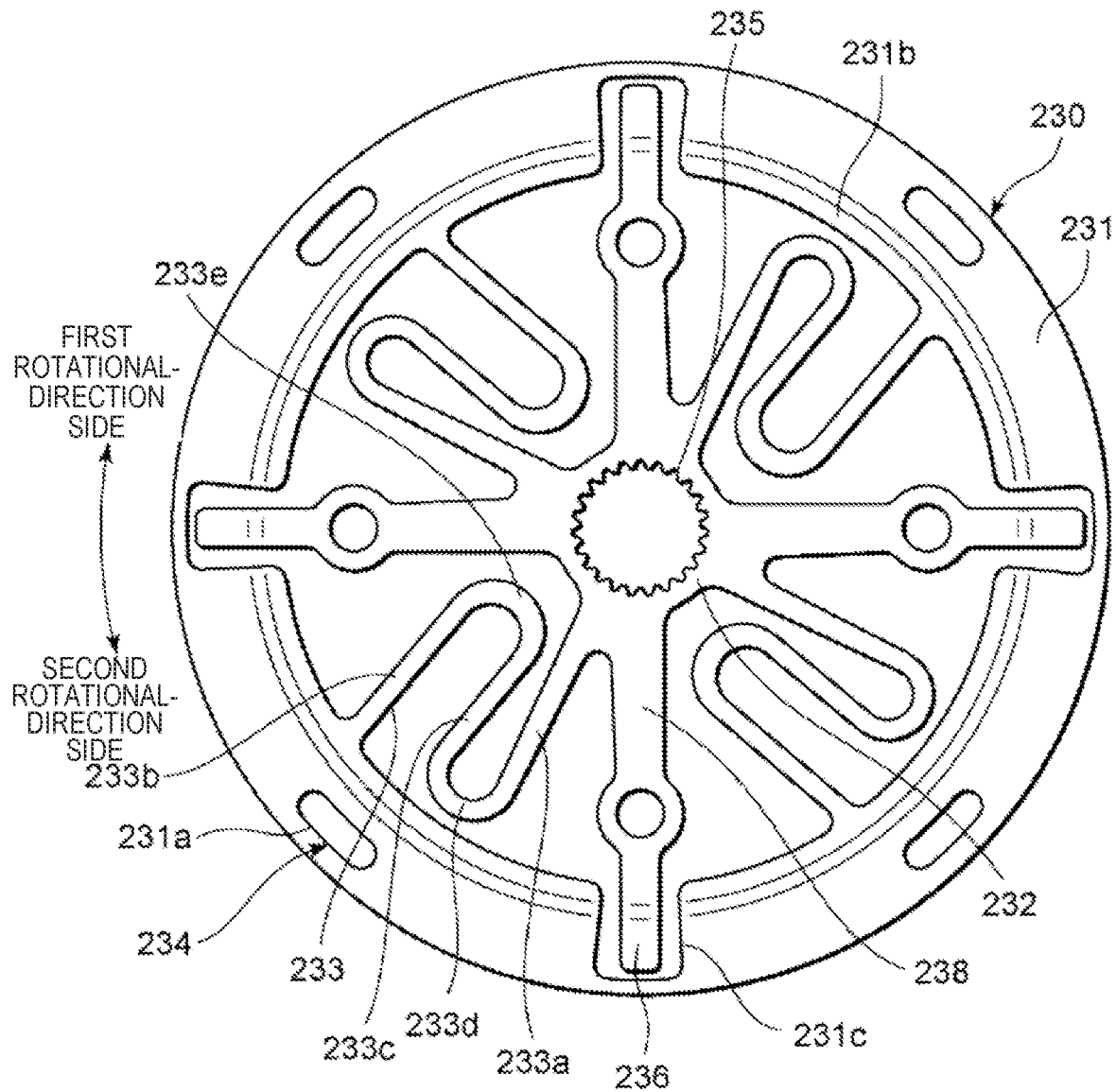
FIG. 31 is a front view of a biasing member.
Figure 32:
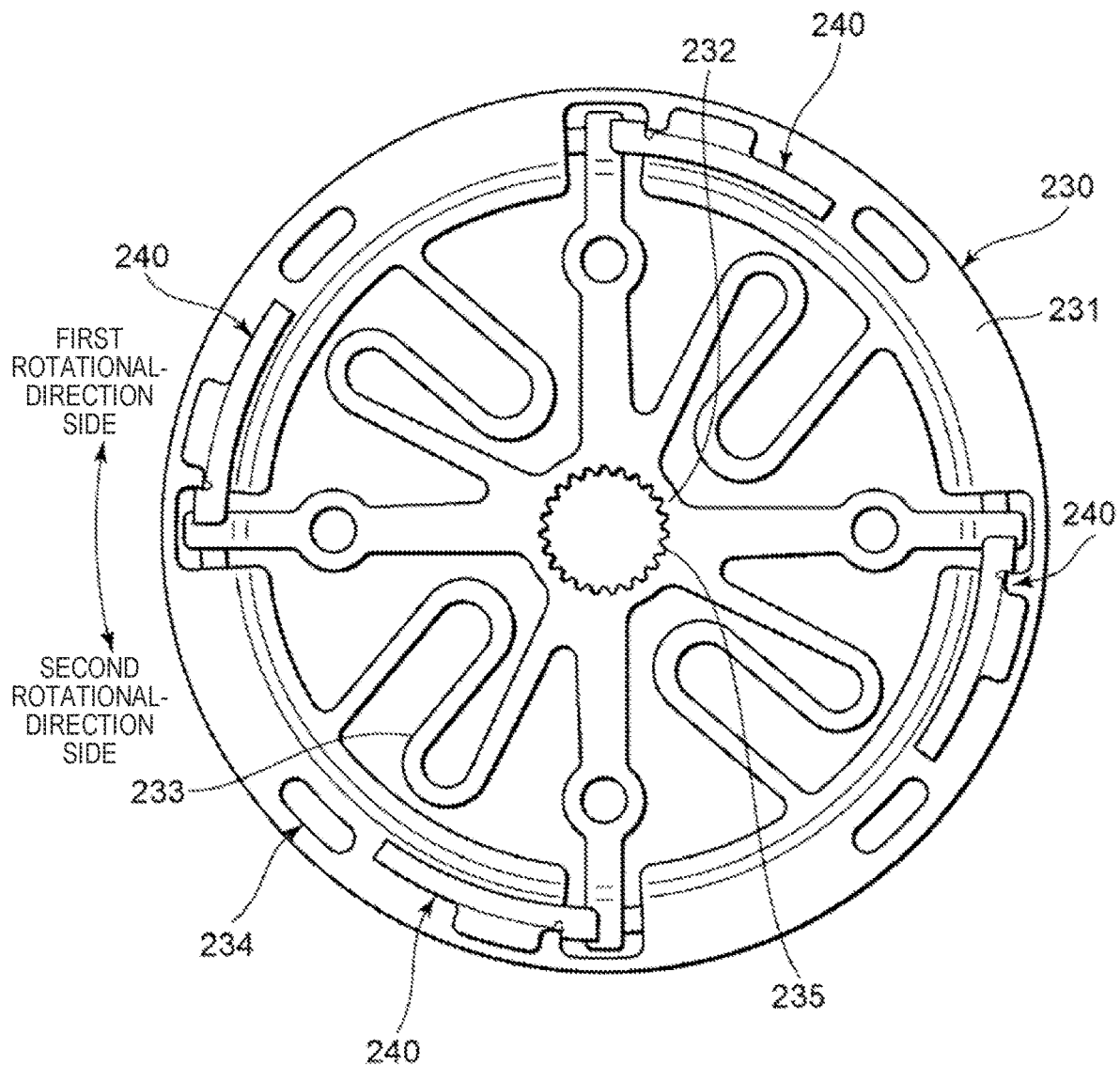
FIG. 32 is a front view of the biasing member and a temporarily fixing member.
Figure 33:
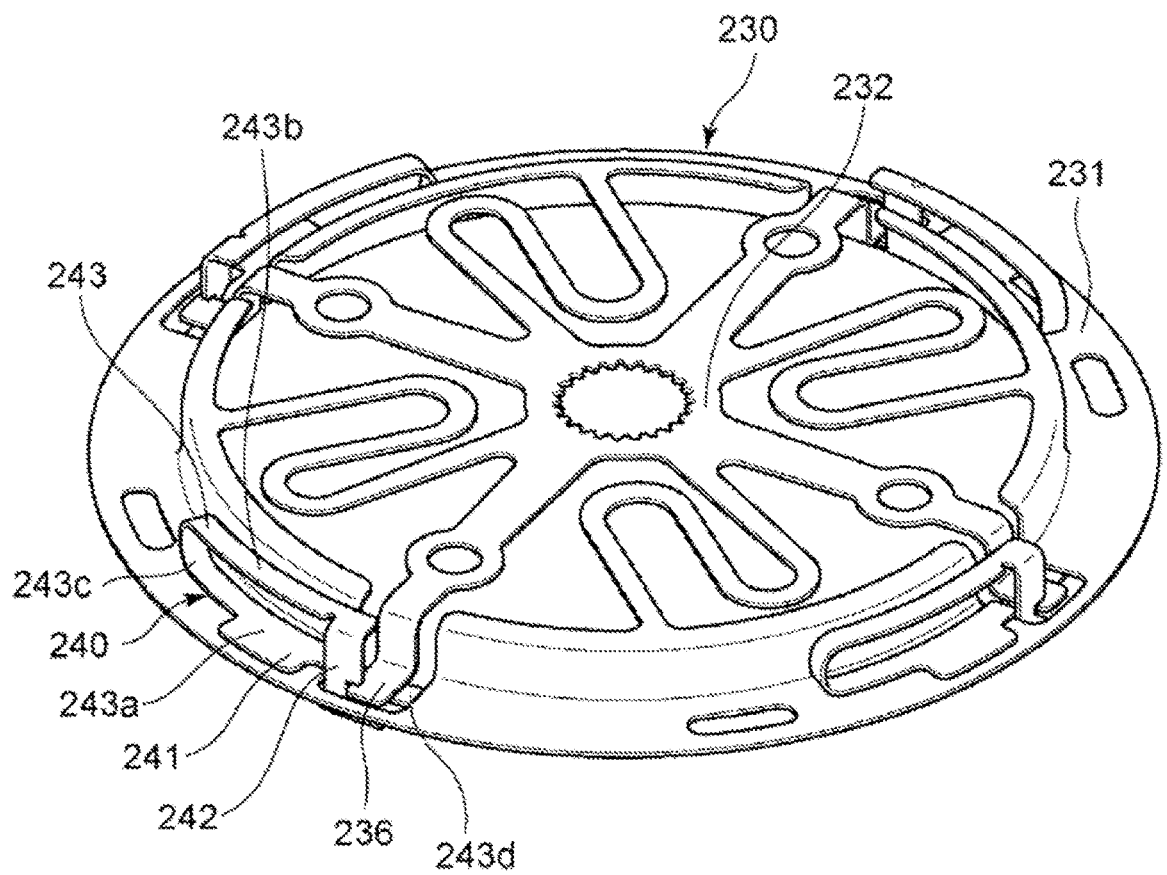
FIG. 33 is a perspective view of the biasing member and the temporarily fixing member.

FIG. 29 is a perspective view of a power transmission system according to Embodiment 3 of the present disclosure, FIG. 30 is an exploded perspective view of the power transmission system, FIG. 31 is a front view of a biasing member, FIG. 32 is a front view of the biasing member and a temporarily fixing member, and FIG. 33 is a perspective view of the biasing member and the temporarily fixing member. As illustrated in FIGS. 29 to 33, a power transmission system 206 according to Embodiment 3 includes, similarly to the power transmission system 6 according to Embodiment 1, a biasing member 230 and a temporarily fixing member 240 disposed between the flywheel 10 and the input shaft 20.

The biasing member 230 is disposed on the first axial side (counter-engine side) of the flywheel 10, the temporarily fixing member 240 is disposed on the first axial side of the biasing member 230, and the input shaft 20 is disposed on the first axial side of the temporarily fixing member 240. The biasing member 230 is formed in a substantially plate-like shape in a radial direction to be substantially orthogonal to the axial direction of the flywheel 10 and the input shaft 20. In this embodiment, the temporarily fixing member 240 is formed dividedly into a plurality of (e.g., four) parts in the circumferential direction at an equal interval.

As illustrated in FIG. 30, the flywheel 10 is provided with the bulging part 11 at the radial inside, and is formed with the spline part 12 at the radial center. The flywheel 10 is formed with the first opening part 13 as the locking part which locks the biasing member 230, and in this embodiment, the first opening part 13 is formed as a threaded hole. The first opening part 13 is formed in a support part 16 which extends radially outwardly from the bulging part 11 and supports the biasing member 230. The flywheel 10 is formed with a plurality of (e.g., four) support parts 16 extending in the circumferential direction (rotational direction) to be located at an equal interval. The first opening 13 is formed in each support part 16.

As illustrated in FIGS. 30 and 31, the biasing member 230 is formed annularly so as to extend in a plate-like shape orthogonally to the axial direction. The biasing member 230 includes, at a radial inside, an inner annular part 232 formed annularly in a circular shape, and, at a radial outside, an outer annular part 231 formed annularly in a circular shape, and the outer annular part 231 is located radially outward of the inner annular part 232 to be concentric therewith. The outer annular part 231 is offset toward the second axial side from the inner annular part 232, and the outer annular part 231 is provided with a flange part 231b which extends substantially cylindrically toward the first axial side, from an inner circumferential side of the outer annular part 231 to an axial position in agreement with the inner annular part 232.

The biasing member 230 is also provided with a spring part 233 which is stretchable in the rotational direction, a locked part 234 which is locked by the flywheel 10, a spline part 235 which is spline-engaged with the input shaft 20, and a temporarily fixed part 236 which is temporarily fixed by the temporarily fixing member 240. The spline part 235 is formed in an inner circumferential surface of the inner annular part 232.

The spring part 233 of the biasing member 230 includes a first radially extending part 233a, a second radially extending part 233b, a third radially extending part 233c, an outer coupling part 233d, and an inner coupling part 233e. The first radially extending part 233a extends linearly outward in the radial direction from the inner annular part 232. The second radially extending part 233b extends linearly inward in the radial direction from the outer annular part 231 in substantially parallel with the first radially extending part 233a. The third radially extending part 233c extends linearly in the radial direction between the first and the second radially extending parts 233a and 233b in substantially parallel with the first and the second radially extending parts 233a and 233b. The outer coupling part 233d extends in an arc shape while coupling the radially outward of the first and the third radially extending parts 233a and 233c. The inner coupling part 233e extends in an arc shape while coupling the radial inside of the third and the second radially extending parts 233c and 233b.

The spring part 233 is connected at one end to the outer annular part 231, and, at the other end to the inner annular part 232, and is formed in a substantially S-shape when seen from the second axial side. The spring part 233 is configured such that the first radially extending part 233a is moved toward the second rotational-direction side with respect to the second radially extending part 233b, by the inner annular part 232 being moved toward the second rotational-direction side with respect to the outer annular part 231.

The locked part 234 of the biasing member 230 is comprised of the outer annular part 231 and a fastening bolt (screw) B2 (see FIG. 30) which is inserted from the first axial side into a bolt insertion hole 231a formed in the outer annular part 231. The biasing member 230 is locked by the flywheel 10 by the fastening bolt B2 being threadedly engaged with the first opening part 13 of the flywheel 10.

The temporarily fixed part 236 of the biasing member 230 is provided to a tip-end part of an arm part 238 which extends substantially linearly outward in the radial direction from the inner annular part 232 on the second rotational-direction side of the spring part 233. The arm part 238 extends radially outward from the inner annular part 232 having a substantially rectangular shape in the cross section, and a tip-end side of the arm part 238 where the temporarily fixed part 236 is provided is substantially flush with the outer annular part 231. The outer annular part 231 is formed with a notch part 231c which is notched radially outwardly in a substantially rectangular shape when seen in the axial direction, and the temporarily fixed part 236 and a temporarily fixing part 242 are positioned inside the notch part 231c.

Each of the spring part 233, the locked part 234, and the temporarily fixed part 236 includes a plurality of (e.g., four of) them which are formed in the biasing member 230 at an equal interval in a circumferential direction. The locked part 234 is disposed to be overlapped with the spring part 233 in the radial direction, and the temporarily fixed part 236 is disposed on the second rotational-direction side of the spring part 233.

The biasing member 230 biases the input shaft 20 toward the first rotational-direction side with respect to the flywheel 10, by engaging the spline part 235 with the spline part 21 of the input shaft 20 while the biasing member 230 is locked by the flywheel 10 and the spring part 233 is in a first stretched state of the spring part 233 where the inner annular part 232 is moved toward the second rotational-direction side with respect to the outer annular part 231.

In this embodiment, as illustrated in FIG. 30, four temporarily fixing members 240 are disposed in the circumferential direction at an equal interval. Each temporarily fixing member 240 includes, as illustrated in FIGS. 32 and 33, a fixed part 241, the temporarily fixing part 242, and a temporarily fixing body part 243. The fixed part 241 is made of a plate-like member, and is fixed to the biasing member 230, and the temporarily fixing part 242 temporarily fixes the biasing member 230 to the flywheel 10. The temporarily fixing body part 243 extends circumferentially while connecting the fixed part 241 to the temporarily fixing part 242. The temporarily fixing body part 243 functions as a connector which connects the fixed part 241 to the temporarily fixing part 242.

The temporarily fixing body part 243 is provided with a first circumferentially extending part 243a extending circumferentially at the second axial side, a second circumferentially extending part 243b extending circumferentially at the first axial side, and a coupling part 234c extending in an arc shape while coupling the first rotational-direction sides (circumferentially one-end sides) of the first and second circumferentially extending parts 243a and 243b, and the temporarily fixing body part 243 is formed in a substantially U-shape.

The fixed part 241 is provided on the second rotational-direction side of the first circumferentially extending part 243a of the temporarily fixing body part 243, and is fixed to the outer annular part 131 of the biasing member 230 by welding, etc., along the first axial side of the outer annular part 231.

The temporarily fixing part 242 is provided on the second rotational-direction side of the second circumferentially extending part 243b of the temporarily fixing body part 243. The temporarily fixing member 240 is configured such that, by the fixed part 241 being fixed to the biasing member 230, the second rotational-direction side of the second circumferentially extending part 243b is elastically displaceable toward the first axial side with respect to the fixed part 241, and the temporarily fixing part 242 is elastically displaceable toward the first axial side.

The temporarily fixing part 242 extends to the second axial side from the second rotational-direction side of the second circumferentially extending part 243b of the temporarily fixing body part 243, and temporarily fixes the biasing member 230 to the flywheel 10 in a second stretched state where the spring part 233 of the biasing member 230 is stretched more than in the first stretched state. In this embodiment, the temporarily fixing part 242 temporarily fixes the biasing member 230 to the flywheel 10 by the temporarily fixing member 240 being fixed to the biasing member 230 which is locked by the flywheel 10. The temporarily fixing part 242 is disposed at a position different in the circumferential direction from the support part 16 formed in the flywheel 10 so as to avoid interference with the flywheel 10.

Figure 34:
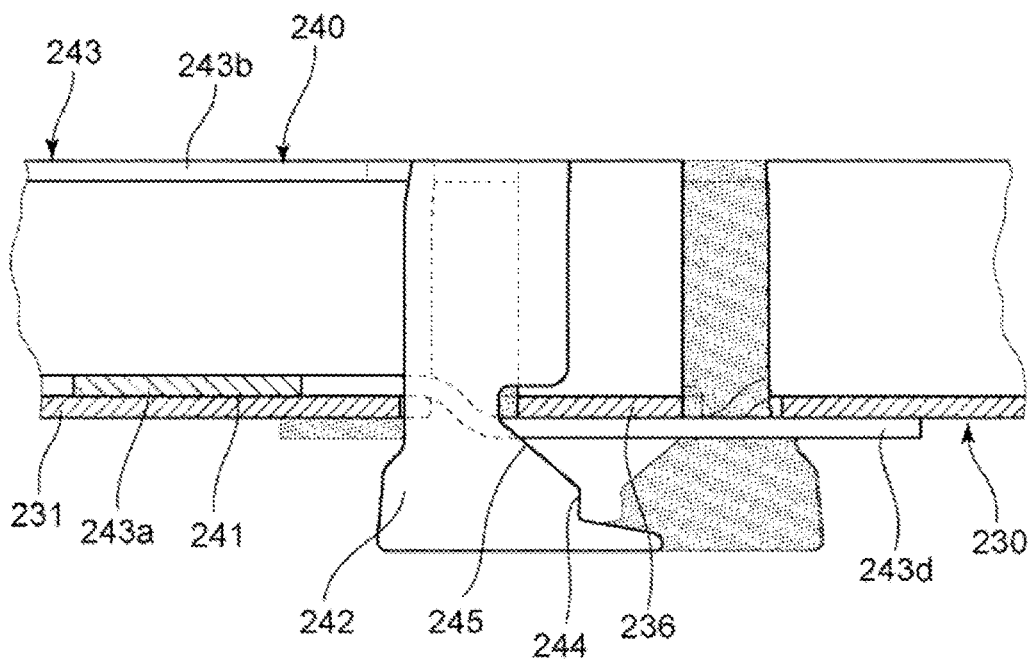
FIG. 34 is a cross-sectional view of a temporarily fixing part of the temporarily fixing member and therearound illustrated in FIG. 33.

FIG. 34 is a cross-sectional view of the temporarily fixing part of the temporarily fixing member and therearound illustrated in FIG. 33. As illustrated in FIG. 34, the temporarily fixing part 242 includes a contact part 244 which contacts the temporarily fixed part 236 of the biasing member 230, and a recess 245 dented toward the first rotational-direction side on the first axial side of the contact part 244.

The contact part 244 is formed by an end surface of the temporarily fixing part 242 at the second rotational-direction side, which extends linearly in substantially parallel with the axial direction. The contact part 244 may be formed, similarly to the embodiments described above, by a sloped part which inclines to the first rotational-direction side toward the first axial side.

Figure 35:
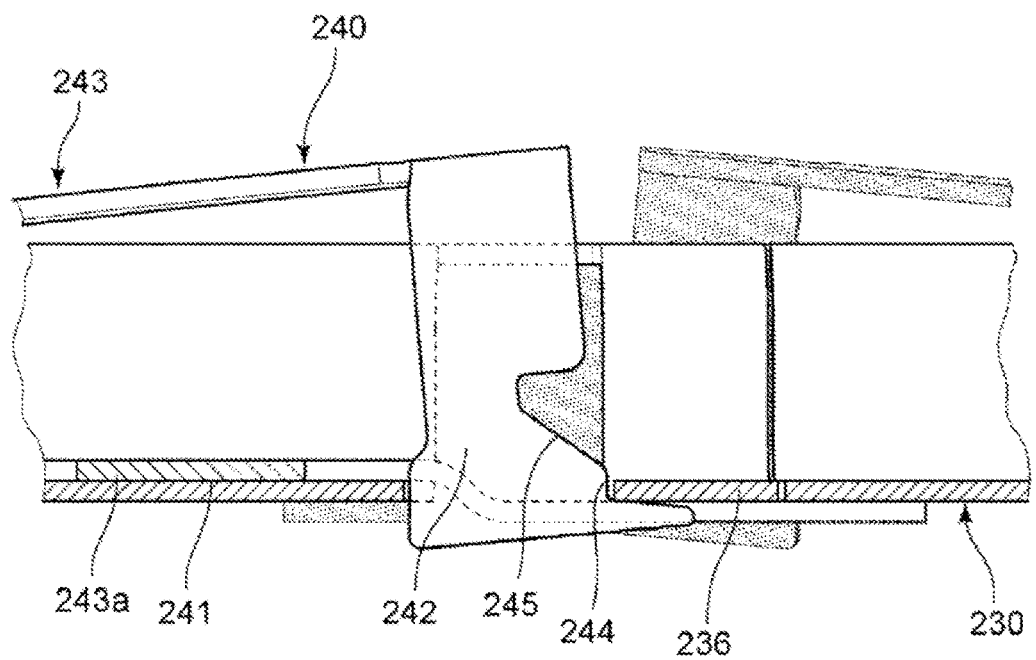
FIG. 35 is a diagram illustrating a state where the biasing member is temporarily fixed by the temporarily fixing member.

FIG. 35 is a diagram illustrating a state where the biasing member is temporarily fixed by the temporarily fixing member. As illustrated in FIG. 35, the recess 245 of the temporarily fixing part 242 is formed in an end surface of the temporarily fixing part 242 at the second rotational-direction side, and is formed to dent toward the first rotational-direction side in a substantially trapezoid shape. The recess 245 is formed such that a first axial side surface thereof extends linearly orthogonal toward the axial direction, and the second axial side surface thereof inclines to the first axial side toward the first rotational-direction side. The recess 245 is formed such that, when the input shaft 20 is spline-engaged with the flywheel 10, the temporarily fixed part 236 of the biasing member 230 is disposed in the recess 245 without contacting therewith. Note that, similarly to the temporarily fixing member 140, the recess 245 may be formed in a substantially rectangular shape.

As illustrated in FIG. 34, the temporarily fixing member 240 is also provided with, at the first circumferentially extending part 243a of the temporarily fixing body part 243, a guide part 243d extending toward the second axial side of the outer annular part 231 through the notch part 231c, and then toward the second rotational-direction side. The guide part 243d is disposed at the second axial side of the temporarily fixed part 236 so as to guide the temporarily fixed part 236 to move in the rotational direction. The guide part 243d is provided radially inward of the temporarily fixing part 242.

As illustrated in FIG. 35, when the second rotational-direction side of the second circumferentially extending part 243b of the temporarily fixing body part 243 is elastically displaced by the worker, etc., toward the first axial side with respect to the fixed part 241, the temporarily fixing part 242 is elastically displaced toward the first axial side, and the contact part 244 contacts the temporarily fixed part 236 of the biasing member 230 so that the temporarily fixing member 240 temporarily fixes the biasing member 230 in the second stretched state where the spring part 233 of the biasing member 230 is stretched more than in the first stretched state.

As illustrated in FIG. 29, the input shaft 20 has the spline part 21 on the outer circumferential surface at the second axial side. The spline part 21 has the spline of which the tooth trace extends in the axial direction, and is formed to be spline-engaged with the spline part 12 of the flywheel 10 and the spline part 235 of the biasing member 230.

The input shaft 20 also includes, on the first axial side of the spline part 21, a canceling part 22' which cancels the temporary fixing of the biasing member 230 to the flywheel 10 by the temporarily fixing part 242 of the temporarily fixing member 240. In this embodiment, the canceling part 22' is provided to the transmission case 5 which rotatably supports the input shaft 20, and formed in a vertical wall part 5a which extends radially inward from an outer circumferential part of the transmission case 5.

The canceling part 22' is formed such that, when the spline part 21 of the input shaft 20 is inserted into radially inward of the temporarily fixing member 240 from the first axial side, and is spline-engaged with the spline part 12 of the flywheel 10 through the spline part 235 of the biasing member 230, the input shaft 20 is biased toward the first rotational-direction side with respect to the flywheel 10 while the spline part 235 is engaged with the spline part 21 in the first stretched state of the spring part 233.

In the power transmission system 206, the biasing member 230 is attached to the flywheel 10 from the first axial side to be locked, and the temporarily fixing member 240 is attached to the biasing member 230 from the first axial side so that the biasing member 230 is temporarily fixed to the flywheel 10 in the second stretched state of the spring part 233. Then, the spline part 21 of the input shaft 20 is spline-engaged with the spline part 12 of the flywheel 10 through the spline part 235 of the biasing member 230 from the first axial side, and thus the input shaft 20 is assembled to the flywheel 10 by spline-engagement.

Figure 36:
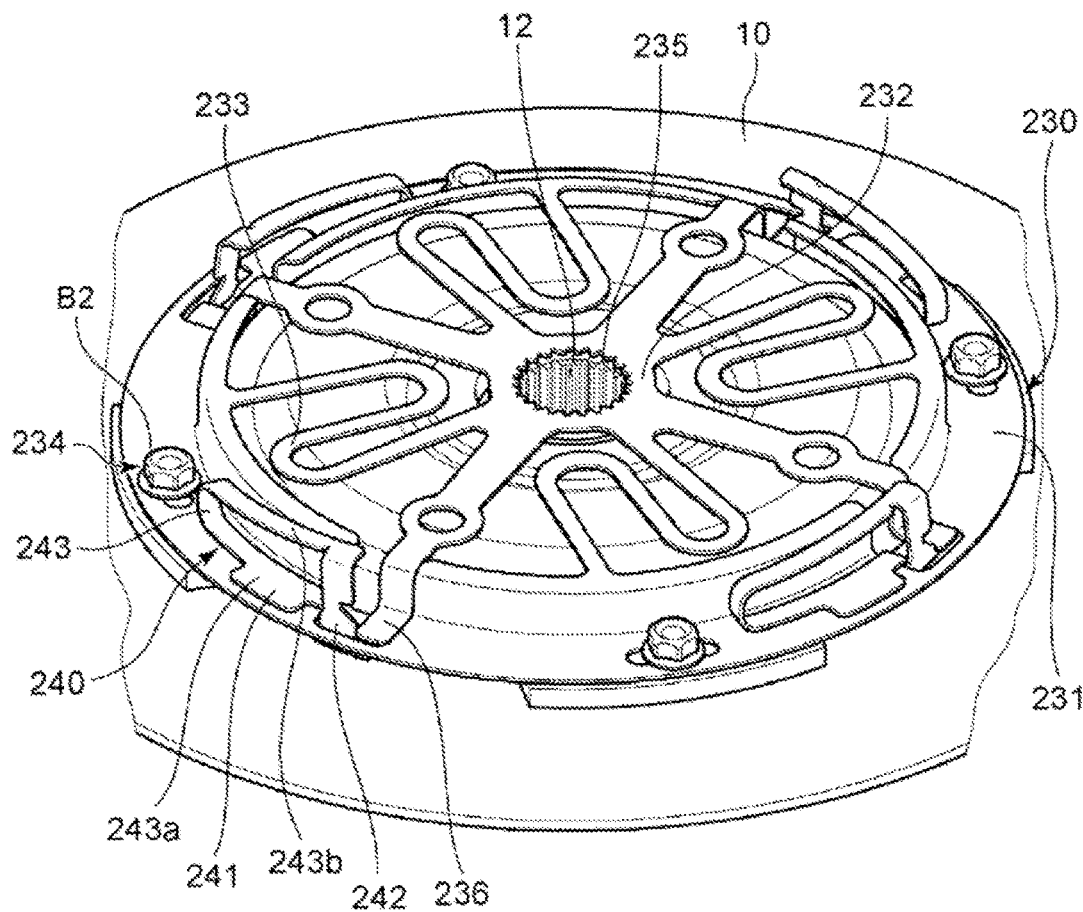
FIG. 36 is a diagram illustrating a state where the biasing member and the temporarily fixing member are attached to the flywheel.

FIG. 36 is a diagram illustrating a state where the biasing member and the temporarily fixing member are attached to the flywheel. Upon assembling of the input shaft 20 to the flywheel 10 by spline-engagement, as illustrated in FIG. 36, the locked part 234 of the biasing member 230 is locked by using the fastening bolt B2 so that the biasing member 230 is attached to the flywheel 10. The biasing member 230 is attached such that the spline part 235 becomes substantially in agreement with the spline part 12 of the flywheel 10.

The temporarily fixing member 240 is attached to the biasing member 230 by the fixed part 241 of the temporarily fixing member 240 being fixed to the outer annular part 231 by welding, etc., in the state where the temporarily fixing member 240 is disposed on the first axial side of the biasing member 230, the first circumferentially extending part 243a of the temporarily fixing body part 243 is superimposed on the outer annular part 231, and the temporarily fixed part 236 of the biasing member 230 is positioned in the recess 245 of the temporarily fixing member 240.

The temporarily fixing member 240 attached to the biasing member 230 temporarily fixes the biasing member 230 by contacting the temporarily fixed part 236 of the biasing member 230 to the contact part 244 of the temporarily fixing part 242 in the second stretched state of the spring part 233 where the second circumferentially extending part 243b is elastically displaced toward the first axial side while the spring part 233 is stretched by the temporarily fixed part 236 being moved toward the second rotational-direction side.

Figure 37:
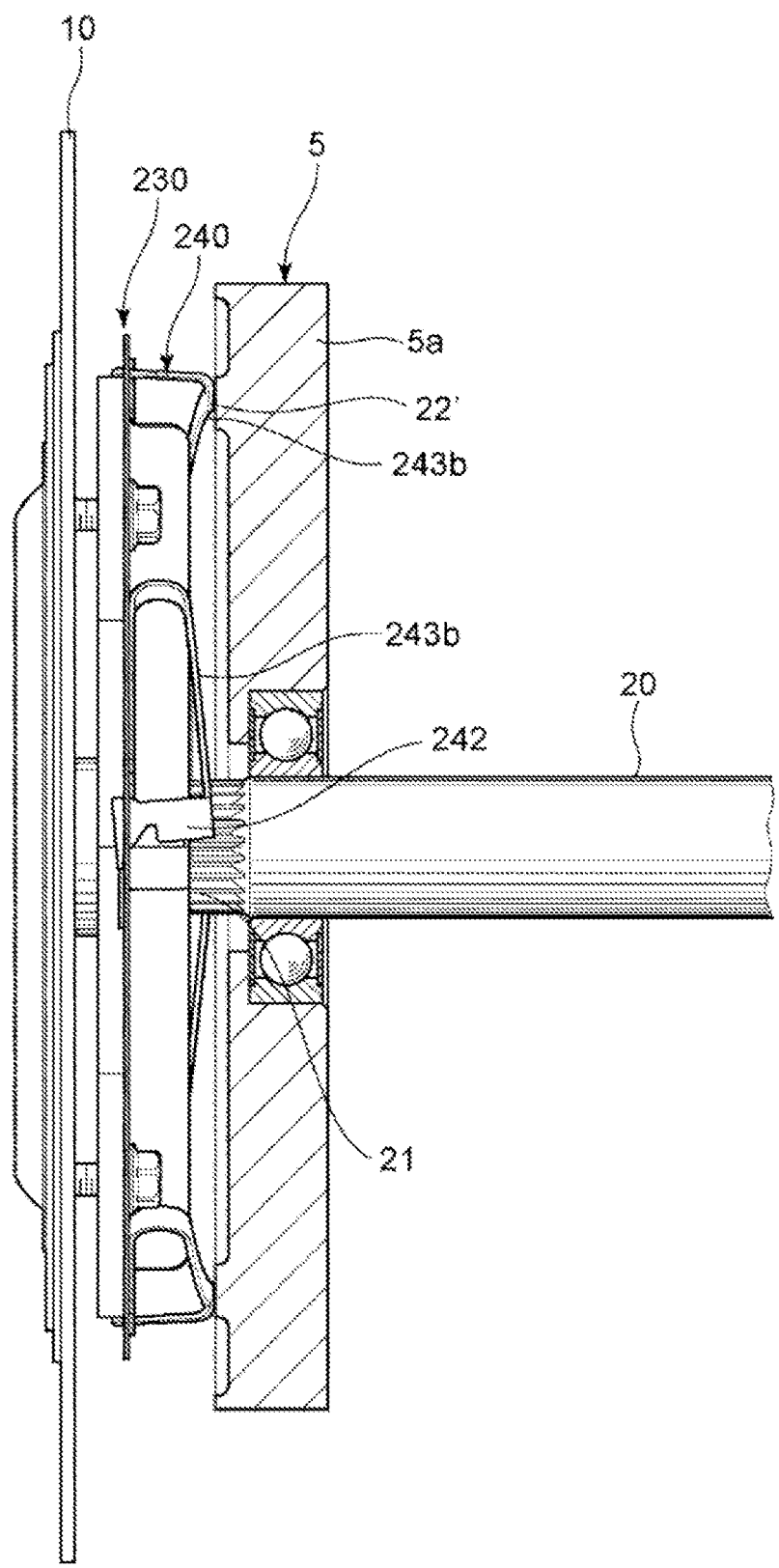
FIG. 37 is an explanatory diagram illustrating assembly of the input shaft to the flywheel.

FIG. 37 is an explanatory diagram illustrating assembly of the input shaft to the flywheel. Next, as illustrated in FIG. 37, the input shaft 20 is assembled from the first axial side so that the spline part 21 is spline-engaged with the spline part 12 of the flywheel 10 through the spline part 235 of the biasing member 230.

When the input shaft 20 is spline-engaged to the flywheel 10, the canceling part 22', which is provided to the transmission case 5 to be moved toward the second axial side together with the input shaft 20, contacts the second circumferentially extending part 243b of the temporarily fixing member 240. Accompanying with the motion of the input shaft 20 toward the second axial side, the canceling part 22' moves the second rotational-direction side of the second circumferentially extending part 243b toward the second axial side, and thus the temporarily fixing part 242 is moved toward the second axial side.

When the input shaft 20 is moved toward the second axial side until the canceling part 22' moves the temporarily fixing part 242 toward the second axial side and the temporarily fixed part 236 is positioned in the recess 245 without contacting therewith, the temporary fixing of the biasing member 230 to the flywheel 10 is canceled by the canceling part 22', and the input shaft 20 is assembled to the flywheel 10 by spline-engagement.

When the input shaft 20 is moved toward the second axial side until the temporarily fixed part 236 is positioned in the recess 245, the spring part 233 moves the inner annular part 232 toward the first rotational-direction side with respect to the outer annular part 231. Accordingly, while the biasing member 230 is locked by the flywheel 10 and the spline part 235 is engaged with the spline part 21 of the input shaft 20 in the first stretched state of the spring part 233, the biasing member 230 biases the input shaft 20 toward the first rotational-direction side with respect to the flywheel 10.

Also in the power transmission system 206, at the spline-engagement part where the spline part 12 of the flywheel 10 and the spline part 21 of the input shaft 20 are spline-engaged with each other, the input shaft 20 is biased toward the first rotational-direction side by the biasing member 230, the second rotational-direction side of the tooth part of the spline part 21 of the input shaft 20 is engaged with a first rotational-direction side of a tooth part of the spline part 235 of the biasing member 230, and the first rotational-direction side of the tooth part of the spline part 21 is engaged with the second rotational-direction side of the tooth part of the spline part 12 of the flywheel 10.

In this manner, also the power transmission system 206 uses the biasing member 230 which biases the input shaft 20 in the rotational direction with respect to the flywheel 10, and the temporarily fixing member 240 which temporarily fixes the biasing member 230 to the flywheel 10 so as to bias the input shaft 20 by the biasing member 230 toward the first rotational-direction side with respect to the flywheel 10. As a result, the teeth rattling noise at the spline-engagement part between the flywheel 10 and the input shaft 20 can be reduced.

In the power transmission system 206, the biasing member 230 is attached to the flywheel 10 to be locked, the temporarily fixing member 240 is attached to the flywheel 10 and the biasing member 230 so as to temporarily fix the biasing member 230 to the flywheel 10 in the stretched state of the spring part 233, and the input shaft 20 supported by the transmission case 5 is assembled to the flywheel 10 by spline-engagement. Therefore, the input shaft 20 can be assembled to the flywheel 10 by spline-engagement with adequate assemblability.

In the power transmission system 206, the temporarily fixing member 240 may be fixedly attached to the biasing member 230 before the biasing member 230 is attached to the flywheel 10 to be locked, or may be fixedly attached to the biasing member 230 after the biasing member 230 is attached to the flywheel 10 to be locked.

Although in this embodiment the biasing member 230 biases the input shaft 20 to the first rotational-direction side with respect to the flywheel 10, the biasing member 230 may bias the input shaft 20 toward the second rotational-direction side.

In this embodiment, the biasing member 230 includes the spring part 233 which is stretchable in the rotational direction, and is formed to bias the input shaft 20 toward the first rotational-direction side with respect to the flywheel 10 in the first stretched state of the spring part 233. The temporarily fixing member 240 temporarily fixes the biasing member 230 to the flywheel 10 in the second stretched state where the spring part 233 is stretched more than in the first stretched state, and the spring part 233 is elastically displaceable to be stretched in the rotational direction. However, the spring part 233 may be elastically displaceable to be compressed in the rotational direction.

The biasing member 230 may include a spring part which is compressible in the rotational direction, and may be formed to bias the input shaft 20 toward the first rotational-direction side with respect to the flywheel 10 in a first compression state of the spring part. The temporarily fixing member 240 may temporarily fix the biasing member 230 to the flywheel 10 in a second compression state where the spring part is compressed more than in the first stretched state.

In such a case, the spring part is compressed in the rotational direction by the inner annular part 232 being moved toward the second rotational-direction side with respect to the outer annular part 231. When the spline part 21 of the input shaft 20 is spline-engaged to the spline part 12 of the flywheel 10 through the spline part 235 of the biasing member 230, the canceling part 22', which is provided to the first axial side of the spline part 21, cancels the temporary fixing of the biasing member 230 to the flywheel 10 by the temporarily fixing part of the temporarily fixing member 240 so that the input shaft 20 is biased toward the first rotational-direction side with respect to the flywheel 10 while the spline part 235 is engaged with the spline part 21 in the first compression state of the spring part.

As described above, in the power transmission system 206 according to this embodiment, the biasing member 230 and the temporarily fixing member 240 are used for assembling the first and second power transmission members 10 and 20 by spline-engagement. The biasing member 230 biases the second power transmission member 20 toward the first rotational-direction side with respect to the first power transmission member 10 by engaging the spline part 235 with the spline part 21 of the second power transmission member 20 while the biasing member 230 is locked by the first power transmission member 10 and the spring part 233 is in the first elastically displaced state. The temporarily fixing member 240 includes the temporarily fixing part 242 which temporarily fixes the biasing member 230 to the first power transmission member 10 in the second elastically displaced state where the spring part 233 is elastically displaced more than in the first elastically displaced state. Moreover, the canceling part 22' which cancels the temporary fixing of the biasing member 230 to the first power transmission member 10 by the temporarily fixing part 242 is provided to the first axial side of the spline part 21 of the second power transmission member 20.

According to this configuration, the biasing member 230 is attached to the first power transmission member 10 to be locked, the temporarily fixing member 240 is attached to the first power transmission member 10 and the biasing member 230 so as to temporarily fix the biasing member 230 to the first power transmission member 10 in the second elastically displaced state of the spring part 233, and the spline part 21 of the second power transmission member 20 is spline-engaged with the spline part 12 of the first power transmission member 10 through the spline part 235 of the biasing member 230 so that the second power transmission member 20 is assembled to the first power transmission member 10. Accordingly, the temporary fixing of the biasing member 230 to the first power transmission member 10 by the temporarily fixing part 242 of the temporarily fixing member 240 is canceled, and the second power transmission member 20 is biased toward the first rotational-direction side with respect to the first power transmission member 10. As a result, the teeth rattling noise at the spline-engagement part between the first and second power transmission members 10 and 20 is reduced.

By engaging the biasing member 230 to the first power transmission member 10, temporarily fixing the biasing member 230 to the first power transmission member 10 by the temporarily fixing member 240, and spline-engaging the second power transmission member 20 to the first power transmission member 10, the second power transmission member 20 can be biased toward the first rotational-direction side with respect to the first power transmission member 10, without changing the shapes of the spline parts 12 and 21 of the first and second power transmission members 10 and 20, and thus the assembly is comparatively easier. As a result, the teeth rattling noise at the spline-engagement part between the first and second power transmission members 10 and 20 can be reduced with adequate assemblability in a comparatively simple configuration.

Further, the biasing member 230 includes the spring part 233, the locked part 234, the spline part 235, the inner annular part 232, the outer annular part 231, and the temporarily fixed part 236 which is temporarily fixed by the temporarily fixing part 242. The locked part 234 is connected to the outer annular part 231, and the spline part 235 and the temporarily fixed part 236 are connected to the inner annular part 232. The spring part 233 is connected at one end to the outer annular part 231, and, at the other end, to the inner annular part 232, and is elastically displaced in the rotational direction by the inner annular part 232 being moved toward the second rotational-direction side with respect to the outer annular part 231.

According to this configuration, since the biasing member 230 having the spring part 233 which is elastically displaced in the rotational direction by the inner annular part 232 being moved toward the second rotational-direction side with respect to the outer annular part 231 is used, unlikely to a case of using a spring as the biasing member 230, a spring holding member which holds the spring is unnecessary, and thus the assemblability is improved.

Further, the temporarily fixing member 240 is fixedly attached to the outer annular part 231 of the biasing member 230. Therefore, when the first and second power transmission members 10 and 20 are assembled together by spline-engagement, rattling of the temporarily fixing member 240 in the circumferential direction can be reduced.

Further, a plurality of temporarily fixing members 240 are attached to the biasing member 230 in the circumferential direction at an equal interval, which effectively reduces the teeth rattling noise at the spline-engagement part between the first and second power transmission members 10 and 20.

Further, the canceling part 22' is provided to the transmission case (case) 5 which rotatably supports the second power transmission member 20. Therefore, the canceling part 22', which is provided to the transmission case 5 to be moved toward the second axial side together with the second power transmission member 20, cancels the temporary fixing of the biasing member 230, and thus, the temporary fixing can be canceled utilizing the inertial mass of the transmission case 5.

Figure 38:
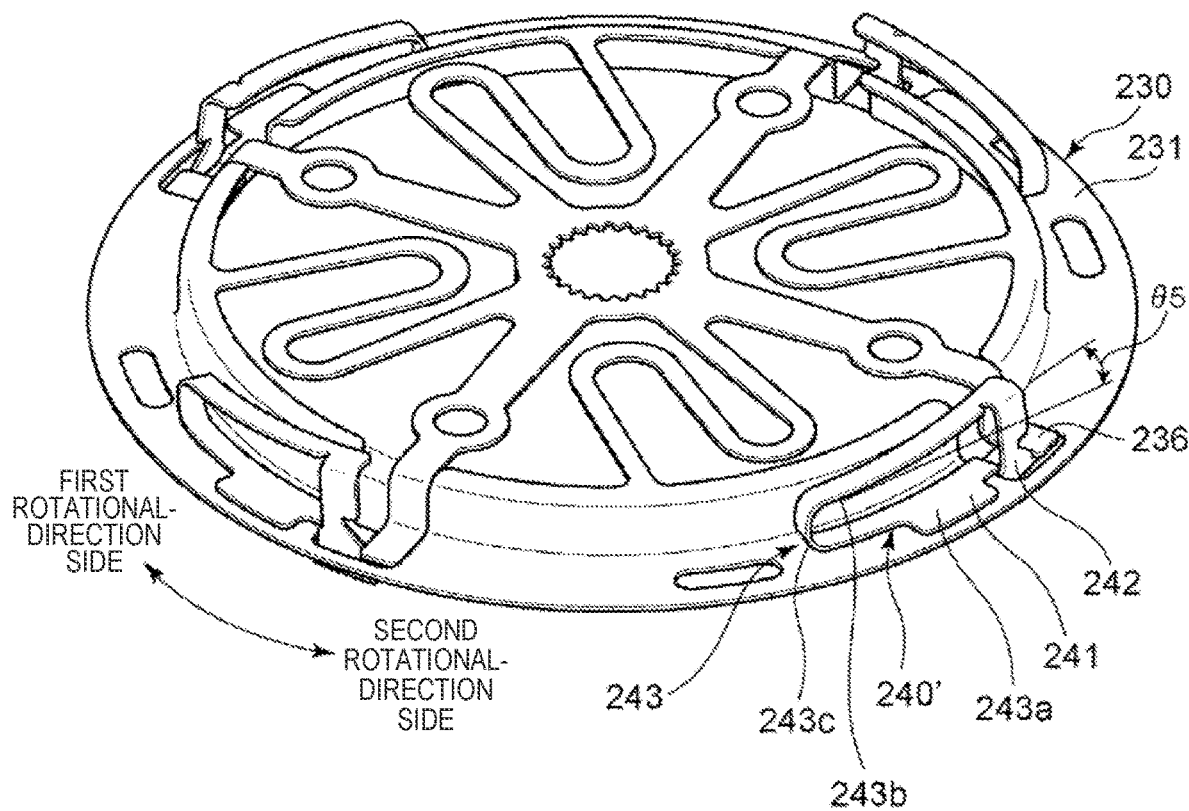
FIG. 38 is a diagram illustrating a modification of the temporarily fixing member according to Embodiment 3.

FIG. 38 is a diagram illustrating a modification of the temporarily fixing member according to Embodiment 3. A temporarily fixing member 240' illustrated in FIG. 38 includes, similarly to the temporarily fixing member 240, the fixed part 241 fixed to the biasing member 230, the temporarily fixing part 242 which temporarily fixes the biasing member 230 to the flywheel 10, and the temporarily fixing body part 243 which extends circumferentially while connecting the fixed part 241 to the temporarily fixing part 242.

The temporarily fixing body part 243 is also provided with the first circumferentially extending part 243a, the second circumferentially extending part 243b, and the coupling part 234c extending in an arc shape while coupling the first circumferentially extending part 243a to the second circumferentially extending part 243b, and the temporarily fixing body part 243 is formed in a substantially U-shape.

The fixed part 241 is provided on the second rotational-direction side of the first circumferentially extending part 243a of the temporarily fixing body part 243, and is fixed to the outer annular part 131 of the biasing member 230 by welding, etc., along the first axial side of the outer annular part 231.

Although, in the temporarily fixing member 240, the second circumferentially extending part 243b and the first circumferentially extending part 243a of the temporarily fixing body part 243 extend parallelly in the circumferential direction, in the temporarily fixing member 240', the second circumferentially extending part 243b and the first circumferentially extending part 243a are formed to have a given angle θ5 therebetween. The given angle θ5 is set to an angle, for example, between 5° and 10°.

Figure 39B:
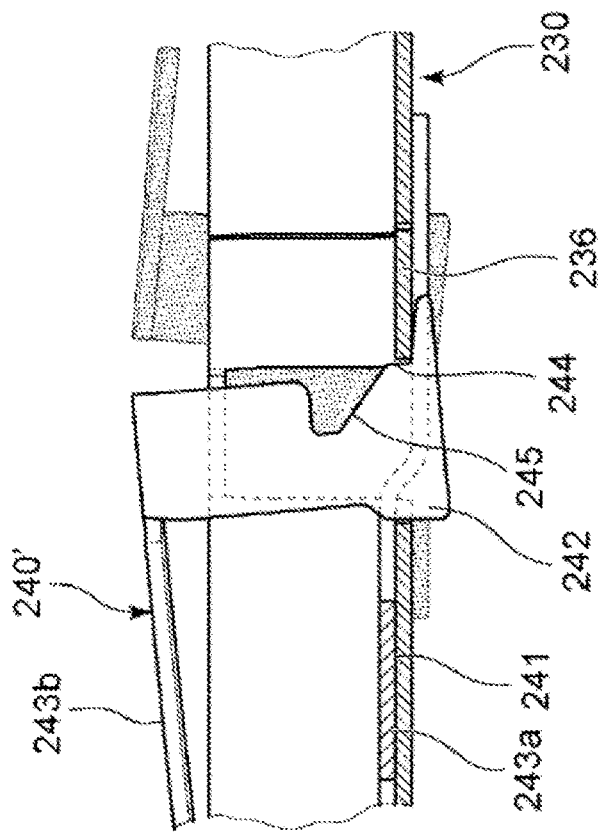
FIGS. 39A and 39B are explanatory diagrams illustrating temporary fixing of the biasing member by the temporarily fixing member.
Figure 39A:
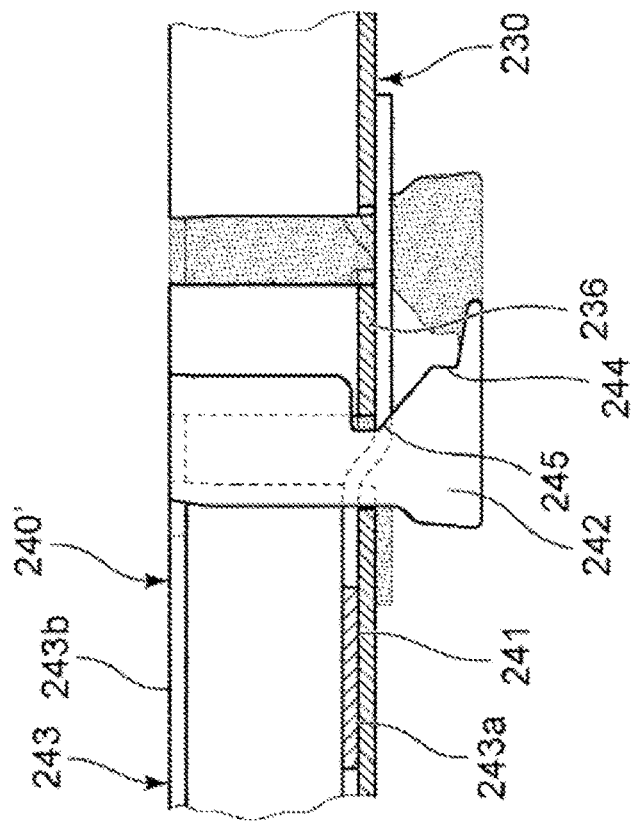

FIGS. 39A and 39B are explanatory diagrams illustrating temporary fixing of the biasing member by the temporarily fixing member. As illustrated in FIG. 39A, in the temporarily fixing member 240', the fixed part 241 is fixed to the biasing member 230 by welding, etc., in a state where the second circumferentially extending part 243b of the temporarily fixing body part 243 is elastically displaced toward the second axial side so as to be parallel with the first circumferentially extending part 243a. Accordingly, the temporarily fixing member 240' is configured such that the second rotational-direction side of the second circumferentially extending part 232b is movable by the elastic force toward the first axial side with respect to the fixed part 241, and thus the temporarily fixing part 242 is movable toward the first axial side.

Although the temporarily fixing part 242 is movable by the elastic force of the temporarily fixing member 240' toward the first axial side with respect to the fixed part 241, the temporarily fixed part 236 of the biasing member 230 is regulated to be moved toward the first axial side by the second axial side surface of the recess 245 of the temporarily fixing member 240'.

Then, as illustrated in FIG. 39B, when the temporarily fixed part 236 of the biasing member 230 is moved toward the second rotational-direction side by the worker, etc., and the spring part 233 of the biasing member 230 is stretched, the temporarily fixing part 242 is moved toward the first axial side with respect to the fixed part 241 by the elastic force of the temporarily fixing member 240'. Accordingly, the temporarily fixing part 242 temporarily fixes the biasing member 230 in the second stretched state where the spring part 233 is stretched more than in the first stretched state.

As described above, the temporarily fixing member 240' may include the fixed part 241 fixed to the biasing member 230, the temporarily fixing part 242, and the connector 243 connecting the temporarily fixing part 242 to the fixed part 241 such that the fixed part 241 is fixed to the biasing member 230 in the state where the temporarily fixing part 242 is elastically displaced toward the second axial side with respect to the fixed part 241. The temporarily fixing part 242 may temporarily fix the biasing member 230 by the temporarily fixing part 242 being moved toward the first axial side by the elastic force with respect to the fixed part 241 which is fixed to the biasing member 230.

Also in this case, by using the temporarily fixing member 240' configured such that the temporarily fixing part 242 temporarily fixes the biasing member 230 by the elastic force moving the temporarily fixing part 242 toward the first axial side with respect to the fixed part 241 fixed to the biasing member 230, the teeth rattling noise at the spline-engagement part between the first and second power transmission members 10 and 20 can be reduced. Further, the rattling of the temporarily fixing member 240' in the circumferential direction can be suppressed when the first and second power transmission members 10 and 20 are assembled together by spline-engagement.

Although in the embodiments described above the flywheel 10 is used as the first power transmission member, and the input shaft 20 of the transmission 3 is used as the second power transmission member, the present disclosure is similarly applicable to a case where a damper is coupled to the flywheel 10, by using an output member of the damper instead of the flywheel.

The present disclosure is not limited to the embodiments described above, but various improvements and changes in design are possible without departing from the spirit of the present disclosure.

As described above, according to the present disclosure, the teeth rattling noise can be reduced at the spline-engagement part between the first and second power transmission members with adequate assemblability in a comparatively simple configuration. Therefore, the present disclosure may suitably be utilized in a vehicle on which a power transmission system having a first power transmission member and a second power transmission member which are assembled together by spline-engagement, is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

5 Transmission Case
6, 106, 206 Power Transmission System
10 Flywheel (First Power Transmission Member)
12 Spline Part of Flywheel
20 Input Shaft (Second Power Transmission Member)
21 Spline Part of Input Shaft
22, 22' Canceling Part
30, 130, 230 Biasing Member
31, 131, 231 Outer Annular Part
32, 132, 232 Inner Annular Part
33, 133, 233 Spring Part
34, 134, 234 Locked Part
35, 135, 235 Spline Part of Biasing Member
36, 136, 236 Temporarily Fixed Part
40, 140, 240 Temporarily Fixing Member
41, 143, 243 Temporarily Fixing Body Part
42, 142, 242 Temporarily Fixing Part
43 Regulated Part
44, 145, 244 Contact Part
45, 146, 245 Recess
141 Fixing Part

What is claimed is:

1. A power transmission system including a first power transmission member and a second power transmission member configured to be assembled together by spline-engagement, comprising:
    a biasing member including:
        a spring part elastically displaceable in a rotational direction;
        a locked part provided on a first end side of the spring part and configured to be locked by the first power transmission member; and
        a spline part provided on a second end side of the spring part,
    the biasing member being configured to bias the second power transmission member toward a first rotational-direction side with respect to the first power transmission member by the spline part of the biasing member being engaged with a spline part of the second power transmission member while the biasing member is disposed on a first axial side of the first power transmission member and locked by the first power transmission member, and the spring part is in a first elastically displaced state; and
    a temporarily fixing member disposed on the first axial side of the biasing member and having a temporarily fixing part configured to temporarily fix the biasing member to the first power transmission member in a second elastically displaced state where the spring part is elastically displaced more than in the first elastically displaced state,
    wherein the second power transmission member is provided, on the first axial side of the spline part, with a canceling part configured to, when the spline part of the second power transmission member is spline-engaged with a spline part of the first power transmission member through the spline part of the biasing member from the first axial side of the temporarily fixing member, cancel the temporary fixing of the biasing member to the first power transmission member by the temporarily fixing part so that the second power transmission member is biased toward the first rotational-direction side with respect to the first power transmission member while the spline part of the biasing member is engaged with the spline part of the second power transmission member in the first elastically displaced state of the spring part,
    wherein the biasing member further includes an inner annular part provided at a radial inside, an outer annular part provided at a radial outside, and a temporarily fixed part configured to be temporarily fixed by the temporarily fixing part,
    wherein the locked part is connected to the outer annular part,
    wherein the spline part of the biasing member and the temporarily fixed part are connected to the inner annular part, and
    wherein the spring part is connected at one end to the outer annular part, and at the other end to the inner annular part, and the spring part is elastically displaced in the rotational direction by the inner annular part being moved toward a second rotational-direction side with respect to the outer annular part.

2. A method of assembling the power transmission system of claim 1, comprising the steps of:
    locking the locked part of a biasing member to the first power transmission member from the first axial side and biasing the second power transmission member toward the first rotational-direction side with respect to the first power transmission member by engaging the spline part of the biasing member to the spline part of the second power transmission member in the first elastically displaced state;
    attaching the temporarily fixing member to the first power transmission member and the biasing member from the first axial side of the biasing member, and temporarily fixing the biasing member to the first power transmission member in the second elastically displaced state;
    assembling the second power transmission member to the first power transmission member by spline-engaging the spline part of the second power transmission member to the spline part of the first power transmission member through the spline part of the biasing member from the first axial side of the temporarily fixing member; and when the spline part of the second power transmission member is spline-engaged with the spline part of the first power transmission member, cancelling the temporary fixing of the biasing member to the first power transmission member by the temporarily fixing part so that the second power transmission member is biased toward the first rotational-direction side with respect to the first power transmission member while the spline part of the biasing member is engaged with the spline part of the second power transmission member in the first elastically displaced state of the spring part.

3. The power transmission system of claim 1, wherein the temporarily fixing member includes a temporarily fixing body part into which the spline part of the second power transmission member is inserted, and the temporarily fixing part extending toward a second axial side from the temporarily fixing body part, wherein the temporarily fixing part includes, at the first rotational-direction side, a regulated part configured to be regulated by the first power transmission member, and at the second rotational-direction side, a contact part configured to contact the temporarily fixed part, and a recess dented toward the rotational-direction first side on the first axial side of the contact part, and wherein the recess is formed such that, when the canceling part cancels the temporary fixing of the biasing member to the first power transmission member, the canceling part moves the temporarily fixing body part and the temporarily fixing part toward the second axial side so that the temporarily fixed part is positioned in the recess.

4. The power transmission system of claim 3, further comprising an assisting mechanism configured to assist the canceling of the temporary fixing of the biasing member by the canceling part.

5. The power transmission system of claim 4, wherein the contact part is formed by a sloped part inclining to the first rotational-direction side toward the first axial side, and wherein the assisting mechanism is comprised of the sloped part.

6. The power transmission system of claim 1, wherein the temporarily fixing member is fixedly attached to the outer annular part of the biasing member.

7. The power transmission system of claim 6, wherein the temporarily fixing member is one of a plurality of temporarily fixing members attached to the biasing member in a circumferential direction at an equal interval.

8. The power transmission system of claim 7, wherein the temporarily fixing member includes a fixed part configured to be fixed to the biasing member, the temporarily fixing part, and a connector connecting the fixed part to the temporarily fixing part such that the fixed part is fixed to the biasing member while the temporarily fixing part is elastically displaced toward the second axial side with respect to the fixed part, and wherein the temporarily fixing part temporarily fixes the biasing member by being moved toward the first axial side by an elastic force with respect to the fixed part fixed to the biasing member.

9. The power transmission system of claim 8, wherein the canceling part is provided to a case configured to rotatably support the second power transmission member.

10. The power transmission system of claim 9, further comprising an assisting mechanism configured to assist the canceling of the temporary fixing of the biasing member by the canceling part.

11. The power transmission system of claim 10, wherein the temporarily fixing part includes, at the second rotational-direction side, a contact part configured to contact the temporarily fixed part, wherein the contact part is formed by a sloped part inclining to the first rotational-direction side toward the first axial side, and wherein the assisting mechanism is comprised of the sloped part.

12. The power transmission system of claim 11, wherein the first power transmission member is a flywheel coupled to an output shaft of an engine, and the second power transmission member is an input shaft of a transmission.

13. The power transmission system of claim 6, wherein the temporarily fixing member includes a fixed part configured to be fixed to the biasing member, the temporarily fixing part, and a connector connecting the fixed part to the temporarily fixing part such that the fixed part is fixed to the biasing member while the temporarily fixing part is elastically displaced toward a second axial side with respect to the fixed part, and wherein the temporarily fixing part temporarily fixes the biasing member by being moved toward the first axial side by an elastic force with respect to the fixed part fixed to the biasing member.

14. The power transmission system of claim 6, wherein the canceling part is provided to a case configured to rotatably support the second power transmission member.

15. The power transmission system of claim 6, further comprising an assisting mechanism configured to assist the canceling of the temporary fixing of the biasing member by the canceling part.

16. The power transmission system of claim 1, further comprising an assisting mechanism configured to assist the canceling of the temporary fixing of the biasing member by the canceling part.

17. The power transmission system of claim 1, wherein the first power transmission member is a flywheel coupled to an output shaft of an engine, and the second power transmission member is an input shaft of a transmission.

* * * * *